United States Patent

Lourie

[15] 3,644,935

[45] Feb. 22, 1972

[54] METHOD OF IDENTIFYING CONNECTED REGIONS IN A LARGE SEGMENTED PATTERN

[72] Inventor: Janice Richmond Lourie, New York, N.Y.

[73] Assignee: International Business Machines Corporation, Armonk, N.Y.

[22] Filed: May 14, 1970

[21] Appl. No.: 37,282

[52] U.S. Cl. ............................444/1, 340/172.5, 340/324 A

[51] Int. Cl. ............................G06f 3/14

[58] Field of Search...................340/172.5, 324 A; 235/92 N

[56] References Cited

UNITED STATES PATENTS

| | | | |
|---|---|---|---|
| 3,422,419 | 1/1969 | Mathews et al. | 340/324 A |
| 3,480,943 | 11/1969 | Manber | 340/172.5 X |
| 3,531,775 | 9/1970 | Yasuo Ishii | 340/172.5 |
| 3,497,760 | 2/1970 | Kiesling | 340/324 A X |
| 3,437,873 | 4/1969 | Eggert | 340/324 A X |
| 3,256,516 | 6/1966 | Melia et al. | 340/172.5 |
| 3,529,298 | 9/1970 | Lourie | 340/172.5 |
| 3,408,485 | 10/1968 | Scott et al. | 235/92 N |

*Primary Examiner*—Paul J. Henon
*Assistant Examiner*—Sydney R. Chirlin
*Attorney*—Hanifin and Jancin and Charles P. Boberg

[57] ABSTRACT

Man-computer interactive method of graphically analyzing an outline pattern containing many arbitrarily bounded regions or pattern components, when the pattern is too large to be scanned in one piece and therefore must be broken up into segments or subpanels, the respective borders of which may extend across some of the regional boundary lines. In each subpanel, the row zones in the respective regions or regional segments contained therein are scanned and labeled with identifying symbols. Each subpanel is then matched with its bordering subpanels to determine the equivalency of differently labeled subregions belonging to the same regional entity among the respective subpanels, and tables of connected "nodes" (zone labels, in this case) are set up on the basis of these equivalences. Each set of connected nodes then serves as a reference table for converting the different labels of its region (which may be in several subpanels) into a common or universal label for such region throughout the entire panel.

23 Claims, 52 Drawing Figures

Patented Feb. 22, 1972 3,644,935

39 Sheets-Sheet 1

INVENTOR
JANICE RICHMOND LOURIE

BY Charles P. Boberg
ATTORNEY

PRIMARY PANEL
DIVIDED INTO
SUBPANELS

PRIMARY PANEL
WITH COORDINATE GRID
AND OUTLINE PATTERN
PLACED THEREON

PRIMARY PANEL
WITH OUTLINE PATTERN
CONFINED TO DISCRETE
BIT POSITIONS

PRIMARY PANEL MATRIX SEPARATED INTO SUBPANEL MATRICES

GENERAL FLOWCHART

LEGEND

SCANT = SCAN TABLE
EQTAB1 = EQUIVALENCE TABLE, 1ST. LEVEL
NODES1 = TABLE OF NODES, 1ST. LEVEL
EQTAB2 = EQUIVALENCE TABLE, 2ND. LEVEL
NODES2 = TABLE OF NODES, 2ND LEVEL

SCAN1

FIG. 8

TABLES BUILT BY SCAN1 (SUBPANEL 11)

FFFF = BOUNDARY SYMBOL (16 1'S). ALL OTHER VALUES REPRESENTED IN DECIMAL NOTATION.

| SCANT | | | SCTGD | | EQTAB1 | | |
|---|---|---|---|---|---|---|---|
| SCANTX (ENTRY NO.) | SCANT ENTRY | | SCTGDX (ENTRY NO.) | SCTGD ENTRY | EQTABX (ENTRY NO.) | EQTAB ENTRY | |
| | ZLENG | LABEL1 | | | | LEFT | RIGHT |
| 0 | 10 | FFFF | 0 | 0 | 0 | — | — |
| 1 | 1 | 1 | 1 | 3 | 1 | 2 | 1 |
| 2 | 2 | FFFF | 2 | 8 | | | |
| 3 | 7 | 2 | 3 | 13 | | | |
| 4 | 1 | 1 | 4 | 18 | | | |
| 5 | 1 | FFFF | 5 | 21 | | | |
| 6 | 1 | 3 | 6 | 22 | | | |
| 7 | 1 | FFFF | 7 | 23 | | | |
| 8 | 6 | 2 | 8 | 27 | | | |
| 9 | 1 | 1 | 9 | 34 | | | |
| 10 | 1 | FFFF | 10 | 41 | | | |
| 11 | 2 | 3 | | | | | |
| 12 | 1 | FFFF | | | | | |
| 13 | 5 | 2 | | | | | |
| 14 | 1 | 1 | | | | | |
| 15 | 1 | FFFF | | | | | |
| 16 | 3 | 3 | | | | | |
| 17 | 1 | FFFF | | | | | |
| 18 | 4 | 2 | | | | | |
| 19 | 1 | 1 | | | | | |
| 20 | 6 | FFFF | | | | | |
| 21 | 3 | 2 | | | | | |
| 22 | 10 | 1 | | | | | |
| 23 | 10 | 1 | | | | | |
| 24 | 1 | 1 | | | | | |
| 25 | 4 | FFFF | | | | | |
| 26 | 2 | 1 | | | | | |
| 27 | 3 | FFFF | | | | | |
| 28 | 1 | 1 | | | | | |
| 29 | 1 | FFFF | | | | | |
| 30 | 2 | 4 | | | | | |
| 31 | 1 | FFFF | | | | | |
| 32 | 2 | 1 | | | | | |
| 33 | 1 | FFFF | | | | | |
| 34 | 2 | 5 | | | | | |
| 35 | 1 | 1 | | | | | |
| 36 | 1 | FFFF | | | | | |
| 37 | 2 | 4 | | | | | |
| 38 | 1 | FFFF | | | | | |
| 39 | 2 | 1 | | | | | |
| 40 | 1 | FFFF | | | | | |
| 41 | 2 | 5 | | | | | |

FIG. 11

CONCOMP
DETERMINE CONNECTED COMPONENTS.
BUILD NODES AND NODEGD TABLES.

FIG. 11A

LEGEND

NODES = TABLE OF NODES, OR ENTRY THEREIN
NODESX = NUMBER OR ADDRESS OF ENTRY IN NODES
NODEGD = NODE TABLE GUIDE (NO. OF FINAL NODE IN EACH CONNECTED COMPONENT SET)
NODEGDX = NUMBER OF NODEGD ENTRY
ENDNODE = POINTER TO CURRENT ADDRESS IN NODES OF MOST RECENT NODES ENTRY
NODES MARKER = CUMULATIVE REGISTER OF NODES ADDRESSES WHICH HAVE BEEN CHECKED DURING CONCOMP
EQTAB MARKER = CUMULATIVE REGISTER OF EQTAB ADDRESSES WHICH HAVE BEEN CHECKED DURING CONCOMP

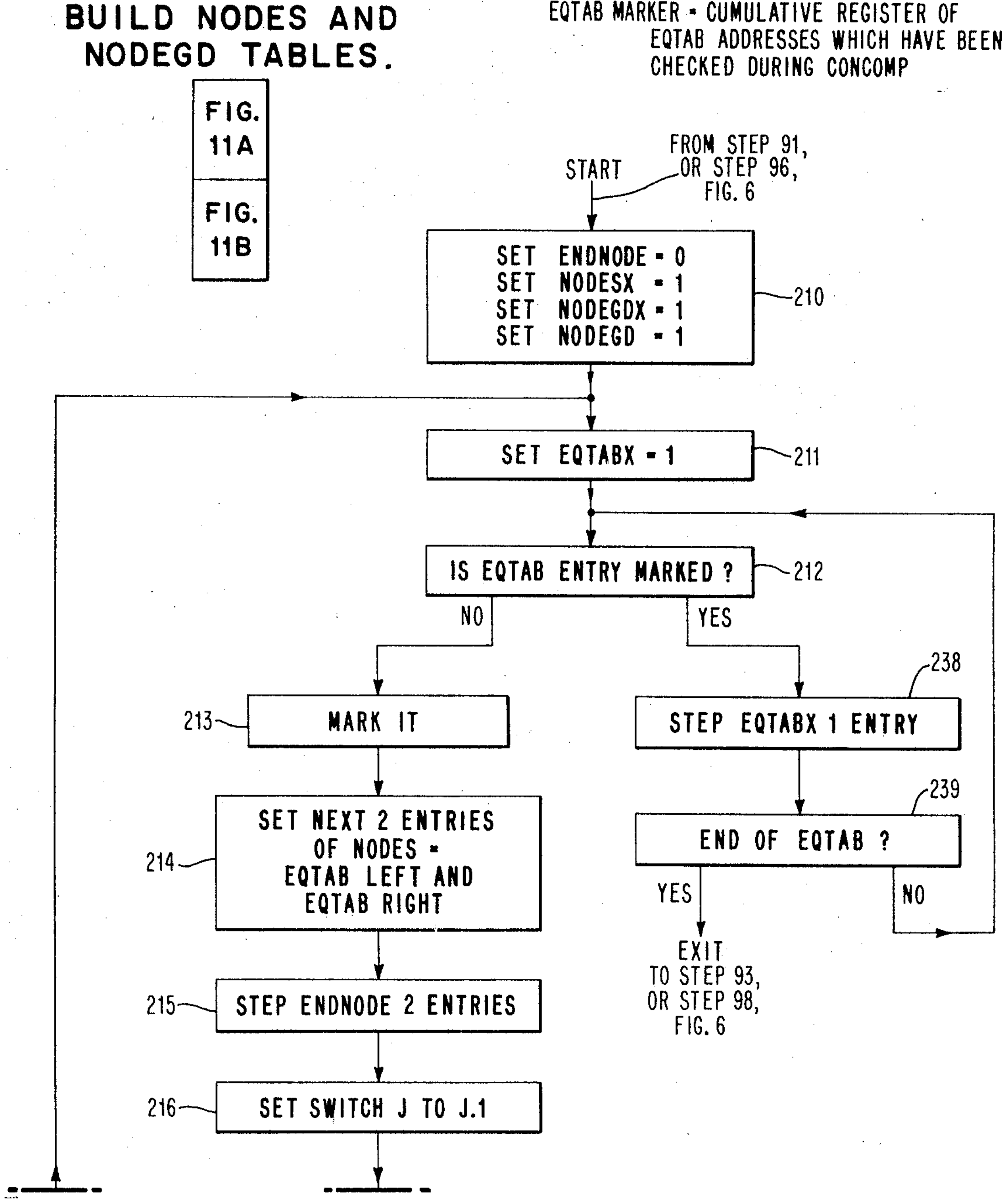

TABLES BUILT BY CONCOMP1 FOR SUBPANEL 11

| NODES1 | | NODEGD1 | |
|---|---|---|---|
| NODESX (ENTRY NO.) | NODES ENTRY | NODEGDX (ENTRY NO.) | NODEGD ENTRY |
| 0 | 0 | 0 | 0 |
| 1 | 2 | 1 | 2 |
| 2 | 1 | | |

FIG. 16

| EQTAB MARKER | EQTAB | | |
|---|---|---|---|
| | EQTABX | EQTAB ENTRY LEFT | EQTAB ENTRY RIGHT |
| 1 | 1 | A | C |
| | 2 | B | D |
| 1 | 3 | C | E |

| ENDNODE | NODES | | |
|---|---|---|---|
| | NODESX | NODES ENTRY | NODES MARKER |
| | 1 | A | 1 |
| | 2 | C | 1 |
| 3 | 3 | E | 1 |
| | | | |
| | | | |

| NODEGD | |
|---|---|
| NODEGDX | NODEGD ENTRY |
| 1 | 3 |
| 2 | |

FIG. 17

| EQTAB MARKER | EQTAB | | |
|---|---|---|---|
| | EQTABX | EQTAB ENTRY LEFT | EQTAB ENTRY RIGHT |
| 1 | 1 | A | C |
| 1 | 2 | B | D |
| 1 | 3 | C | E |

| ENDNODE | NODES | | |
|---|---|---|---|
| | NODESX | NODES ENTRY | NODES MARKER |
| | 1 | A | 1 |
| | 2 | C | 1 |
| | 3 | E | 1 |
| | 4 | B | 1 |
| 5 | 5 | D | 1 |

| NODEGD | |
|---|---|
| NODEGDX | NODEGD ENTRY |
| 1 | 3 |
| 2 | 5 |

FIG. 18 EQUIVALENCE AND NODES TABLES FOR SUBPANEL 12 (BUILT BY SCAN1 & CONCOMP1)

| EQTAB1 | | |
|---|---|---|
| EQTABX (ENTRY NO.) | EQTAB ENTRY | |
| | LEFT | RIGHT |
| 0 | — | — |
| 1 | 6 | 8 |
| 2 | 8 | 9 |
| 3 | 9 | 10 |
| 4 | 10 | 6 |

| NODES1 | | NODEGD1 | |
|---|---|---|---|
| NODESX (ENTRY NO.) | NODES ENTRY | NODEGDX (ENTRY NO.) | NODEGD ENTRY |
| 0 | 0 | 0 | 0 |
| 1 | 6 | 1 | 5 |
| 2 | 8 | | |
| 3 | 10 | | |
| 4 | 9 | | |
| 5 | 9 | | |

FIG. 19 EQUIVALENCE AND NODES TABLES FOR SUBPANEL 21

| EQTAB1 | | |
|---|---|---|
| EQTABX | EQTAB ENTRY | |
| | LEFT | RIGHT |
| 0 | — | — |
| 1 | 14 | 12 |

| NODES1 | | NODEGD1 | |
|---|---|---|---|
| NODESX | NODES ENTRY | NODEGDX | NODEGD ENTRY |
| 0 | 0 | 0 | 0 |
| 1 | 14 | 1 | 2 |
| 2 | 12 | | |

FIG. 20 EQUIVALENCE AND NODES TABLES FOR SUBPANEL 22

| EQTAB1 | | |
|---|---|---|
| EQTABX | EQTAB ENTRY | |
| | LEFT | RIGHT |
| 0 | — | — |
| 1 | 18 | 19 |
| 2 | 17 | 21 |
| 3 | 21 | 22 |
| 4 | 22 | 20 |

| NODES1 | | NODEGD1 | |
|---|---|---|---|
| NODESX | NODES ENTRY | NODEGDX | NODEGD |
| 0 | 0 | 0 | 0 |
| 1 | 18 | 1 | 2 |
| 2 | 19 | 2 | 6 |
| 3 | 17 | | |
| 4 | 21 | | |
| 5 | 22 | | |
| 6 | 20 | | |

FIG. 21A
RIPPLE
APPLY EQUIVALENCES TO SCAN TABLE(S)
FIG. 21
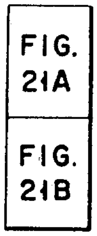
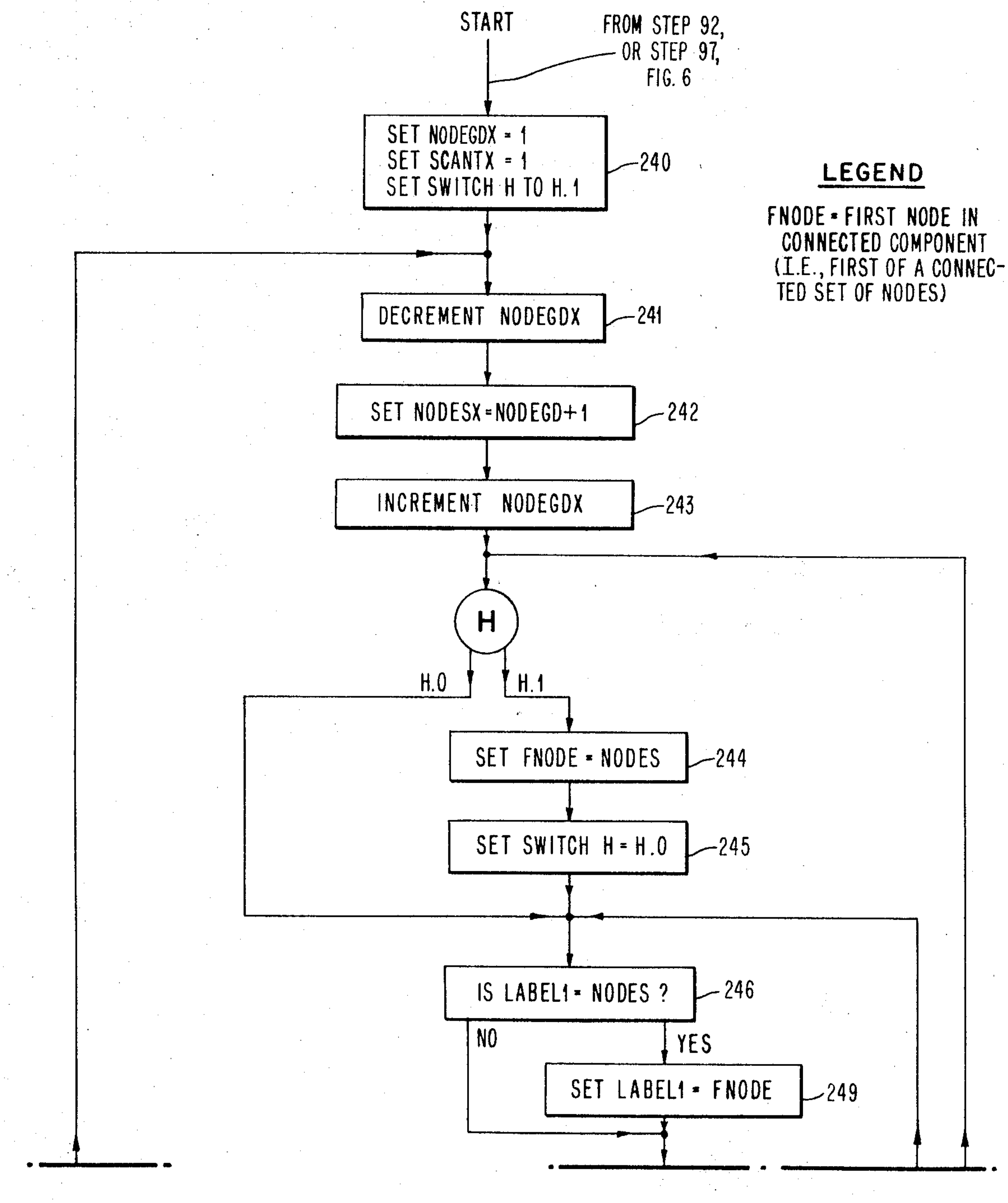

FIG. 22

EFFECT OF RIPPLE1 UPON SCANT (SUBPANEL 11)

| SCANTX | ZLENG | LABEL1 |
|---|---|---|
| 0 | 10 | FFFF |
| 1 | 1 | 2 |
| 2 | 2 | FFFF |
| 3 | 7 | 2 |
| 4 | 1 | 2 |
| 5 | 1 | FFFF |
| 6 | 1 | 3 |
| 7 | 1 | FFFF |
| 8 | 6 | 2 |
| 9 | 1 | 2 |
| 10 | 1 | FFFF |
| 11 | 2 | 3 |
| 12 | 1 | FFFF |
| 13 | 5 | 2 |
| 14 | 1 | 2 |
| 15 | 1 | FFFF |
| 16 | 3 | 3 |
| 17 | 1 | FFFF |
| 18 | 4 | 2 |
| 19 | 1 | 2 |
| 20 | 6 | FFFF |
| 21 | 3 | 2 |
| 22 | 10 | 2 |
| 23 | 10 | 2 |
| 24 | 1 | 2 |
| 25 | 4 | FFFF |
| 26 | 2 | 2 |
| 27 | 3 | FFFF |
| 28 | 1 | 2 |
| 29 | 1 | FFFF |
| 30 | 2 | 4 |
| 31 | 1 | FFFF |
| 32 | 2 | 2 |
| 33 | 1 | FFFF |
| 34 | 2 | 5 |
| 35 | 1 | 2 |
| 36 | 1 | FFFF |
| 37 | 2 | 4 |
| 38 | 1 | FFFF |
| 39 | 2 | 2 |
| 40 | 1 | FFFF |
| 41 | 2 | 5 |

RIPPLE1

| EQTAB2 | | |
|---|---|---|
| EQTABX | EQTAB ENTRY | |
| | LEFT | RIGHT |
| 1 | B | D |
| 2 | C | E |

FIG. 28

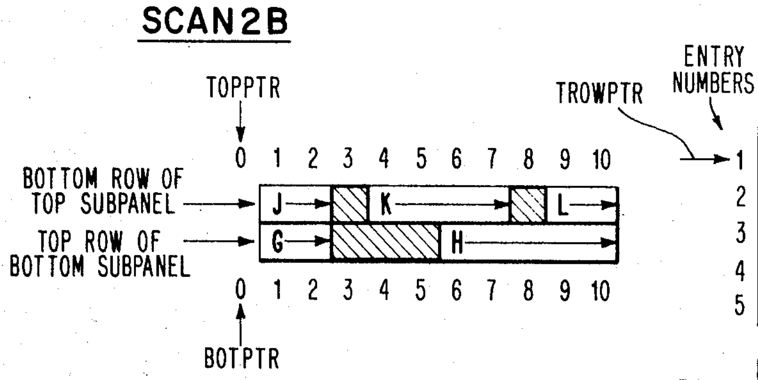

ENTRY NUMBERS

| ENTRY NUMBERS | TMATCHBUF SCANT ENTRIES | |
|---|---|---|
| | ZLENG | LABEL1 |
| TROWPTR → 1 | 2 | J |
| 2 | 1 | FFFF |
| 3 | 4 | K |
| 4 | 1 | FFFF |
| 5 | 2 | L |

| EQTAB2 | | |
|---|---|---|
| EQTABX | EQTAB LEFT | EQTAB RIGHT |
| a* | G | J |
| a +1 | H | K |
| a +2 | H | L |

*a = STARTING ADDRESS FOR SCAN2B

| ENTRY NUMBERS | BMATCHBUF SCANT ENTRIES | |
|---|---|---|
| | ZLENG | LABEL1 |
| BROWPTR → 1 | 2 | G |
| 2 | 3 | FFFF |
| 3 | 5 | H |

FIG. 29

TABLES BUILT BY SCAN2A, SCAN2B AND CONCOMP2

| EQTAB2 | | |
|---|---|---|
| EQTABX | EQTAB ENTRY LEFT | EQTAB ENTRY RIGHT |
| 0 | — | — |
| 1 | 2 | 6 |
| 2 | 5 | 11 |
| 3 | 15 | 16 |
| 4 | 14 | 17 |
| 5 | 2 | 14 |
| 6 | 4 | 13 |
| 7 | 2 | 14 |
| 8 | 5 | 15 |
| 9 | 11 | 16 |
| 10 | 6 | 17 |

ENTRIES 1-4 BUILT BY SCAN2A
ENTRIES 5-10 BUILT BY SCAN2B
(EXAMPLE IN FIG. 23)

| NODES2 | | NODEGD2 | |
|---|---|---|---|
| NODESX | NODES ENTRY | NODEGDX | NODEGD ENTRY |
| 0 | 0 | 0 | 0 |
| 1 | 2 | 1 | 6 |
| 2 | 6 | 2 | 11 |
| 3 | 14 | 3 | 13 |
| 4 | 14 | | |
| 5 | 17 | | |
| 6 | 17 | | |
| 7 | 5 | | |
| 8 | 11 | | |
| 9 | 15 | | |
| 10 | 16 | | |
| 11 | 16 | | |
| 12 | 4 | | |
| 13 | 13 | | |

RIPPLE2

LABEL AREAS

Patented Feb. 22, 1972 3,644,935

39 Sheets-Sheet 31

LABEL AREAS

CALCULATE AREA OF A REGION

MODIFIED PATTERN

MODIFIED PATTERN OUTLINE REPRESENTATION

SCAN1 AS PERFORMED UPON MODIFIED SUBPANEL 11

RIPPLE1
AS PERFORMED UPON
MODIFIED SUBPANEL 11

| EQTAB2 | | |
|---|---|---|
| EQTABX | EQTAB ENTRY | |
| | LEFT | RIGHT |
| 0 | — | — |
| 1 | 2 | 6 |
| 2 | 5 | 11 |
| 3 | 15 | 16 |
| 4 | 14 | 17 |
| 5 | 2 | 14 |
| 6 | 4 | 13 |
| 7 | 2 | 14 |
| 8 | 5 | 15 |
| 9 | 11 | 16 |
| 10 | 6 | 17 |
| 11 | 24 | 2 |
| 12 | 25 | 5 |
| 13 | 23 | 2 |
| 14 | 25 | 4 |
| 15 | 25 | 5 |

FIG. 38

EQTAB2 AS MODIFIED BY SUPPLEMENTARY SCAN2A AND SCAN2B OPERATIONS PERFORMED ALONG ALTERED SEAMS ONLY

| NODES2 | | NODEGD2 | |
|---|---|---|---|
| NODESX | NODES ENTRY | NODEGDX | NODEGD ENTRY |
| 0 | 0 | 0 | 0 |
| 1 | 2 | 1 | 8 |
| 2 | 6 | 2 | 17 |
| 3 | 14 | | |
| 4 | 14 | | |
| 5 | 24 | | |
| 6 | 23 | | |
| 7 | 17 | | |
| 8 | 17 | | |
| 9 | 5 | | |
| 10 | 11 | | |
| 11 | 15 | | |
| 12 | 25 | | |
| 13 | 25 | | |
| 14 | 16 | | |
| 15 | 16 | | |
| 16 | 4 | | |
| 17 | 13 | | |

FIG. 39

NODES2 AND NODEGD2 AFTER CONCOMP2 OPERATION PERFORMED UPON MODIFIED EQTAB2

RIPPLE2
MODIFIED PANEL

METHOD OF IDENTIFYING CONNECTED REGIONS IN A LARGE SEGMENTED PATTERN

BACKGROUND OF THE INVENTION

During the performance of interactive graphical operations, there may be many occasions when it is desired to have a computer identify and label various regions or components of a pattern which are bounded by closed curves or outlines having arbitrary configurations and placement. In designing textile weaves with the aid of a computer, for example, the respective regions of the design into which different weave patterns are to be inserted must be separately identified so that they can be dealt with as unique entities by the computer. Each of these arbitrarily bounded regions, as well as the area exclusive of such regions (which may be considered to constitute a separate region having as its outer boundary the border of the scanning field or other pattern area within which the several regions are located), may itself comprise a collection of smaller units or parts assembled within the same regional boundary. An example of this would be a plurality of contiguous rows of data cells or bit positions in which binary information relating to the regional configuration can be placed. Each row zone within the region (the term "row zone" in this context being broad enough to denote a confined segment of a longer row extending through several regions) begins at one point on the regional boundary and terminates at another point on that boundary. These row zones collectively define the region.

Obviously if these constituent parts of a region are to be recognized as belonging to the same regional entity, they must have some definable quality of correspondence or affiliation which indicates that they may properly be connected together by a graphical data-assembling process to form the region under consideration. This quality of affiliation herein will be given the name "connectedness," the usefulness of this terminology becoming more apparent as the description proceeds. One may wish to establish or determine the connectedness of subregional units for several reasons. For instance, it may be desired to apply a single identifying label or symbol to the region, and to do this one must avoid separately labeling the individual parts of that region, or if those parts are already individually labeled, then one must somehow establish that these local labels are equivalent or subordinate to the regional label, so that whenever a region is addressed by its label, all of its subregions will automatically be addressed by that same label. Assume, for example, that a region has an outline in the shape of a human hand. If, in the course of an initial analysis, labels have been separately applied to the palm and finger areas of the region, the finger area labels should be equated or recognized as equivalent to the palm area label, so that addressing the palm will also automatically address all of the connected fingers.

Hereinafter when reference is made to a "connected region" or "connected component," or simply to a "region" or "component," this will denote an area within which all of the contained parts are logically connectable to each other. A technique already has been developed for enabling a graphic data processing system to determine the connectedness of subregions e.g., row segments or "zones") in regions that are located within a single scanning field, such technique being disclosed in the copending patent application of Janice R. Lourie, Ser. No. 662,621, filed Aug. 23, 1967, now U.S. Pat. No. 3,529,298 entitled "Graphical Design of Textiles." In practice, however, one may encounter situations where the entire pattern is too large to be accommodated within a single scanning field, and it must be divided into geometric segments or subpanels that can be separately scanned and analyzed by the graphic data processing system. This introduces a special problem, because ordinarily the border of a scanning field is treated as one of the regional boundaries for labeling purposes, but if so treated, this border would appear to divide into separate regions those parts of a truly unitary region that may be located within different segments or subpanels of the large pattern.

SUMMARY OF THE INVENTION

The present invention is directed to the problem of establishing true connectedness among subregions which lie within different segments or subpanels of a given panel containing a large outline pattern, where each of these subregions appears to be bounded be a segmental border line that does not constitute a true regional boundary. In such circumstances, the invention automatically determines true connectedness among subregions despite any appearances which may tend to obscure or contradict that fact. A data processing system of this character has potential application to several industrial technologies. Although it is described herein particularly with reference to decorative fabric manufacture, it can find use in many arts where the accurate matching of pattern configurations or graphical designs is required.

Connectedness among the various parts of the same region, whether such parts are located in the same subpanel or in different subpanels, is established by a process which includes the following procedural steps, arranged below in the order of their execution:

SCAN1: Scan each subpanel to determine which of the row zones contained within that subpanel lie within each bounded region or pattern component. Construct a scan table (SCANT) for each subpanel, said table assigning zone labels to all zones scanned. Establish zone equivalencies where necessary (i.e., wherever "zone merges" occur) in a first-level equivalence table (EQTAB1) which is individual to the respective subpanel.

CONCOMP1: For each subpanel, establish a first-level table of nodes (NODES1) which associates all zone labels belonging to each region or component within that subpanel (if more than one label has been assigned thereto by SCAN1), using the information stored in EQTAB1.

RIPPLE1: In the scan table of each subpanel, convert differing zone labels (if any) belonging to the same region or portion thereof lying within that subpanel into a common label for that region or portion thereof, using the information stored in NODES1.

SCAN2A: Match the subpanels along their vertical "seams" or border lines to establish zone equivalencies across these borders. Where portions of the same region are found to border upon each other in different subpanels, enter their respective zone labels into a second-level equivalence table (EQTAB2) which relates to the panel as a whole.

SCAN2B: Perform a similar matching operation along the horizontal "seams" or border lines of the subpanels and complete the construction of EQTAB2 for the whole panel.

CONCOMP2: Establish a second-level table of nodes (NODES2) for the entire panel, associating with each other all zone labels belonging to each region, wherever more than one such label has been assigned to a region.

RIPPLE2: In the scan table of each subpanel, convert differing zone labels (if any) belonging to the same region into a universal label which applies to all parts of that region throughout the entire panel, using the information contained in NODES2.

Obviously the foregoing process could be extended to still higher levels of panel hierarchies if desired. After the final relabeling has been accomplished in all subpanel scan tables, the universal area label for each region may be read out and displayed at the desired place on the outline pattern. Each of these labels identifies its particular region as a whole, and it also represents the totality of coordinate grid points or bit positions located within that region, as well as the various zones therein. Hence, by using the label as an address symbol, one can have access to all the bit positions within the designated region for any desired purpose (such as, for example, to insert a selected bit pattern therein for display purposes, as may be done in weave designing). Furthermore, by accumulating the zone lengths identified by a particular label, one may measure the area of the respective region.

If it should be necessary to modify the pattern and change some of the regional boundaries therein, the process outlined above need be repeated only for those subpanels and borders thereof that are affected by the change. The new data will be automatically assimilated with the old unchanged data.

One feature of the present scan technique which gives it unusual flexibility is the ability to analyze as many as four bits at a time, representing a subset of contiguous rectangles in the coordinate grid, to determine the applicable zone identities from the distribution of border bits and/or space bits in such a subset. This method of analysis greatly facilitates the identification of zones belonging to the same region, as will become apparent from the following description.

The foregoing and other objects, features and advantages of the invention will be apparent from the following more particular description of a preferred embodiment of the invention, as illustrated in the accompanying drawings.

DESCRIPTION OF THE DRAWINGS

FIG. 8 represents a typical set of tables built up by the SCAN1 operation for a given subpanel.

FIGS. 11A and 11B, when assembled as indicated by FIG. 11, constitute a flow chart of a CONCOMP routine which can be performed during either a first-level or second-level phase of the disclosed process, this chart being equally applicable to the CONCOMP1 routine or CONCOMP2 routine shown in FIG. 6.

FIG. 12 represents a typical set of tables built by the CONCOMP1 routine of FIGS. 11A and 11B.

FIGS. 13–17 illustrate in detail, with reference to an alternative example, the manner in which an equivalence table (EQTAB) and a NODES table may be constructed by the SCAN1 and CONCOMP1 routines.

FIGS. 18, 19 and 20, respectively, represent EQTAB1 and NODES1 tables for various subpanels of the pattern shown in FIGS. 4 and 5.

FIGS. 21A and 21B, when assembled as indicated by FIG. 21, represent a RIPPLE routine that may be performed on a first level as RIPPLE1 and on a second level as RIPPLE2, as indicated in FIG. 6.

FIG. 22 is a table which represents the application of the RIPPLE1 routine to the scan table shown in FIG. 8.

FIG. 28 is a set of diagrams which, illustrate with reference to an alternative example, the manner in which the SCAN2B routine functions along a horizontal subpanel border ("-horizontal" meaning parallel with the rows).

FIG. 29 represents the second level equivalence table and second level nodes table (EQTAB2 and NODES2) built by the SCAN2A, SCAN2B and CONCOMP2 routines with reference to the particular example shown in FIG. 23.

FIGS. 34–41 illustrate the principal steps which are involved in performing a supplemental pattern-analyzing operation after a portion of the original pattern (FIG. 3) has been modified.

DETAILED DESCRIPTION

The exemplary form of the invention herein disclosed is addressed to the problem of automatically analyzing an outline pattern into its constituent bounded regions or components, where the pattern is of such large size that it must be processed in segments whose respective borders may, in some instances, cross the boundary lines of certain regions. During the processing of each of these pattern segments, unique designations or labels are to be applied automatically to the respective regions and portions of regions contained therein, and whenever a region has a boundary line that crosses the border or borders of two or more adjoining segments, the "-connectedness" or common identity among the differently labeled parts of the same region located in the respective pattern segments is to be established.

Figure 1:
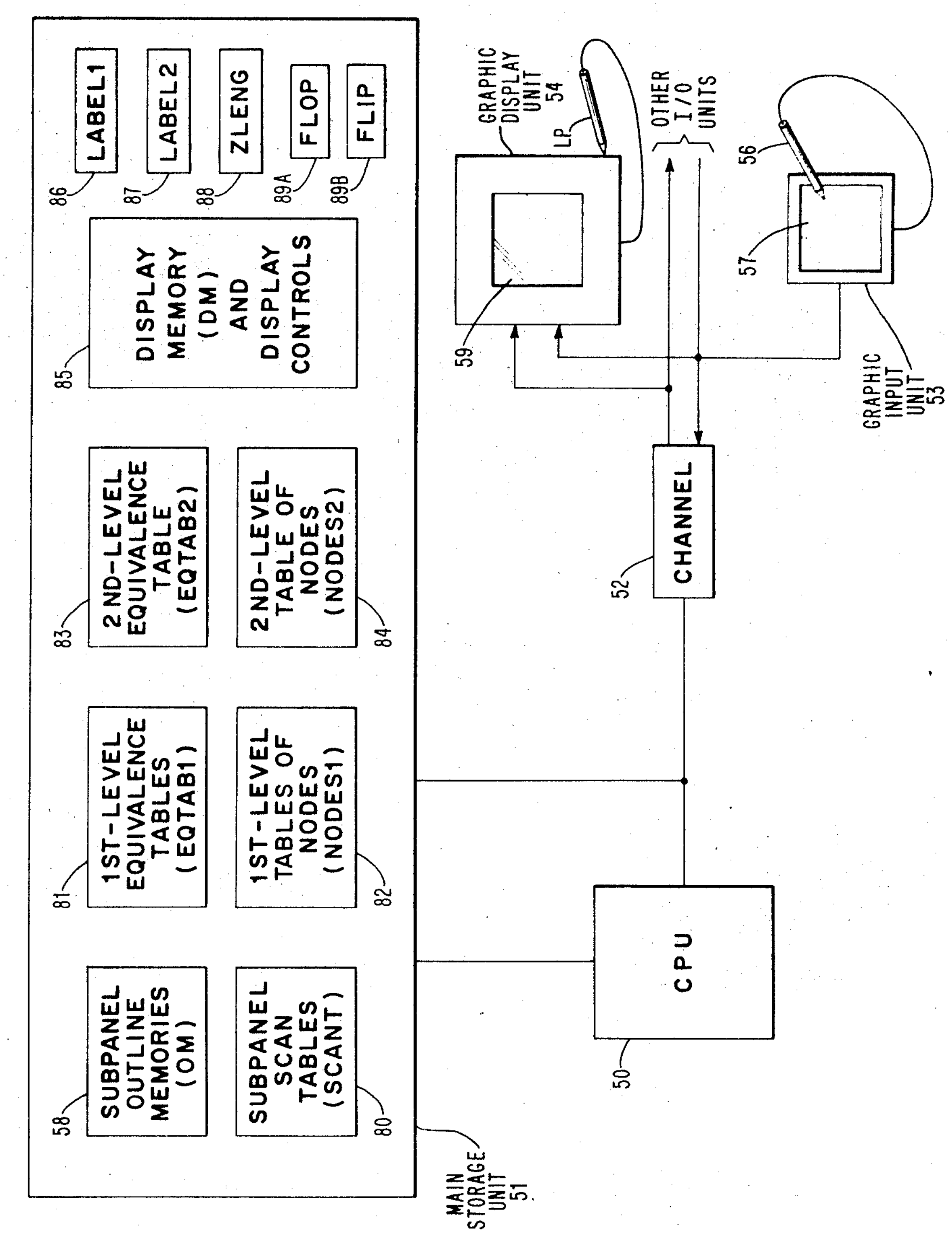
FIG. 1 is a block diagram indicating in a very general way the organization of a data processing system which is capable of carrying out the present method.

Although not restricted to such use, the invention can best be visualized in its application to an interactive data processing system of the kind shown schematically in FIG. 1. A central processing unit (CPU) 50 and a main storage unit 51 communicate through a channel 52 with various input-output units such as a graphic input unit 53 and a graphic display unit 54. The input unit 53 is a well-known type of electric writing tablet having a contact member 56 in the form of a writing implement or "pen" that cooperates with a flat writing surface 57, beneath which is disposed a very fine mesh grid of coordinate wires. The operator uses the pen 56 to draw an outline pattern on the tablet surface 57, causing signals representing the coordinate positions of the grid points contacted by the pen 57 to be transmitted to certain outline memories (OM), generally designated 58, in the storage unit 51. The lines drawn by the pen 56 on the tablet surface 57 may be displayed on the viewing screen 59 of the display unit 54 through which is viewed the pattern traced on the face of a cathode ray tube under control of the coordinate data generated by the input tablet 53. A light pen LP is associated with the display unit 54 in the usual manner, the use of this pen in pattern-labeling and pattern-modifying operations being described hereinafter.

The resolution of the display unit 54, when operating in a mode which permits modification of the display by the light pen LP, is very coarse in comparison with that of the input tablet 53, and in order that a pattern drawn upon the tablet 53 may be displayed by the unit 54 under such conditions, it usually is necessary to divide the pattern into segments and display it a segment at a time on the screen 59. For example, a commercially available tablet has a coordinate grid with 1,000 positions on each side, or a total of 1 million coordinate grid points. A graphic display unit 54, on the other hand, would typically permit a coordinate grid with only 40 positions on a side (or a total of 1,600 grid points) when operating in "modify" mode. Hence, it would take 625 screens such as 59 to display completely the pattern drawn upon the tablet surface 57. Alternatively, the 1000×1000 matrix upon which the pattern is drawn could be treated as 625 submatrices of a 40×40 size, each containing a pattern segment small enough to be displayed upon the screen 59. The operator is then able to see on the screen 59, at any one time, a tracing of any of the 625 segments in his pattern. In practice, he may prefer to design just a few pattern segments at a time, without attempting to draw the entire pattern at once, this being the usual case.

Figure 2:
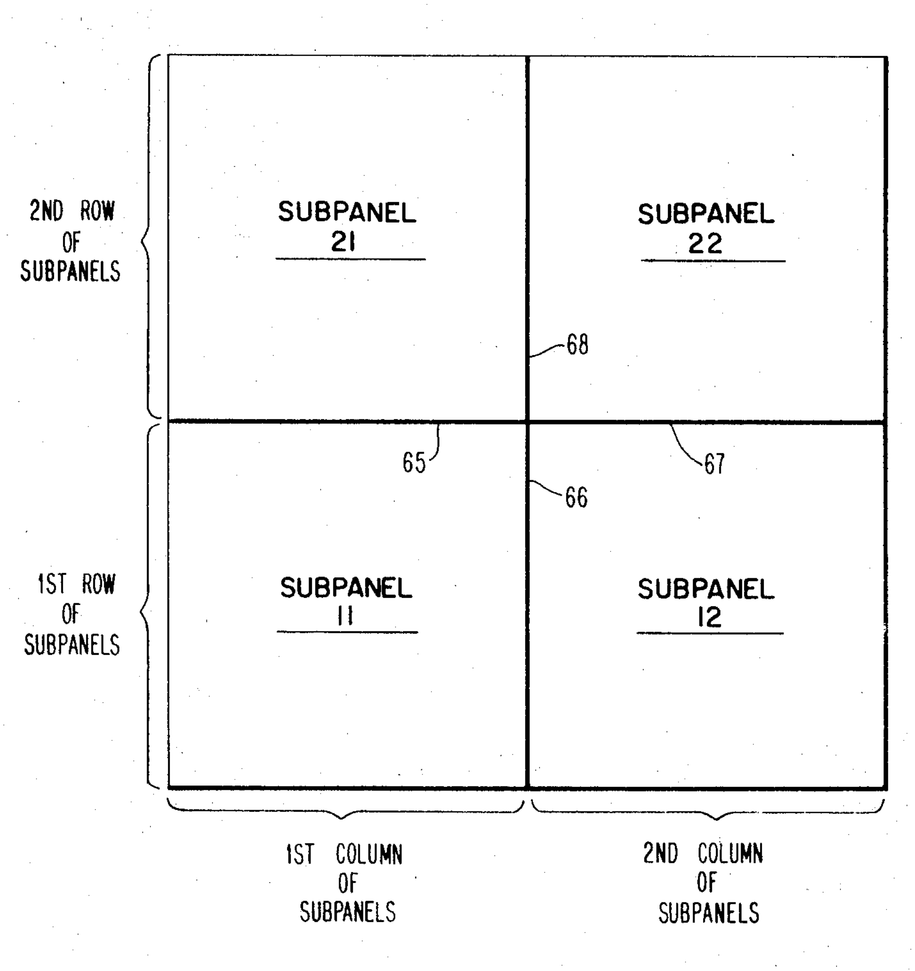
FIG. 2 is a diagram of a primary panel divided into subpanels, this figure being merely illustrative of the manner in which one may subdivide a panel which is to contain the pattern to be analyzed.

For convenience, the area within which the original outline pattern is drawn, herein referred to as the "primary panel," is for present illustrative purposes assumed to be divided by border lines 65, 66, 67 and 68 into four subpanels, as shown in FIG. 2, each of these subpanels being designated according to the row and column of subpanels within which it is located. For instance, subpanel 21 is in the second row and the first column of these subpanels. One may conceive of a hierarchy in which these primary panels are organized into still higher level panels. To simplify the present showing, however, only two levels of panels are considered, these being adequate to explain the principle of the invention.

Figure 3:
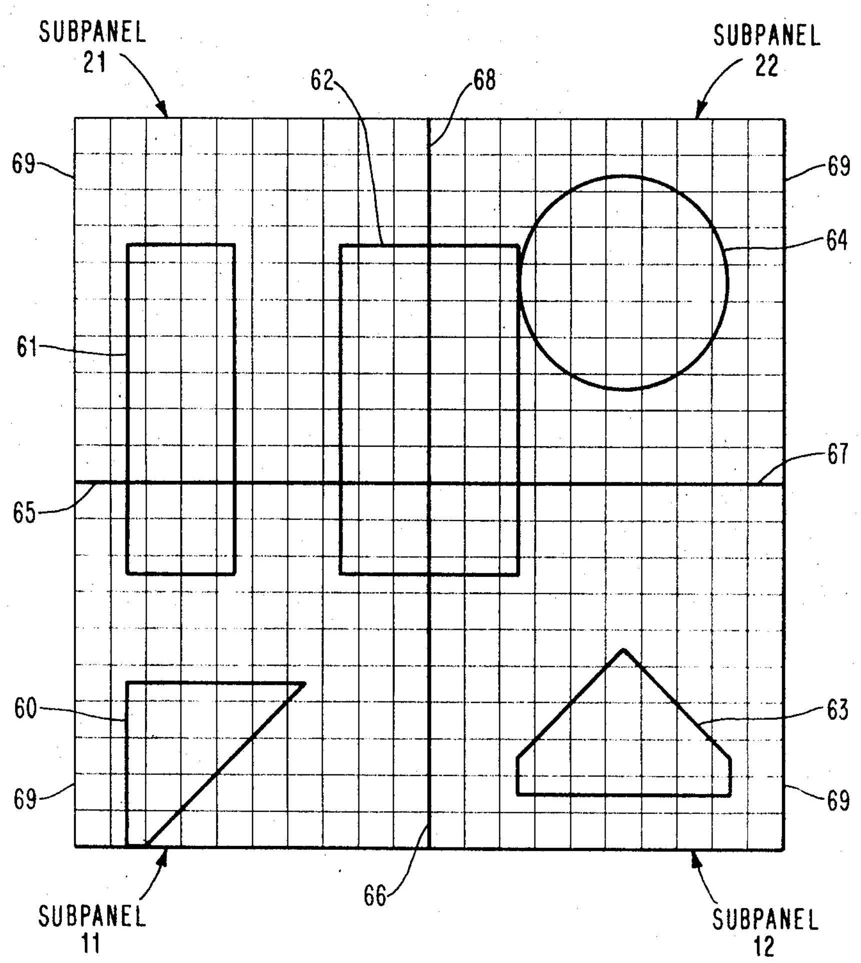
FIG. 3 is a diagrammatic representation of a panel such as shown in FIG. 2, on which there is superimposed a coordinate grid of rows and columns and an illustrative pattern which is to be analyzed.

FIG. 3 represents the primary panel of FIG. 2 with a coordinate grid and an arbitrary outline pattern placed thereon. For present purposes, it will be assumed that the primary panel has a 20×20 matrix of coordinate grid positions divided into four 10×10 subpanel matrices or "submatrices." If the outside border 69 of the primary panel is considered as a boundary line, it is possible to identify six bounded regions in the outline pattern, FIG. 3. Thus, five of these regions are bounded by the lines 60, 61, 62, 63, and 64, and the sixth region consists of the background area exclusive of the five regions just mentioned, which background area is bounded by the outer border 69 of the primary panel. Bounded regions do not intersect one another; that is to say, each region has its own unique set of coordinate grid points enclosed within its boundary, which it does not share with any other region. Stating this another way, regional boundaries do not cross one another. If, in an artistic sense, two regions would appear to overlap and have a common area between them, the common area is herein treated as a separate bounded region for the purpose of graphic analysis. A regional boundary line is permitted, however, to cross the border between any two adjoining subpanels. Thus, for instance, the regional boundary line 61, FIG. 3, crosses the border 65 between subpanels 11 and 21, while the regional boundary line 62 crosses all of the borders 65 to 68 between the subpanels. The regional boundary lines 60, 63, and 64 do not cross any subpanel borders, each of these boundary lines being contained entirely within its respective subpanel.

Figure 32:
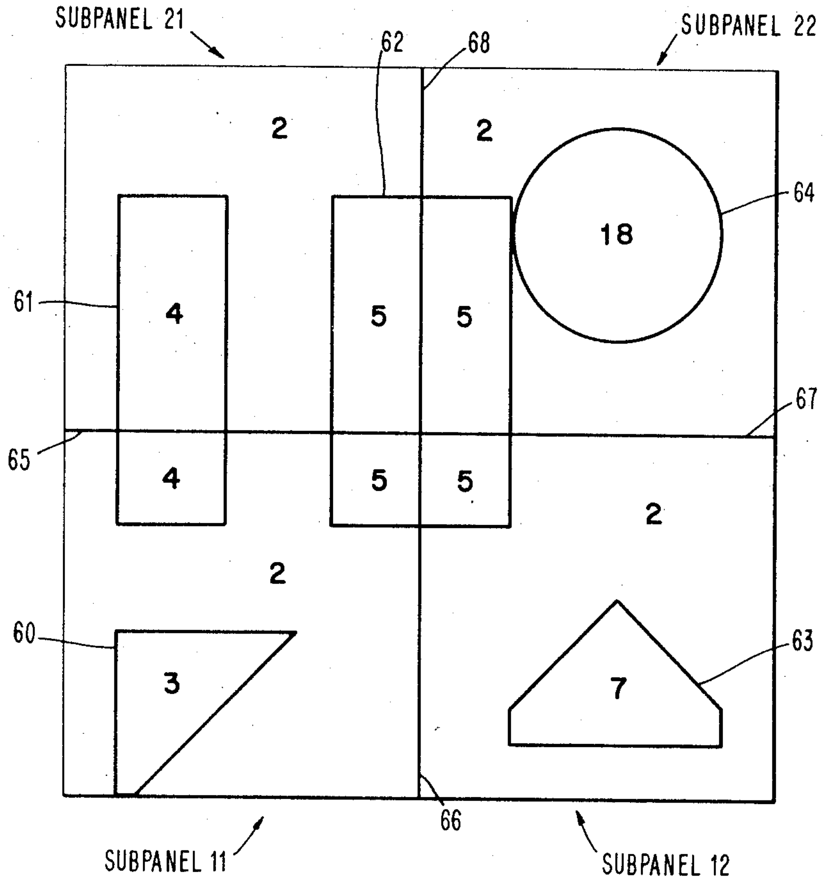
FIG. 32 represents the labeled areas or regions.

A very important object of the present invention is to enable a segmented pattern such as the one shown in FIG. 3 to be graphically analyzed with the aid of a data processing system for the purpose of identifying connected regions whose boundaries cross the subpanel borders. Because of physical limitations in the analyzing apparatus, it may be necessary to analyze the pattern one subpanel at a time, as noted hereinabove, and at this level of analysis, a portion of a region contained within a given subpanel is treated as though it were a complete region in itself. At a higher level of analysis, however, the connectedness between portions of a region that lie in different subpanels will be established, so that in the final analysis, the region as a whole is identified as being a single entity. This will become more apparent as the description proceeds. The end result of the analytical process described herein is depicted in FIG. 32, wherein each of the regions is assigned a unique label, which label is the same for all parts of that region in all subpanels.

Figure 4:
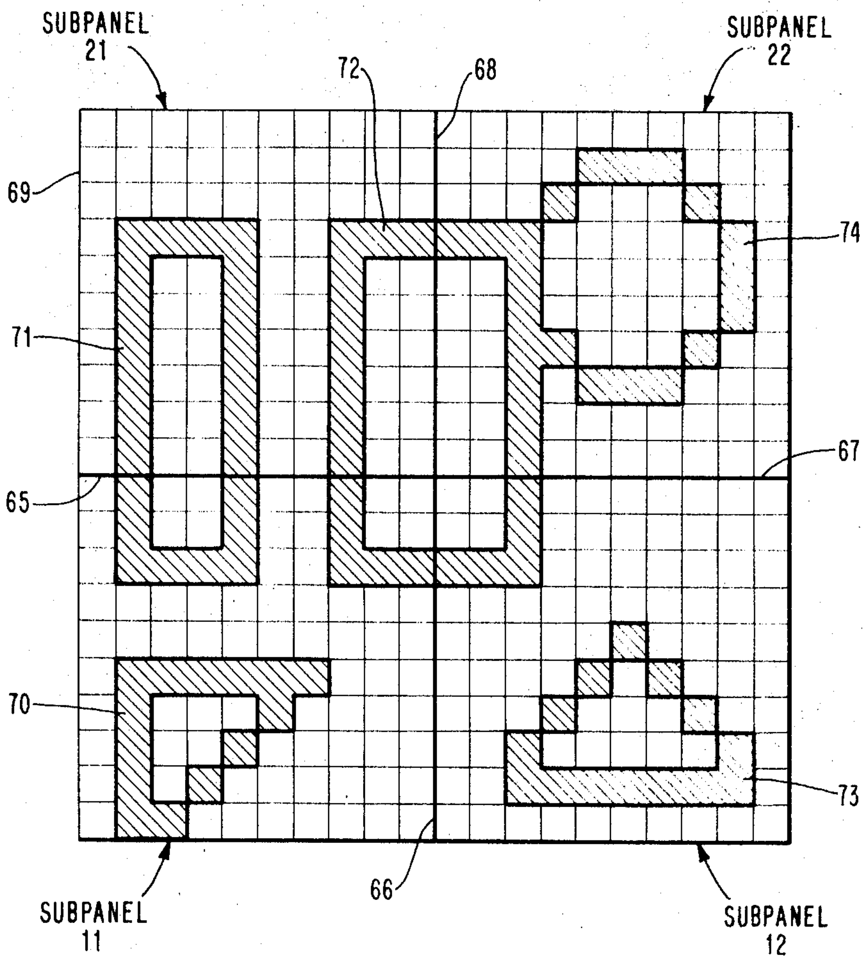
FIG. 4 schematically represents a pattern corresponding to that shown in FIG. 3, with the outlines of the pattern being represented by discrete rectangular bit positions.

FIG. 3 represents the outline pattern as it would be drawn upon a sheet of graph paper where the designer is not constrained to define the boundary lines by points located in predetermined positions. In practice, however, the design ultimately must be represented in a manner as depicted by FIG. 4, wherein the boundary lines of the various regions now are represented by shaded or colored rectangles formed by filling in the small squares of the coordinate grid in those positions which most nearly approximate the respective locations of the regional boundary lines. Thus, the boundary line 60 in FIG. 3 is simulated by the outline figure 70 in FIG. 4, which is formed by shading or filling in those squares of the coordinate grid through which the boundary line 60 passes. In similar fashion, the boundary lines 61–64 inclusive, FIG. 3, are simulated by the outline figures 71–74 inclusive, FIG. 4.

Figure 5:
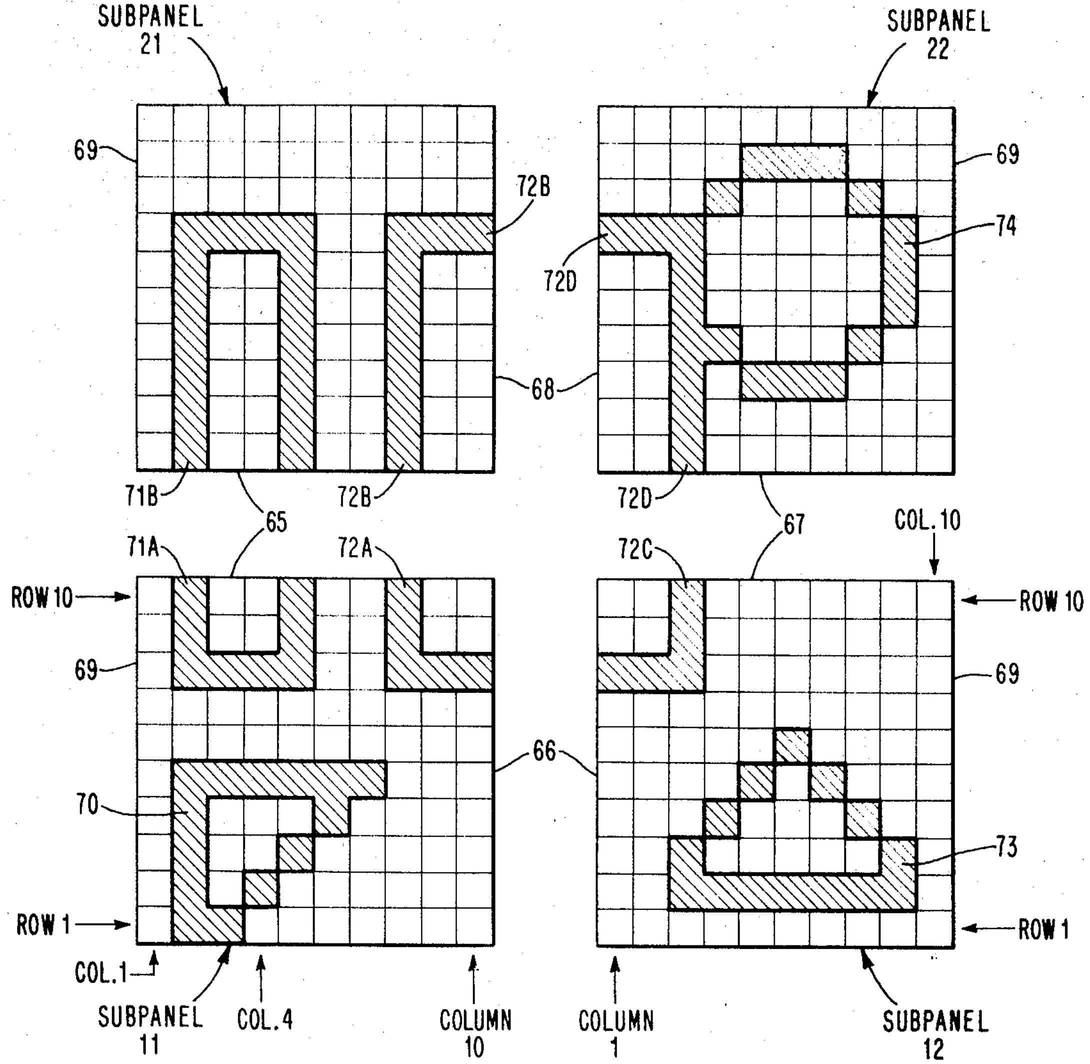
FIG. 5 is a showing similar to FIG. 4 in which the various subpanel units are separated from each other to more clearly delineate their respective borders.

FIG. 5 represents the various subpanel matrices as though they were physically separated from each other, which could in fact be the situation as it actually exists in storage. In this instance, those boundary lines which cross the subpanel borders 65 to 68 are separated into parts that are designated by reference characters such as 71A and 71B, for example, which correspond to the boundary line 71 in FIG. 4. Similarly, the outline figures 72A, 72B, 72C, and 72D, FIG. 5, correspond to the outline 72 in FIG. 4. The subpanels 11, 12, 21, and 22 are processed one at a time, and if any portion of a region is enclosed by a boundary outline such as 71A and a subpanel border such as 65, it is treated as a separate region at the first level of analysis. Then, at a higher level of analysis, a common identity is established between such a region and a corresponding region in a neighboring subpanel (such as that enclosed by the boundary outline 71B and subpanel border 65).

When outline information is entered into any of the subpanel outline memories 58, FIG. 1, it is stored there in discrete bit form. Herein it will be assumed that a "1" bit stored in such a memory symbolically represents a point on the boundary of a region in the outline pattern. The various boundary points also are represented by hatched or shaded squares in FIG. 4. The spaces within each regional boundary are represented by blank squares in FIG. 4 and are also symbolically represented by "0" bits stored within the appropriate outline memory. Thus, to recapitulate, each of the small squares in the coordinate grid or matrix of FIG. 4 represents a bit storage position. Each blank square represents a stored "0" bit, while each of the shaded squares represents a stored "1" bit in the outline memory OM (FIG. 1). Inasmuch as discrete bit storage positions are utilized, the display which is generated by the display unit 54 from the stored outline data will consist of straight line segments extending in horizontal, vertical and diagonal directions, with curved lines being simulated as closely as possible by combinations of such straight line segments. Each stored "1" (shaded square) representing a grid point on the boundary of a region is referred to as a "boundary bit." Each stored "0" (blank square) representing a grid point in the area enclosed by a regional boundary is referred to as a "space bit." The outer border 69 of the primary panel, which also serves as a boundary for the background region, is not simulated by 1 bits, other arrangements being made to treat this border as a regional boundary.

Each "region" or "component" of the outline pattern is considered herein by convention to include only the space enclosed by its boundary, as represented by the space bits or blank grid squares within it. The region is not herein considered to include any of the points on its boundary, although one obviously could include some of these points by adopting a suitable convention for allocating boundary points among the contiguous regions. For present purposes, it is considered satisfactory to assume that a regional boundary line always will be represented by 1's throughout the operation of the system. In the system shown in the aforesaid copending application of J. R. Lourie, Ser. No. 662,621, a boundary line ultimately may be replaced by some of the bits of a bit pattern inserted into the region enclosed thereby. This mode of operation is optional.

The operation of the system has reached a point where the boundary information (FIG. 5) has been stored in the outline memories 58 for the respective subpanels, FIG. 1. In the present example, it will be assumed that the operator, working with the input unit 53, has completed preparation of all segments (i.e., all subpanels) of the design. Alternatively, it may be assumed that the operator has completed those subpanels that are to be designed for the present and now wishes to analyze these as a panel. If additional panels are to be joined later, this can be accomplished by an extension of the procedures herein described. From this point on, the system will be utilized for automatically analyzing the outline pattern into its components, the operation being conducted first at the subpanel level and then at the higher panel level.

In the course of the various operations performed by the system, certain portions of the main storage unit 51, FIG. 1, are allocated to certain memory functions. It has been mentioned already that some parts of the storage unit 51 function as outline memories (OM's) 58. Other parts are utilized to store tables and other data of various kinds, these being designated by the reference numbers 80 to 89B in FIG. 1. The respective functions of the various scan tables, equivalence tables and tables of nodes will be explained in detail as the description of operation proceeds. The display memory (DM) and display controls 85 perform the usual function of storing data and control information for the graphic display unit 54. The functions of the storage units 86–89B will be explained hereinafter. Other elements of the storage unit 51 are not specifically indicated in FIG. 1, but it can be assumed that they are included therein.

Figure 6:
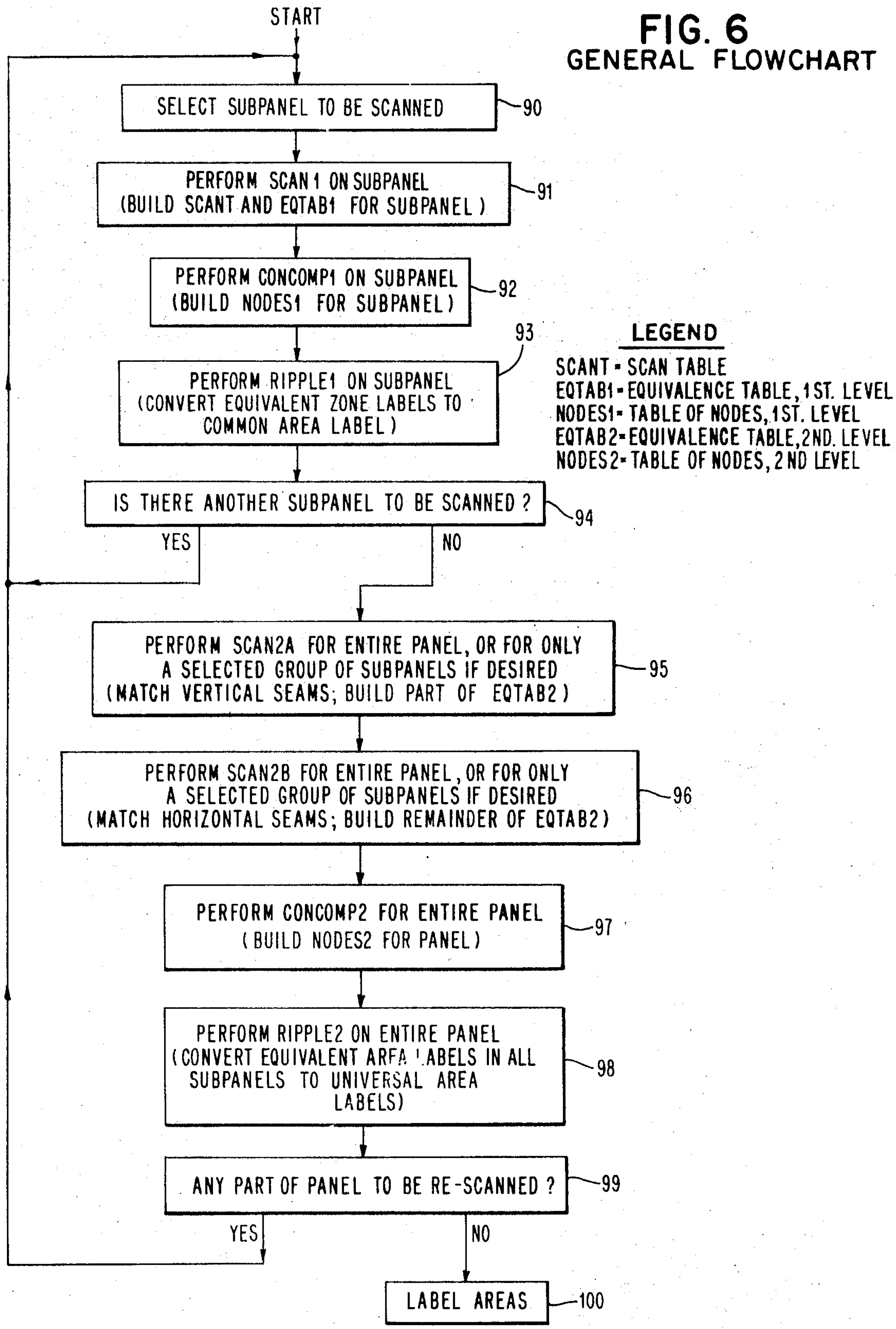
FIG. 6 is a general flow chart of a process for analyzing a large segmented pattern to identify the various connected regions therein according to the invention.

FIG. 6 is a general flow chart of the procedure followed for analyzing into its regional components a pattern such as shown in FIG. 4, which is assumed to be represented by 1 and 0 bits stored in the subpanel outline memories OM. This general procedure can be carried out by a suitably programmed general purpose computer or, alternatively, by a computer specially designed to perform the indicated functions. Only those portions of this procedure which are pertinent to the invention are referred to in FIG. 6, other auxiliary functions being obvious to those skilled in the art. It is assumed that the operator initially will designate the order in which the subpanels are to be analyzed, or alternatively, an arbitrary order of selection will be set up beforehand. The procedure followed herein requires that each subpanel in the chosen series of subpanels be "scanned," the nature of this scanning process being explained in detail presently. As a first step, therefore, the system selects a subpanel to be scanned as indicated at step 90 in FIG. 6. At step 91, an operation known as "SCAN1" is performed on the selected subpanel for the purpose of building a scan table (SCANT) and a first-level equivalence table (EQTAB1) for that subpanel. These tables are stored in portions 80 and 81 of the main storage unit 51, FIG. 1 which are allocated to such purposes. The nature and function of the scan table and equivalence table will be explained more fully hereinafter. Briefly, the scan table contains a listing of the row segments or "zones" which are included within each bounded region or portion of a bounded region located within the subpanel currently being scanned. The equivalence table matches or associates differently numbered zones which actually belong to the same connected region or component of the pattern.

The next step in the general procedure, numbered 92 in FIG. 6, is to build a first-level table of "nodes" (NODES1) based upon information in the equivalence table, this nodes table identifying those zones (i.e., nodes) which belong to each region or portion of a region contained within the current subpanel. NODES1 is developed by an operation called "CONCOMP1," which is a first-level netting operation for determining the connected components in a subpanel, and it is stored in memory 82, FIG. 1.

The next step 93 involves a "RIPPLE1" operation which converts to a common area label all equivalent zone labels in the scan table for that subpanel (as given by the NODES1 table), so that each region or connected component within that subpanel now is designated by one and only one label in SCANT. For instance, the first zone number in a set of nodes may be chosen as the common area label for that region.

At step 94, FIG. 6, the system ascertains whether or not there is another subpanel in the series to be scanned. If so, the operation returns to step 90. If the last subpanel of the series has been scanned, the operation advances to step 95 at which a second-level scanning operation called "SCAN2A" is performed in order to match or identify corresponding portions of any region whose boundary line crosses a vertical border line such as the border line 66 or 68, FIG. 3 ("vertical" meaning perpendicular to the rows). This operation also is referred to as matching or "stitching" the vertical seams. It may be performed for the entire panel or for only a selected group of subpanels, depending upon various operating conditions as will be explained hereinafter. Equivalences detected during SCAN2A are entered into a second-level equivalence table (EQTAB2), which is stored in memory 83, FIG. 1.

After the vertical seam matching has been completed, the operation advances to step 96, FIG. 6, where the horizontal seam-matching function is performed, this being designated the "SCAN2B" routine. ("Horizontal" refers to a direction parallel with the rows.) During this step, the matching portions of regions whose boundary lines extend across horizontal border lines such as 65 and 67, FIG. 3, are identified. This completes the building up of the second-level equivalence table (EQTAB2), thereby matching or associating the different zone designations in the various subpanels which belong to the same connected region.

From the information in EQTAB2, it is possible to construct a second-level table of nodes (NODES2) for the entire panel or series of subpanels to be analyzed (step 97). The operation for building NODES2 is herein called "CONCOMP2." This second-level table of nodes is stored in a memory 84, FIG. 1, and contains, for each connected component or region that is positioned in more than one subpanel, a set of nodes (i.e., zone numbers) by which the different portions of this region are designated in the various subpanels that it may occupy.

The next step 98 involves the performance of a "RIPPLE2" operation on the entire panel for the purpose of assigning a universal area label to the various scan table entries containing each set of nodes in the NODES2 table. The procedure followed herein is to select the first zone number in the set to represent all of the zones in that region, and a suitable conversion is made in all subpanel scan tables so that the interrelated zones are thenceforth identified by a single zone number in each instance.

At this stage of the operation, all scan tables have been updated to reflect the most recent assignment of area labels to the various zones, and these area labels may be displayed as indicated in FIG. 32, for example. However, before actually proceeding to display the area labels, the system makes an inquiry at step 99, FIG. 6, to determine whether any part of the panel is to be rescanned. This would occur, for example, if the operator wished to change some part of the design, thereby modifying the regional boundaries of the outline pattern so that one or more boundary lines now cross subpanel border lines that they formerly avoided, or avoid borders they formerly crossed. If this is the case, the operation returns to step 90, where the operator selects the subpanel or subpanels to be rescanned. This type of operation will be explained hereinafter. Essentially, it involves repeating the series of steps 90–99, with the first-level processing steps 90–93 and the second-level "seam stitching" steps 95 and 96 being performed only for the group of subpanels affected by the pattern modification.

Assuming that all data processing operations have been performed and there is no portion of the panel left to be rescanned, the operation advances to step 100, which involves displaying the area labels in the regions and portions of regions to which they are assigned (FIG. 32).

An additional routine, to be described hereinafter, also may be performed by the system for calculating the area of each region in the pattern. The number of space bits or blank grid rectangles contained within the boundary of each region measures the area of that region, and the area calculation algorithm takes advantage of that fact.

Having described the general mode of operation of the system, attention now will be given to the specific routines as they are performed with reference to a specific example, namely, the pattern assumed in FIG. 4.

SCAN1
FIGS. 7–10

For present illustrative purposes, it is assumed that each subpanel (FIGS. 4 and 5) has a coordinate grid which divides the subpanel into ten rows and ten columns of bit positions. While such a grid mesh would be too coarse for practical use in applications such as textile weave designing, for instance, it provides a convenient model for explaining the principle of operation without undue complication. The bit positions of this coordinate grid may be occupied by bits of two kinds, namely, "boundary bits," represented by shaded (hatched) grid squares in FIGS. 4 and 5, and "space bits," represented by blank squares. In the corresponding submatrix of the outline memory (OM) which stores the pattern representation for that particular subpanel, each boundary bit is represented by a binary "1," and each space bit is represented by a binary "0." The choice of "1" bits to represent boundary points and "0" bits to represent spaces is, of course, arbitrary.

The stored 1 and 0 bits of a subpanel matrix are successively scanned (i.e., sensed) in a row-by-row fashion, starting with the bottom row, during the first-level scanning operation. The scanning of each row is further assumed to take place from left to right. This type of scan sometimes is described as a "-horizontal raster scan." Scanning does not necessarily have to be performed in this manner in order to carry out the invention, but for convenience such a mode of operation is assumed herein because it is the one most likely to be used in practice and can be readily described.

SCAN1 is a procedure whereby "zone numbers" are initially assigned to the "row zones" of a subpanel for the purpose of building up a scan table (SCANT), FIG. 8, along with a related scan table guide (SCTGD) and a first-level equivalence table (EQTAB1). A "row zone" is any uninterrupted segment of a subpanel row which is occupied by a bit or bits each having a value different than that of the bit (if any) immediately preceding that segment and the bit (if any) immediately succeeding that segment in the same row. For example, referring to FIG. 7 in conjunction with FIGS. 4 and 5, it can be seen that ROW 1 of SUBPANEL 11 contains three zones. The first zone consists of the space bit in the COLUMN 1 bit position (represented by a stored 0 in the corresponding bit storage position of the outline memory OM). Another zone consists of the boundary bits in COLUMNS 2 and 3 of ROW 1 (represented by stored 1's in the corresponding bit storage positions of OM). Still another zone consists of the space bits (i.e., 0 bits) in the COLUMN positions 4 through 10 of ROW 1. Zone numbers, as such, are assigned only to those row zones which are occupied by space bits. Thus, the row zone which consists only of the space bit in COLUMN 1 is numbered "1," and the row zone which consists of the space bits in COLUMNS 4 to 10 is numbered "2." The intervening zone, consisting of the boundary bits in COLUMNS 2 and 3, is differently designated. In constructing the scan table for this subpanel, as explained subsequently herein, all boundary zones will be identified by a common boundary symbol, which differs from the identifying numbers assigned to the space zones.

The number assigned to a row zone during the SCAN1 operation is stored in the scan table (SCANT) which is constructed for that particular subpanel. The building of a scan table, along with its related scan table guide (SCTGD) and equivalence table (EQTAB), will be described presently. The number assigned initially to a zone during this operation may be changed during subsequent operations as zone equivalences are established. It should be noted also that a row zone may consist of an entire undivided row, as in the case of row 6, subpanel 11, for example.

The SCAN1 routine does not necessarily number all of the row zones in consecutive order. The fact that zones of different rows may lie within the same region of the pattern can be detected, and in many instances it is possible to "carry up" a zone number from a preceding row where such identity is found to exist. In other instances, the logical equivalence of two different zone numbers may be recognized by making an appropriate entry in an equivalence table (EQTAB). This, too, will be explained presently.

In analyzing the distribution of space bits and boundary bits within a subpanel to determine the zone numbering, it will be assumed that an imaginary or dummy row of boundary bits (all 1's) is positioned beneath ROW 1. It will be assumed also that an imaginary column of boundary bits is positioned to the left of COLUMN 1. The zone-numbering scheme is based upon a logical technique for analyzing the values of bits in certain contiguous bit positions of the matrix. As an aid to describing this technique, the definitions set forth below will be followed:

"Current bit" is the bit currently being sensed, i.e., the bit being presently considered in the current row.

"Lower bit" is the bit in the same column as the current bit in the next lower row (herein called the "previous row.")

"FLOP" denotes the value of the bit in the position of the current row immediately preceding (i.e., to the left of) the current bit.

"FLIP" denotes the value of the bit in the position of the previous row immediately preceding (i.e., to the left of) the lower bit.

The stored bit values are analyzed in sets. The current bit value, the lower bit value and the FLOP value are analyzed in each instance, and in some instances, the FLIP value also is taken into account. The terms "FLIP" and "FLOP" are not intended to connote functions that necessarily must be performed by hardware flip-flops, since there are known ways of providing such status information by software simulation.

Certain logical rules have been formulated for determining whether a previously assigned zone designation may be applied to a current bit or whether a new zone designation must be applied thereto, according to the relationship of the bit values just mentioned. These rules are embodied in Table I below, wherein 1" is a boundary bit and "0" a space bit, and the symbol "X" denotes any binary value, whether 1 or 0. "-Current zone designatio" means the designation applicable to the zone in which the current bit is located. (In the scan table, as will be explained later, the current zone designation is called "LABEL 1." The notation "unchanged" in Table I means that the zone designation which was applied to the preceding bit in the same row applies equally well to the current bit.

TABLE I

| Current Bit | Lower Bit | FLOP (Left Bit) | FLIP (Lower Left Bit) | Current Zone Designation (LABEL1) |
|---|---|---|---|---|
| 1 | X* | 0 | X | Boundary symbol |
| 1 | X | 1 | X | Unchanged |
| 0 | 1 | 1 | X | New zone number assigned. |
| 0 | 1 | 0 | X | Unchanged |
| 0 | 0 | 1 | X | Lower bit zone number. |
| 0 | 0 | 0 | 0 | Unchanged |
| 0 | 0 | 0 | 1 | Unchamged. Make entry in EQTAB1. |

*(x = 1 or 0).

Although "1" represents a boundary bit in the outline memory OM, the "boundary symbol" has a different value in the scan table, actually being a string of 16 1's, the hexadecimal notation for this being FFFF. This will be described in greater detail presently.

The storage locations 86–89B, FIG. 1, are allocated to the storage of certain values which are involved in the construction of the scan tables. Store 86, for example, temporarily holds a LABEL1 value, which subsequently becomes part of each SCANT entry (FIG. 8). Store 87 holds LABEL2, a reference value, which in some instances may (with LABEL1) become part of an EQTAB entry. Store 88 accumulates a ZLENG (zone length) value for subsequent entry into SCANT. Stores 89A and 89B hold the FLOP and FLIP values, respectively. Another label store (not shown) also is provided for holding a series of available zone labels, which are withdrawn sequentially from this store as the need for assigning new zone labels (other than boundary symbols) arises. In the present embodiment, it is assumed that this series of zone labels is composed of consecutive decimal numbers arranged in ascending order. This is not a necessary condition of operation, however.

In describing the various tables, FIG. 8, which are built up by the SCAN1 process, it will be found convenient to denote the pointer for the entry numbers or addresses of the respective entries in each table by appending a suffix "*X*" to the name of that table. Thus, the entry number or address pointer is SCANTX in the case of SCANT, SCTGDX in the case of SCTGD and EQTABX in the case of EQTAB1.

The present analytical method of determining zone designations does not at any time require a comparison of zone numbers. At most, it requires only the comparison of two bit values (current bit and lower bit) and an examination of one or two other bit values (FLIP and/or FLOP). Seven different types of situations can result from this mode of analysis, as indicated in Table I, and examples of these now will be described with reference to FIG. 7.

The scanning of SUBPANEL 11 is assumed to commence at ROW 1 and COLUMN 1. For analytical purposes, it is assumed also that an imaginary or dummy row of 1's is positioned beneath ROW 1 and that a similar column of 1's is positioned to the left of COLUMN 1. The current bit value of 0 (space bit) in ROW 1, COLUMN 1 of SUBPANEL 11 therefore is associated with a lower bit value of 1 and a FLOP value of 1. (The FLIP value is irrelevant here.) This gives a relationship as follows:

TABLE II

| | |
|---|---|
| FLOP = 1 | 0 = Current bit |
| FLIP = X | 1 = Lower bit |

From TABLE I, it is seen that this situation calls for the assignment of a new zone number to the current bit. Since no zone numbers have yet been assigned, the new zone number will be "1." Thus, entry No. 1 (SCANTX=1) in the scan table (SCANT) for SUBPANEL 11, FIG. 8, will list the zone designation (LABEL1) as "1." The zone length (ZLENG) for this entry is 1, inasmuch as the current row segment or zone is only one bit long. Zone length, being cumulative, is determined at the time when a change of zone designation occurs. It will be noted in FIG. 8 that the 0'th entry in SCANT has a zone length of 10 (the length of a full row) and LABEL1 in this instance is the boundary symbol FFFF. This corresponds to the dummy row of boundary bits (1's) which is assumed to lie beneath row 1.

Figure 7:
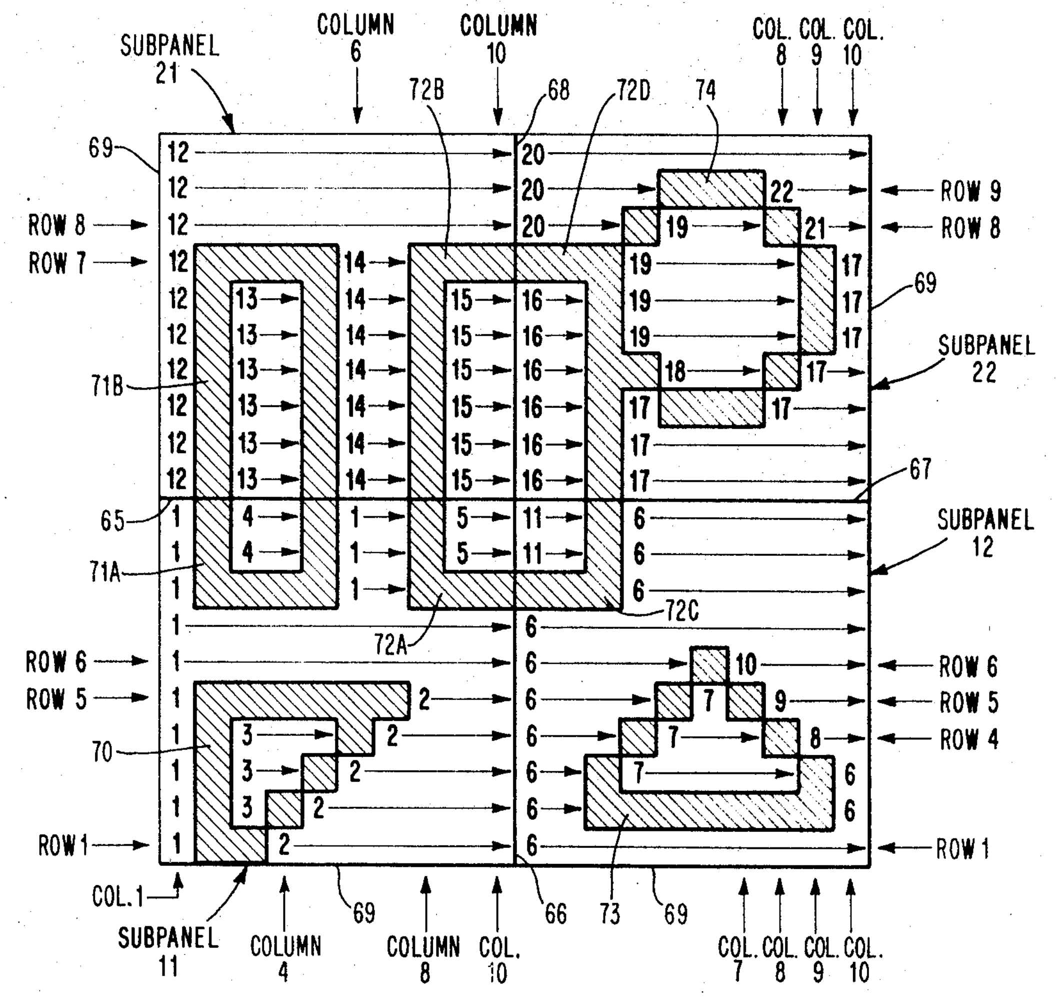
FIG. 7 is a schematic representation of a first-level scanning operation, herein designated "SCAN1," the purpose of which is to apply zone designations to the various regions and portions of regions contained within each subpanel.

When the SCAN1 process reaches COLUMN 2 in ROW 1 of SUBPANEL 11, FIG. 7, a boundary bit (1) is encountered. This produces the following situation:

TABLE III

| | |
|---|---|
| FLOP = 0 | 1 = Current bit |
| FLIP = X | 1 = Lower bit |

From Table I, this calls for the assignment of a boundary symbol to the current zone. Thus, the LABEL1 value that eventually will be assigned to entry No. 2 of SCANT, FIG. 8, is the boundary symbol FFFF. The determination of zone length (ZLENG) is held in abeyance.

At COLUMN 3 in ROW 1 of SUBPANEL 11, another boundary bit is sensed, thereby resulting in the following situation:

TABLE IV

| | |
|---|---|
| FLOP = 1 | 1 = Current bit |
| FLIP = X | 1 = Lower bit |

Table I indicates that in this situation, the zone designation remains unchanged. Hence, no new entry is needed in scan table SCANT, FIG. 8, and the accumulated zone length (ZLENG) of "2" becomes part of entry No. 2 in SCANT.

At COLUMN 4 in ROW 1 of SUBPANEL 11, the situation is the same as depicted in Table II above. Consequently, a new zone number (2) is entered into the LABEL1 store to be held for assignment to the current zone entry.

At COLUMN 5, the situation is as follows:

TABLE V

| | |
|---|---|
| FLOP = 0 | 0 = Current bit |
| FLIP = X | 1 = Lower bit |

From Table I, the zone number remains unchanged under these conditions. The same situation prevails to the end of ROW 1. Hence, entry No. 3 in SCANT (FIG. 8) shows ZLENG=7 and LABEL1=2.

The SCAN1 process now advances to ROW 2 of SUBPANEL 11, FIG. 7, and in COLUMN 1 of this row, a space bit (0) is sensed, creating this type of situation:

TABLE VI

| | |
|---|---|
| FLOP = 1 | 0 = Current bit |
| FLIP = 1 | 0 = Lower bit |

From Table I, it appears that in this type of situation, the current zone will be assigned the same number as the zone in which the lower bit is located. Hence, the current zone designation, or LABEL1, becomes "1", as indicated by entry No. 4 in SCANT (FIG. 8).

Zone numbering proceeds as shown in FIG. 7 for the remaining rows and columns, and corresponding SCANT entries are made as shown in FIG. 8. All boundary zones are assigned the same label, FFFF. Space zones are identified by decimal numbers. Each row zone has its own entry in the scan table, even though it may have the same zone length and/or the same label as some other row zone in that subpanel. Even where the zone label of an entry is subsequently changed (as will be described later in connection with the RIPPLE routine) the entry still keeps its same place in the scan table, with the same ZLENG value assigned to it.

One additional situation requires special mention. From an inspection of FIG. 7, it is evident that all of the zones numbered 1 and 2 are part of the same region, which in this instance is the background region of SUBPANEL 11. However, due to the particular configuration of the pattern in SUBPANEL 11, the zones to the left of the outline 70 are numbered 1, while the zones to the right thereof are numbered 2. When ROW 6 of SUBPANEL 11 is being scanned, the zone number 1 will be carried up from COLUMN 1 in ROW 5 to COLUMN 1 in ROW 6, per Table VI, and this zone number 1 will be applied to the whole of ROW 6, which contains nothing but space bits. At the same time when the space bit in COLUMN 8 of ROW 6 is sensed, the situation is as follows:

TABLE VII

| | |
|---|---|
| FLOP = 0 | 0 = Current bit |
| FLIP = 1 | 0 = Lower bit |

From Table I, it is seen that under these conditions, the current series of space bits in ROW 6 will continue to use the same zone designation or label as the first space bit of this series, namely, zone number 1, even though the series of space bits in the underlying portion of ROW 5 (from COLUMN 8 to COLUMN 10) carries a different zone number, 2. This condition is known as a "zone merge." To take care of this situation, i.e., to recognize the equivalency of zones 1 and 2, an entry now is made into the corresponding equivalence table (EQTAB1), FIG. 8. This entry lists the pair of zone numbers 2 and 1, as "equivalents" of each other. In a subsequent zone number conversion process RIPPLE1), a common zone number will be assigned to all scan table entries containing these two zone numbers.

Once the appropriate equivalence table entry is made, it is not necessary to repeat it so long as the current bit in ROW 6 and the lower bit in ROW 5 continue to have a 0—0 relationship. Thus, when the space bit at COLUMN 9 or COLUMN 10 of ROW 6 in SUBPANEL 11 is scanned, the situation will be as follows:

TABLE VIII

| | |
|---|---|
| FLOP = 0 | 0 = Current bit |
| FLIP = 0 | 0 = Lower bit |

Under these conditions, as shown in Table I, the zone number remains unchanged, and no entry is made in the equivalence table.

From the foregoing description of the subpanel scanning process, it is apparent that a scan table SCANT, FIG. 8, will be built up for any given subpanel by the SCAN1 routine, and it has been explained that any zone equivalences detected during this first-level scanning operation will be recorded in a corresponding first-level equivalence table, EQTAB1, for that subpanel. One other item of information must be provided by the SCAN1 routine, namely, the scan table guide (SCTGD), FIG. 8, which is a table showing the respective rows in which are located the various zones represented by the SCANT entries. Referring to FIG. 7 in conjunction with FIG. 8, it can be seen that ROW 1 is divided into three zones, namely, Zone 1, zone FFFF (boundary), and zone 2. Thus, entries 1 to 3 of SCANT constitute a group of entries belonging to the same row. Since it is useful to have row grouping information readily available, it is put into the form of a SCTGD tabulation as shown in FIG. 8. Thus, the first significant entry (No. 1) in SCTGD is "3," which signifies that entry No. 3 in SCANT is the last entry of the first row. Similar entries are made in SCTGD for the remaining rows of the subpanel, each SCTGD entry denoting the SCANTX value for the SCANT entry at the end of the row whose number equals SCTGDX.

FIG. 8 shows a set of tables built up for SUBPANEL 11, FIG. 7, by the first-level scanning process, SCAN1. A corresponding set of tables is built up by SCAN1 for each of the other subpanels which are to be analyzed. The sequence of operations performed during a SCAN1 routine, for any of the subpanels, is represented by the flow chart in FIGS. 9A–9C, which corresponds to the step numbered 91 in the general flow chart, FIG. 6.

Figures 9, 9A:
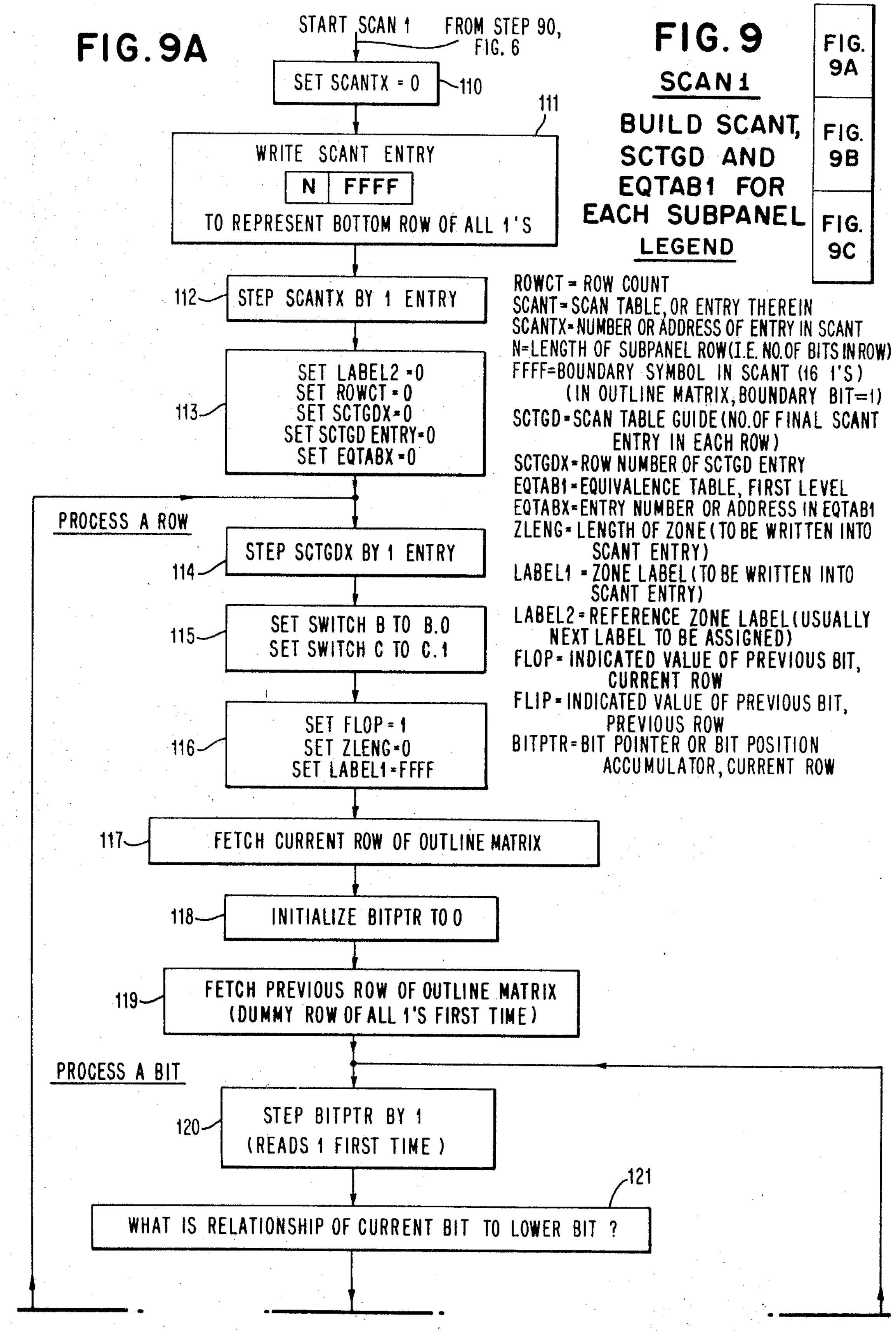
FIGS. 9A, 9B and 9C, when assembled in the manner indicated by FIG. 9, show a flow chart for the SCAN1 routine.

The first step 110 in the SCAN1 routine, FIG. 9A, causes the scan table address pointer SCANTX, FIG. 8, to be reset to 0, this being a dummy address that does not actually correspond to any of the row zones stored in the subpanel outline memory. At step 111, a dummy entry is made into the scan table (SCANT) at the address or entry position numbered 0 therein, this dummy entry having a zone length equal to the row length (N) and a zone label consisting of the boundary symbol FFFF, thereby simulating an imaginary row of 1's or boundary bits positioned just beneath ROW 1 of the corresponding subpanel outline matrix (FIG. 5). This has no direct effect upon the current SCAN1 operation but serves to fence off the section of memory storing the current SCANT.

At step 112, FIG. 9A, the value of SCANTX is stepped or incremented by 1, bringing it to entry position No. 1, FIG. 8, corresponding to the first row segment of the subpanel matrix which is to be processed. At step 113, certain initializing operations are performed. LABEL2, a reference number which usually (but not always) is the next zone label to be assigned, is initially set to 0. The row count (ROWCT) value is initialized to 0, this value being incremented to the first row number only when the scanning of the first row has been completed. The scan table guide pointer, SCTGDX, and the scan table guide (SCTGD) entry, FIG. 8, are each set to 0, no significant entry being made in the right-hand column of SCTGD until the scanning of the first row is completed. The address pointer, EQTABX, for the first-level equivalence table EQTAB1, FIG. 8, is set initially to 0. The initial values of the left and right EQTAB entries are of no consequence. The system is now ready to process the first row of information to be read from the subpanel outline memory.

Certain operations identified as steps 114–119, FIG. 9A, are performed before the scanning of each new row commences. At step 114, the guide pointer SCTGDX is stepped by one entry, bringing it in this instance to the No. 1 entry position of SCTGD, which corresponds to row 1 of the subpanel matrix. At step 115, FIG. 9A, switches B and C, FIG. 9C, are set to their B.0 and C.1 positions, respectively. The term "switch," as used herein, preferably refers to what is known as a "programmed switch," or a software simulation of a switching action, and does not necessarily connote a hardware switch. The function of such switches is to avoid unnecessary duplications of programming steps.

At step 116, the FLOP value is set equal to 1, it being recalled that an imaginary column of 1's or boundary bits is assumed to precede column 1 of each subpanel matrix. The zone length (ZLENG) value is set to 0, inasmuch as no bit positions have yet been accumulated for the zone currently being analyzed. LABEL1 is set initially to the boundary symbol, represented herein as FFFF. This is not necessarily the value that eventually will be entered in the LABEL1 column of the current SCANT entry, although in some circumstances it could constitute that value.

Proceeding now to step 117, the current row of the outline matrix (i.e., the subpanel matrix) is fetched from the outline memory and is stored in a convenient memory location. In this instance, ROW 1 of the subpanel matrix would be fetched. At step 118, a bit pointer (BITPTR), which successively addresses the bits of the current (and previous) rows is set to 0. At step 119, the previous row of the outline matrix is fetched and stored at a convenient location. When the current row is ROW 1, however, a string of 1's is inserted automatically into the previous row storage location. This completes the preliminary operations which precede the processing of each new row of bits. The system now is ready to start processing the bits in the current row.

At step 120, FIG. 9A, the BITPTR value is incremented by 1, reading "1" the first time it is so incremented. This pointer designates which bit in the current row should be considered as the "current bit," and which bit in the previous row is to be considered as the "lower bit." At step 121, a comparison is made between the current bit value in the current row and the lower bit value in the previous row. Any of three branch outputs may result from this comparison. If the current bit is 1, regardless of whether the lower bit is 1 or 0, the operation follows branch 122, FIG. 9B, this condition being depicted by the small diagram 123 in FIG. 9B. If the current bit is 0 and the lower bit is 1, as indicated by the small diagram 124, branch 125 will be followed. If both the current bit and lower bit values are 0, as indicated by diagram 126, branch 127 is followed.

The remaining portion of the flow chart shown in FIG. 9B merely embodies the logical rules described hereinabove (TABLES I–VIII) for determining the zone designation that shall be applied to each zone or row segment as it is analyzed. Thus, at the branch point 132, where the value of the FLOP digit is tested, branch 122 may further divide into two branches, 130 and 131. If FLOP=0, as indicated by the small diagram 133, the value of LABEL2 is set equal to the boundary symbol FFFF as indicated at step 134, FIG. 9B, and the operation then proceeds to the switch C, FIG. 9C. If the test step 132 shows FLOP=1, as indicated by the diagram 135, the operation proceeds along branch paths 131 and 136 to path 137, FIG. 9C.

Figure 9B:
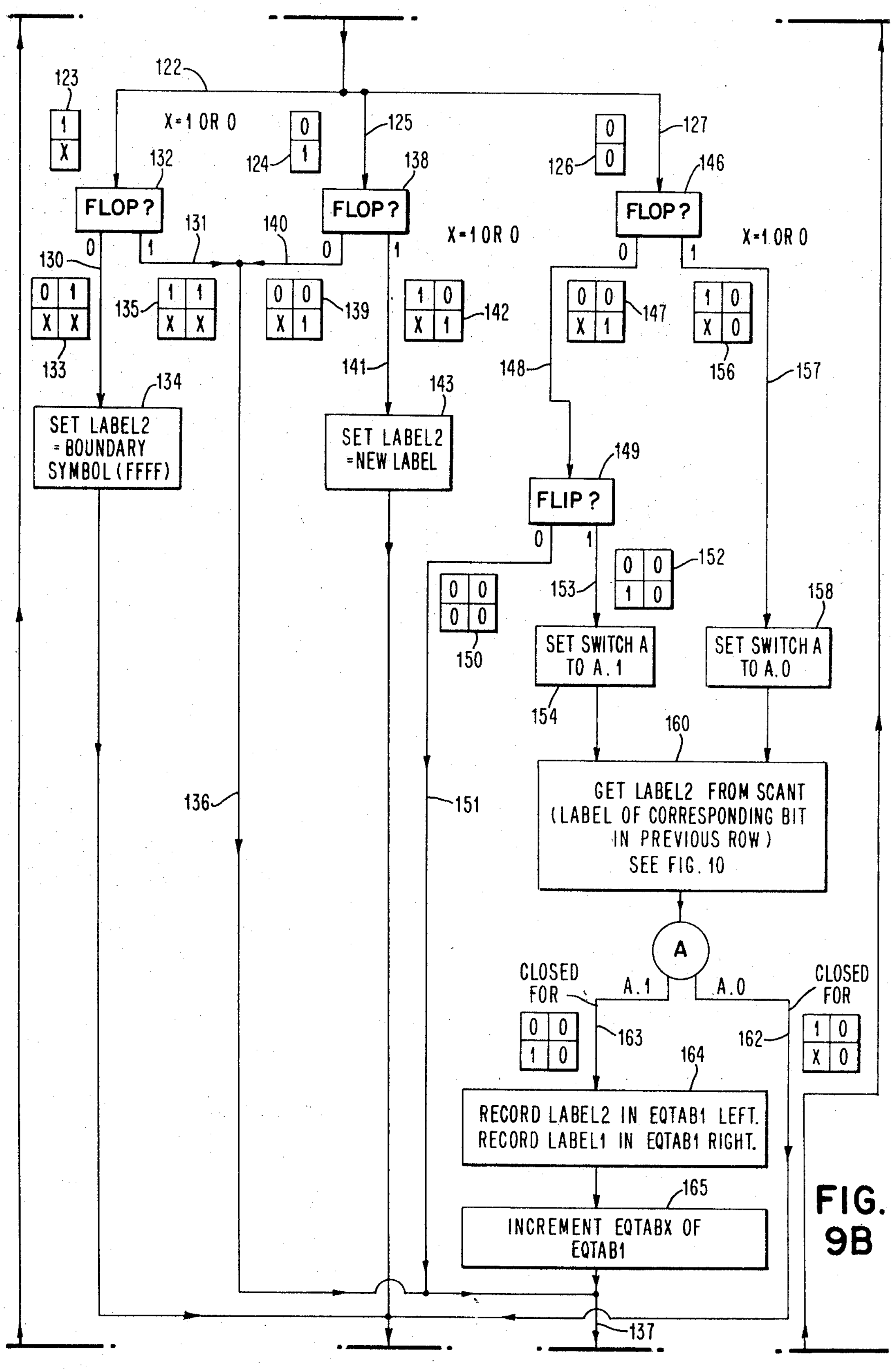
Figure 9C:
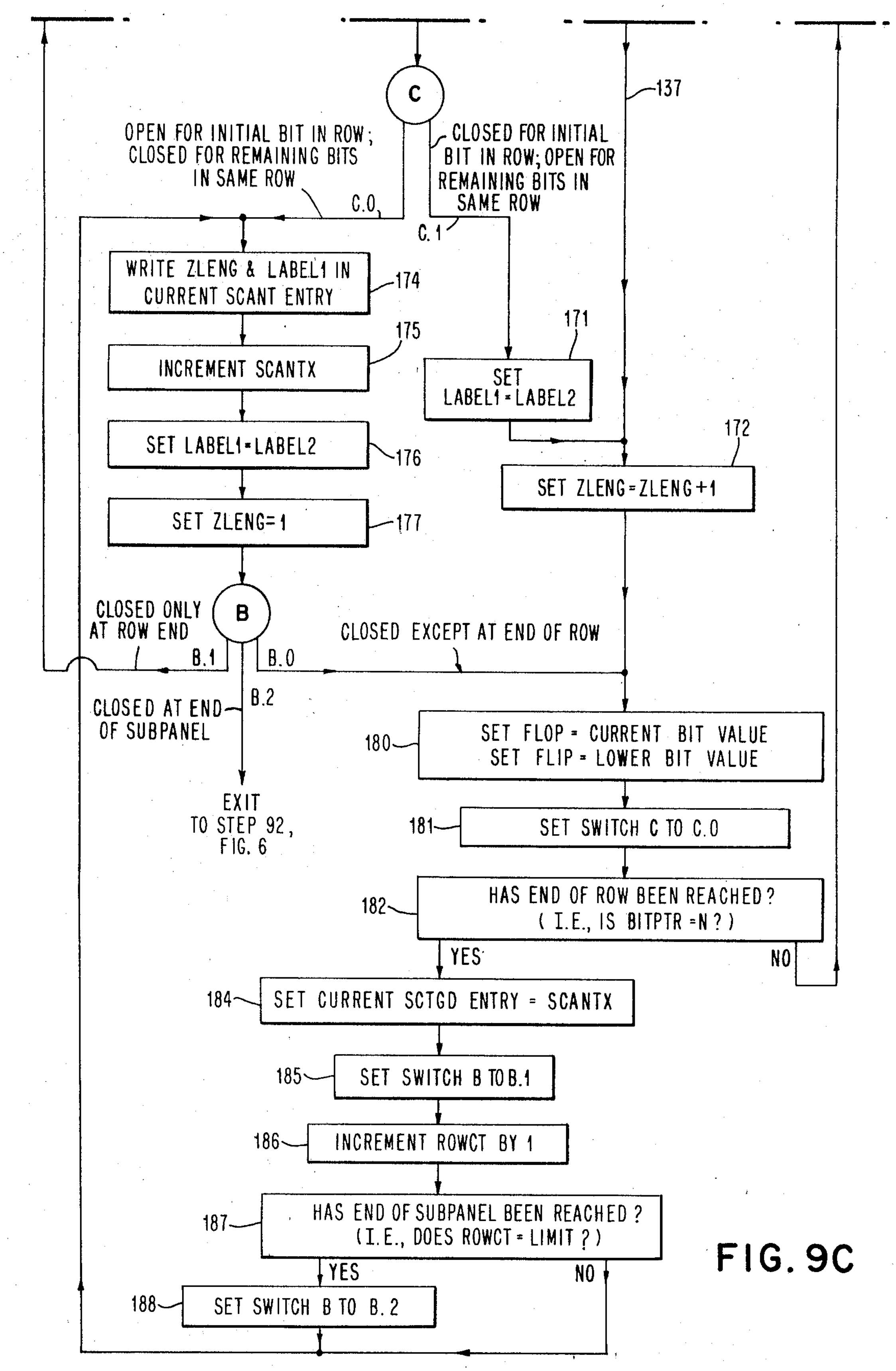

If the relationship of the current and lower bits is 0–1, causing branch 125, FIG. 9B, to be followed, a test is made at step 138 to determine whether the FLOP bit is 0 or 1. If FLOP=0, a condition depicted by the diagram 139, the operation proceeds along branches 140 and 136 to path 137, FIG. 9C. If FLOP=1, as depicted by diagram 142, the operation follows branch 141, and at step 143, LABEL2 is given a new value, which would be the next number in the series of zone numbers to be assigned. The operation then proceeds to switch C, FIG. 9C.

Assuming now that the current and lower bits have a 0—0 relationship, so that branch 127, FIG. 9B, is followed, the value of the FLOP digit is tested at step 146. If FLOP=0, as indicated by the diagram 147, the operation proceeds along branch 148 to step 149, where the value of the FLIP digit is tested. If FLIP=0, as depicted by diagram 150, the operation proceeds along branch 151 to path 137. If FLIP=1 (diagram 152), the operation proceeds along branch 153 to step 154, where switch A, FIG. 9B, is set to A.1. Returning now to step 146, if FLOP=1, giving the condition specified by diagram 156, the operation proceeds along branch 157 to step 158, where switch A is set to A.0.

Regardless of the position to which switch A is set (at step 154 or 158) the operation now advances to step 160, which calls for the execution of a special subroutine ("GET LABEL2") whereby the label assigned to the zone containing the lower bit (i.e., the corresponding bit in the previous row) is ascertained from the scan table. This subroutine will be described shortly. If the setting of switch A is A.0, the operation next proceeds along branch 162 to switch C. If switch A is set to A.1, the operation proceeds along branch 163 to step 164, which causes an entry to be made into the equivalence table EQTAB1 whereby LABEL2, which in this instance is the previous row zone, becomes the left portion of the EQTAB entry, while LABEL1, the current zone number, becomes the right portion of this EQTAB entry. The operation then advances to step 165, where the value of EQTABX is incremented, and following this, the operation proceeds along path 137, FIG. 9C. The remaining actions will be described presently.

Those operations which commence with branch 127, FIG. 9B, cannot occur while ROW 1 is being scanned, but they may occur for any of the rows succeeding ROW 1. Only those operations which commence with branch 122 or 125 can occur while ROW 1 is the current row.

The sequence of operations is routed through switch C, FIG. 9C, whenever conditions are such that the LABEL1 designation may have to be changed or reassigned for a new SCANT entry (i.e., each time the scanning process advances from one row zone to the next). The new value which LABEL1 is to receive is temporarily designated LABEL2. This does not imply, however, that every LABEL2 value becomes a LABEL1 value, since there may be conditions under which both LABEL2 and LABEL1 are entered into an equivalence table, as indicated at step 164, FIG. 9B, or LABEL2 may simply be disregarded in some circumstances. LABEL2 may have any one of three values, depending upon the conditions encountered. Thus, it may become the boundary symbol (as at step 134), or a new label not previously assigned (as at step 143), or a new label may be taken from the previous row zone (step 160). These conditions may be deduced from Table I hereinabove.

Switch C will cause a 0 bit at the beginning of a row to be processed in different fashion than the remaining bits of that row. This is due to the fact that the processing of the first bit is preceded by certain preliminary operations (steps 114–119, FIG. 9A) that do not precede the processing of the remaining bits in the row, and certain other operations are not performed until subsequent bits are analyzed. For an initial 0 bit, the operation proceeds through branch C.1, FIG. 9C, of the switch C output. It will be recalled that LABEL1 already has been set equal to the boundary symbol (step 116). If the first bit is "0," LABEL1 now must be set equal to LABEL2 (step 171), whether this is a new label (step 143) or one taken from the first zone of the preceding row (step 160). Where the first bit is "1," switch C is bypassed (paths 131, 136 and 137), and LABEL1 remains a boundary symbol. In either event, the operation next proceeds along flow line 137 to step 172, where the value of ZLENG is incremented by 1.

Each time, if any, that a change of zone occurs during the remainder of the current row scan, before the end of the row is reached, the operation proceeds along branch C.0 of the switch C output. Certain updating functions first must be performed in the scan table SCANT, FIG. 8. At step 174, FIG. 9C, the current LABEL1 and ZLENG values are entered into the current SCANT location (designated by SCANTX). Until now, these LABEL1 and ZLENG values have been held in storage, FIG. 1. Then SCANTX is stepped to the next address in SCANT, at step 175. At step 176 a new LABEL1 value, equal to LABEL2, is entered into the appropriate storage location 86, FIG. 1, to be held there pending its entry into SCANT. At step 177, the value of ZLENG (registered in storage location 88, FIG. 1) is set to 1 to indicate that a new zone length is being accumulated.

Switch B, FIG. 9C, was set to B.0 at the beginning of the row (step 115, FIG. 9A), and it retains this setting until the end of the current row is reached. After the various updating functions in steps 174–177 have been accomplished, the operation proceeds along branch B.0 to step 180, where the FLOP and FLIP values, stored in the bit registers 89A and 89B, FIG. 1, are updated. FLOP is set equal to the current bit value (which is to become the left or previous bit in the current row). FLIP is set equal to the lower bit value (which is to become the left or previous bit in the previous row). Switch C is set to C.0 at step 181.

In the event that there has been no need to change a zone designation, i.e., where the operation proceeds through branch 136, 151 or 163, FIG. 9B, to flow path 137, the label-updating actions are bypassed, and the ZLENG value is increased by 1 bit position at step 172. The FLOP and FLIP values are updated at step 180, and switch C is set to C.0 at step 181 as described above.

At step 182, the BITPTR value is tested to see whether it equals the row length N. In other words, has the end of the row yet been reached? If not, the operation branches back to step 120, FIG. 9A, where the BITPTR setting is incremented and the processing of the next bit in the current row commences. This cycle is repeated until eventually the BITPTR setting equals N, signifying that the row end has been reached. The operation then branches from step 182 to step 184, FIG. 9C, where the current SCTGD entry (FIG. 8) is set equal to the current SCANTX value. The scan table guide entry is thereby updated. (Each SCTGD entry, it will be recalled, holds for future reference the SCANT address or entry number of the final zone in the corresponding row of the subpanel matrix).

The next step 185 causes switch B to assume state B.1, signifying that the end of the row has been reached. At step 186, the ROWCT value is increased by 1; and at step 187, this row count value is compared with the total or limiting number of rows per subpanel to determine whether the end of the subpanel has been reached. If not, the operation immediately branches back to step 174 to initiate the scan-table-updating functions performed in steps 174 to 177 (only those performed in steps 174 and 175 being of significance in this instance). From switch B, the operation now proceeds through branch B.1 back to step 114, FIG. 9A, for starting a new row processing operation.

Ultimately, the end of the final row in the subpanel is reached by the scanning process, and the test performed at step 187, FIG. 9C, has a "yes" output. At step 188, the switch B is set to its B.2 state, and the final updating steps 174–177 are performed (only steps 174 and 175 being of significance in this instance). The switch B, now being set to B.2, causes the operation to exit from the SCAN1 routing and proceed to the CONCOMP1 routine (step 92, FIG. 6).

Figure 10:
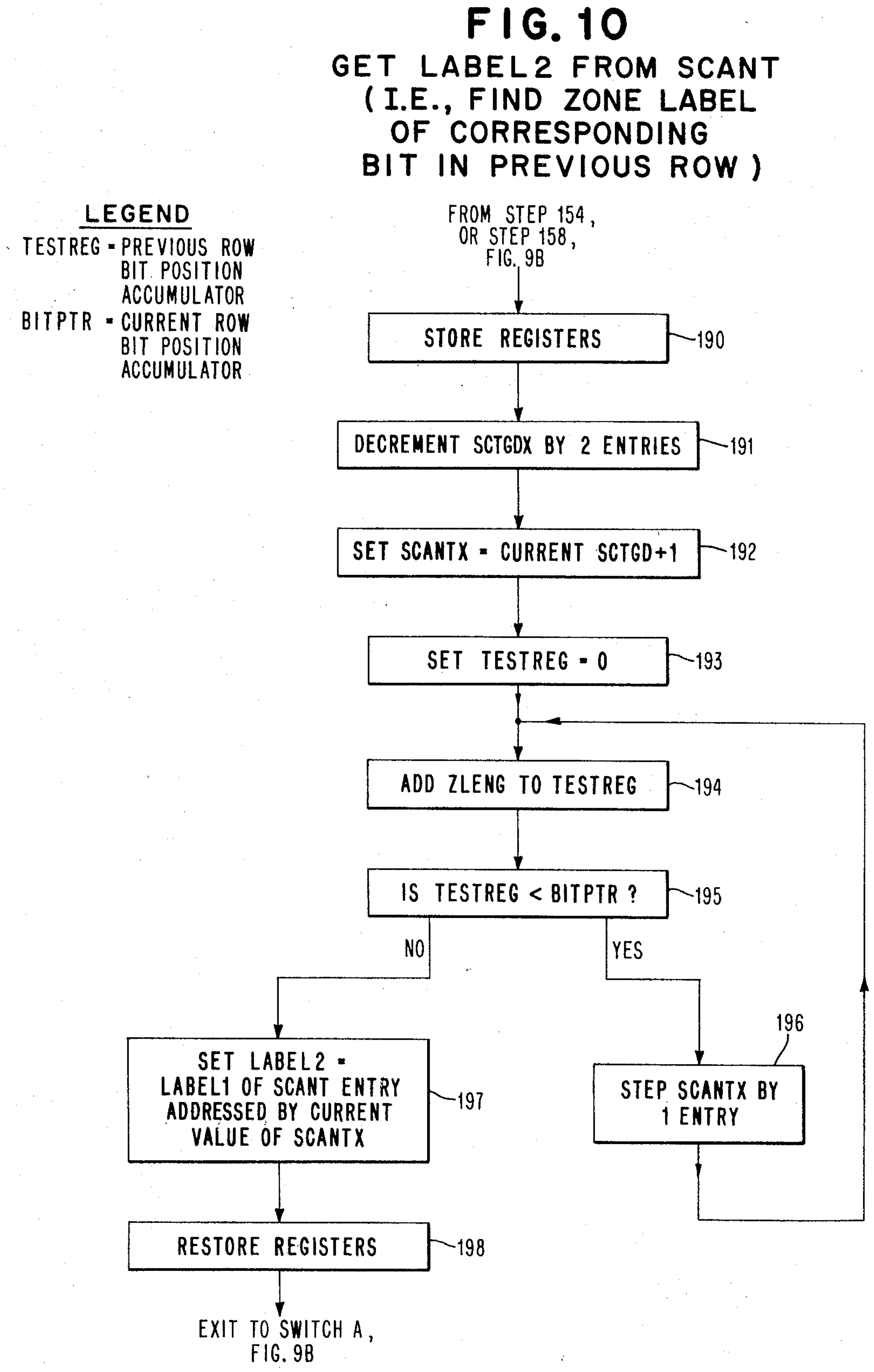
FIG. 10 is a flow chart for a "GET LABEL2" subroutine which is included in the SCAN1 routine (FIG. 9B).

The "GET LABEL2" subroutine at step 160, FIG. 9B, has been described generally hereinabove. FIG. 10 shows this subroutine in greater detail. This operation is called for whenever it becomes necessary to find the zone number of the corresponding lower bit in the previous row (condition 152 or 156, FIG. 9B). Such action can occur only where the current row number exceeds 1. At the outset of this subroutine, i.e., at step 190, FIG. 10, the contents of the various registers (except LABEL2) are stored in order that some of these registers may be used temporarily for the purpose of looking up the previous row zone designation. At step 191, the scan table guide pointer, SCTGDX, is decremented by two entries in order to read the final SCTGD entry for the row preceding the "previous" row, i.e., two rows back of the current row. This SCTGD entry, when incremented by 1, gives the value which SCANTX (the scan table address pointer) had at the beginning of the "previous" row. Thus, at step 192, SCANTX is set equal to the current SCTGD entry plus 1.

A test register (TESTREG) is initialized to 0 at step 193; and at step 194, the current ZLENG value in SCANT is added to the TESTREG setting. Then a test is made at step 195 to see whether the TESTREG setting has attained the current value of the BITPTR setting. In other words, have we identified that zone in the previous row which lies directly beneath the current bit? If the TESTREG value is less than the BITPTR value, SCANTX is incremented by 1 at step 196 to bring in the next SCANT entry, and the operation then branches back to step 194, where the ZLENG value of the current SCANT entry is added to TESTREG. Again a test is made at step 195 to determine whether or not the TESTREG value is less than the BITPTR value. If TESTREG becomes at least equal to BITPTR, this indicates that the SCANT entry corresponding to the zone directly beneath the current bit has been found, and LABEL1 of this SCANT entry is the zone label sought. The LABEL2 register 87, FIG. 1, now is set equal to this current LABEL1 value (step 197), and the other registers are restored at step 198. The LABEL2 register now contains the zone label which is to be "carried up" to the current row zone.

FIG. 7 shows the numbers assigned to the various row zones that lie within the respective regional boundaries and subpanel borders after all of the subpanels have been analyzed by the SCAN1 process. These are the regional designations which are listed as "LABEL1" in the various subpanel scan tables (e.g., FIG. 8). In each of the illustrated subpanels there is at least one instance where several zone numbers or labels have been assigned to the same region. In SUBPANEL 11, for instance, zone numbers 1 and 2 have been assigned to different parts of the background region. In SUBPANEL 12, different parts of the background region are identified respectively by the zone numbers 6, 8, 9 and 10. In SUBPANEL 21, the background region is identified in different places by zone numbers 12 and 14, and in SUBPANEL 22, it bears zone numbers 17, 20, 21 and 22 in different places. Also, in SUBPANEL 22, the region enclosed by boundary 74 is identified in different places by zone numbers 18 and 19, respectively. These zone equivalences are listed in the subpanel equivalence tables (EQTAB1), FIGS. 8, 18, 19 and 20.

It is desirable that within each subpanel, only one zone number or label shall be used to identify any given region. The function of converting equivalent zone numbers to a common regional designation within each subpanel is performed by the CONCOMP1 and RIPPLE1 routines (steps 92 and 93 in FIG. 6). The CONCOMP1 routine builds a first-level table of nodes (NODES1) for each subpanel, using the information entered into the EQTAB1 table for the subpanel by the SCAN1 routine, which has just been described. The RIPPLE1 routine then performs the actual zone number conversion process in each of the subpanels. Subsequently in the sequence of operations, similar functions are performed for the panel as a whole, as will be explained later herein.

In the present description, it is assumed that the subpanel borders have an orthogonal relationship to one another, extending either parallel to the rows or at right angles thereto, so that the rows are of equal length. This is not a necessary condition for the practice of the invention, however. By suitable modification of the scanning algorithm, the procedure herein described can be applied to subpanels whose borders are not necessarily in orthogonal relationship, with some or all of them being in diagonal relationship to the rows.

COMCOMP1

FIGS. 11–20

Figure 11B:
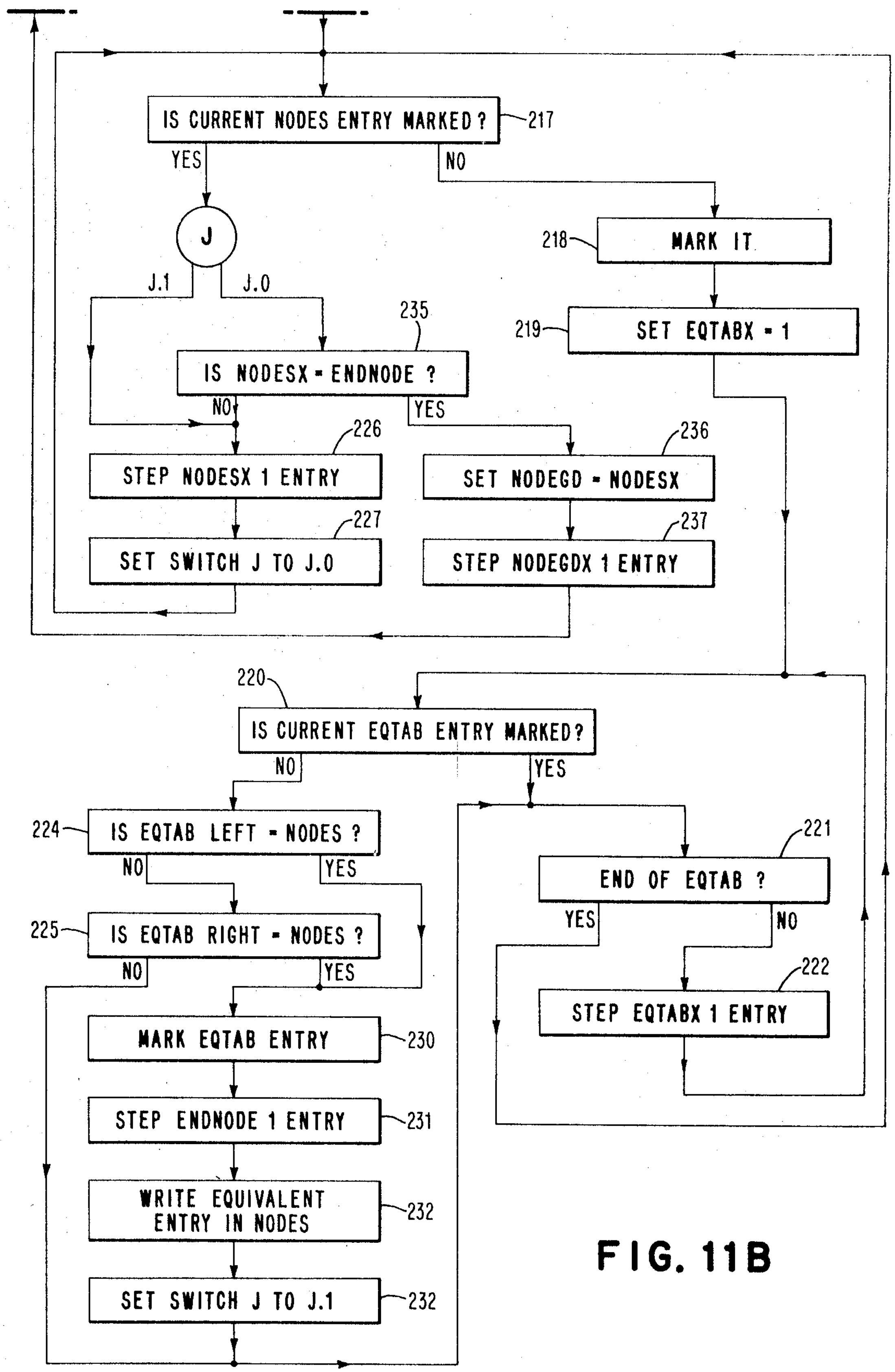

The CONCOMP1 routine, which is represented by the CONCOMP flow chart shown in FIGS. 11A and 11B, utilizes the information stored in the various subpanel equivalence tables (EQTAB1), as represented in FIGS. 8, 18, 19 and 20, to build first-level tables of nodes (NODES1), as represented in FIGS. 12 and 18–20. Actually, the flow chart shown in FIGS. 11A and 11B has been arranged so that it applies equally well to both CONCOMP1 and CONCOMP2, with the dissimilar housekeeping functions of these two routines being disregarded for present purposes. Before describing this operation in detail, however, a simple functional description of the CONCOMP process first will be presented with reference to an alternative example illustrated in FIGS. 13–17.

Figures 12, 13:
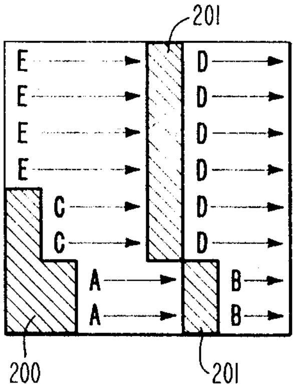

FIG. 13 depicts a subpanel containing regional boundaries 200 and 201 having configurations such as to divide the subpanel into two regions. After the SCAN1 process has been performed upon this subpanel, one of these regions will be identified in different places by the zone labels A, C and E. The other region is identified in different places by the zone labels B and D. (Alphabetic zone designations are used in the present example to prevent confusion of these labels with the numerical zone labels utilized in connection with the example shown in FIG. 7.)

Figure 14:
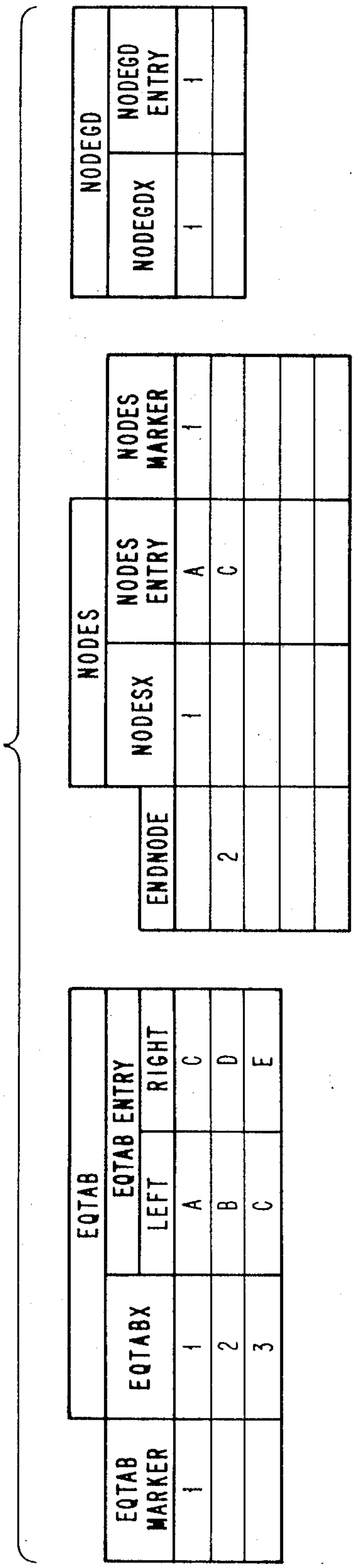

FIG. 14 contains a representation of the equivalence table, EQTAB, which was built up for the subpanel shown in FIG. 13 during the SCAN1 process. FIGS. 14–17 depict successive stages in the formation of the NODES table and the node guide (NODEGD) table during execution of the CONCOMP routine for this subpanel. As the various entries in the EQTAB and NODES tables are addressed, they are "marked" by associated indicia respectively designated "EQTAB MARKER" and "NODES MARKER" in FIG. 14. Also associated with the NODES table is a pointer designated "ENDNODE," which designates the location or address of the most recent entry in the NODES table. The NODEGD table contains entries associated with successive addresses that are identified as "-NODEGDX." When the NODEGD table is complete, each entry therein will indicate an address in NODES (i.e., NODESX) at which the final member is a set of related nodes entries is located. Thus, the entries in NODES are segregated by the NODEGD entries into sets of connected nodes, each of these sets containing the zone labels that relate to a particular region in the subpanel pattern.

The CONCOMP algorithm now will be briefly explained with reference to the example shown in FIGS. 13–17 in conjunction with the flow chart shown in FIGS. 11A and 11B. Referring first to FIG. 11A, the CONCOMP operation begins with an initialization step 210 which resets ENDNODE to 0 and sets NODESX, NODEGDX and NODEGD entry to 1. Then, at step 211, EQTABX is set to 1, and at step 212, the system ascertains whether or not this EQTAB entry has been "marked," that is to say, whether or not it has been checked. If it has not, then the EQTAB entry is marked as indicated at step 213. Referring to FIG. 14, the marking of EQTAB entry is accomplished by entering a "1" in the EQTAB MARKER column at the position therein corresponding to the current EQTABX address. Then, at step 214, FIG. 11A, the next two entries of the NODES table respectively are set equal to the current EQTAB LEFT and EQTAB RIGHT entries, as shown in FIG. 14. At step 215, the ENDNODE setting is stepped two entries, advancing in this case from 0 to 2, FIG. 14.

At step 216, FIG. 11A, a switch J is set to its J.1 state. Then, at step 217, FIG. 11B, an inquiry is made to determine whether the current NODES entry has been marked. In this instance, the current NODES entry is the first entry, since NODESX=1 at the present time (FIG. 14). As yet, this NODES entry has not been marked, so at step 218, FIG. 11B, it is marked by entering "1" in the NODES MARKER column at the location designated by the current NODESX value, FIG. 14.

From this point on, the general procedure is to search through the various EQTAB entries to determine whether any of these entries contain the most recently marked NODES entry, and if such a matching EQTAB entry is found, then the nonmatching portion of this EQTAB entry is added to the list of NODES entries. Thus, in the present instance, the most recently marked NODES entry is A, so a search is made through the EQTAB entries to see which of them, if any, contain A, other than the EQTAB entry which already has been marked. This action is represented in the flow chart, FIG. 11B, starting with step 219. EQTABX is reset to "1" (if it did not already have that value) and at step 220, an inquiry is made to determine whether the current EQTAB entry has been marked. In this particular instance, the entry for EQTABX=1 has been marked, so the operation now branches to step 221, where a test is made to see whether the end of the equivalence table has been reached. Since it has not, the operation advances to step 222, where EQTABX is stepped by one entry, thereby advancing from 1 to 2 in this instance.

The operation now returns to step 220, where inquiry again is made as to whether or not the current EQTAB entry has been marked. In this case, with EQTABX=2, it has not. Therefore, the operation branches to step 224, where the EQTAB LEFT entry is compared with the current NODES entry (A). If EQTAB LEFT (B in this case) does not equal NODES (A), the operation branches to step 225, where a similar test is made to determine if EQTAB RIGHT is identical to the NODES entry. If it is not, the operation then returns to step 221 and thence to step 222, where EQTABX again is incremented, advancing from 2 to 3 in this instance.

Figure 15:
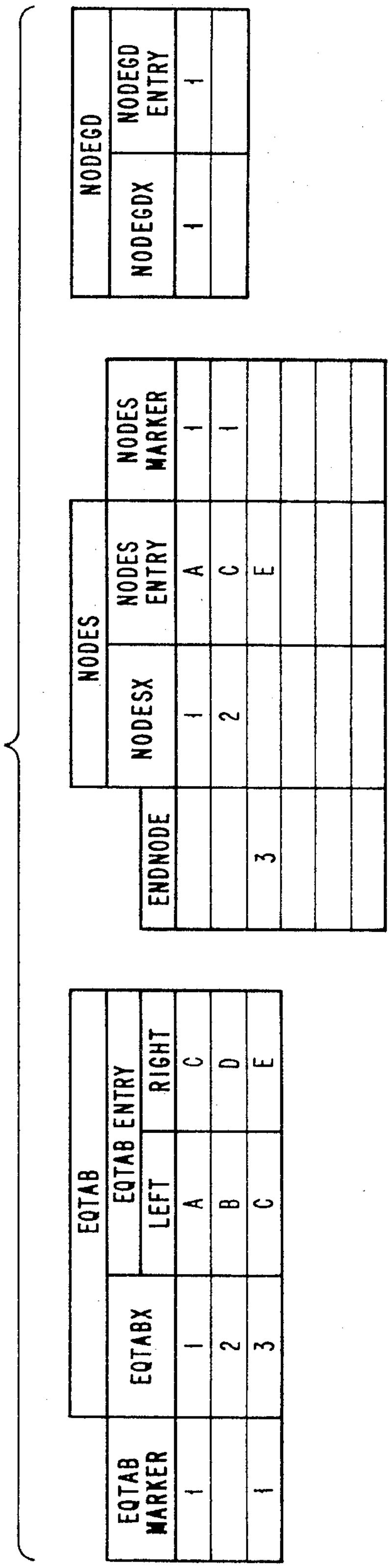

Since the third EQTAB entry has not yet been marked, the operation progresses through steps 224 and 225. Since neither of the EQTAB entries in this case is identical with the current NODES entry (A), the operation returns to step 221, and since the end of the EQTAB entries now has been reached, the operation then returns to step 217. Since the current NODES entry is marked, the operation branches to the switch J, which previously (in step 216) was set to J.1. The operation proceeds along this J.1 branch to step 226, where the NODESX address is advanced one entry, bringing it to position 2 in this instance. At step 227, switch J is set to its J.0 state, and the operation then returns to step 217. The current NODES entry is not marked, so at step 218, it is marked by entering a 1 in the NODES MARKER column for the second NODES entry, as shown in FIG. 15.

Now, the second NODES entry (C) is compared with all of the unmarked EQTAB entries, in a manner similar to that described hereinabove, to see whether any EQTAB entries can match the current NODES entry. It turns out that the third EQTAB LEFT entry matches the current NODES entry (C). Hence, step 224 in this instance has a "YES" output, whereupon the operation branches to step 230, where the current or third EQTAB entry is marked as shown in FIG. 15. At step 231, the value of ENDNODE is incremented to indicate that another label is about to be added to the current set of connected NODES. Then, at step 232, the EQTAB entry which was associated with the matching EQTAB entry as an equivalent thereof (namely, the EQTAB RIGHT entry E) is written into the NODES table as an additional NODES entry, as shown in FIG. 15. Thus, the current set of connected NODES now has three members A, C and E.

In step 233, FIG. 11B, the switch J is set to J.1, and a test is made at step 221 to see whether the end of the equivalence table has been reached. Since it has, the operation returns immediately to step 217, and since the current or third NODES entry has not yet been marked, it is marked at step 218, as shown in FIG. 16. At step 219, EQTABX is restored to 1, and the unmarked entries of the equivalence table again are searched to find an EQTAB entry that matches the current NODES entry (E). Since the only unmarked EQTAB entry at present is entry No. 2, which does not match the current NODES entry, the operation returns to step 217, FIG. 11B, which generates a "YES" output for activating the switch J.

Switch J previously was set to J.1 (at step 233), so that the operation branches to steps 226 and 227, where NODESX is incremented from 2 to 3, FIG. 16. At step 227, switch J is set to J.0 and the operation returns back through step 217 to switch J again. This time, the J.0 output branch is followed, and at step 235 a test is made to see whether NODESX is now equal to ENDNODE. Inasmuch as both of these values are equal to 3 at this time, the output of step 235 follows the "YES" branch to step 236, where the NODEGD entry is set equal to the current NODESX value, namely, 3, as shown in FIG. 16. The value of NODEGDX then is incremented at step 237, advancing in this instance from 1 to 2 in preparation for the next NODEGD entry, if and when that occurs.

The first NODEGD entry 3, FIG. 16, signifies that the first set of connected nodes ends at the NODES address where NODESX=3, this being the NODES address at which the NODESX and ENDNODE values became equal (step 235, FIG. 11B). The operation now returns from step 237 to step 211, FIG. 11A. A search for any remaining unmarked EQTAB entry now is commenced. First, at step 211, EQTABX is reset to 1. Then, at step 212, the current EQTABX MARKER is checked, and if the EQTAB entry has been marked, EQTABX is stepped one entry as indicated at step 238. A test is made at step 239 to determine whether the end of the equivalence table has been reached yet, and if not, the operation returns to step 212.

Since the second EQTAB entry has not been marked, the operation now branches to step 213, where this EQTAB entry is marked as indicated in FIG. 17. The marked EQTAB entries B and D are entered into the NODES table, at step 214, and the ENDNODE value is stepped from 3 to 5 at step 215, as shown in FIG. 17. At step 216, switch J is set to J.1.

The operation will not be described in detail from this point on. Since all of the EQTAB entries have now been marked, the only remaining action required is to mark the remaining NODES entries B and D, update the NODESX value to 5, FIG. 17, and enter this final NODESX value into the NODEGD table as the second entry therein. The completed tables, FIG. 17, show that there are two sets of connected nodes, one set comprising the nodes A, C and E and the other set comprising the nodes B and D. Referring back to FIG. 13, it will be seen that this tabulation agrees with the relationship of the zone labels there shown, the labels A, C and E having been applied to one region, while the labels B and D were applied to the other region. The CONCOMP1 operation has been described with reference to the example shown in FIG.

13 using the flow chart in FIGS. 11A and 11B, which applies equally well to CONCOMP1 and CONCOMP2. The EQTAB, NODES, and NODEGD table shown in FIGS. 14–17, were described as though they related to a first-level CONCOMP operation, but essentially the same procedure would have been followed if this had been a second-level CONCOMP operation wherein equivalent zone labels in different subpanels were being determined.

FIG. 12 represents the NODES1 and NODEGD1 tables which are built by the CONCOMP1 process for SUBPANEL 11, FIG. 7 utilizing the EQTAB1 entries for this panel as shown in FIG. 8. FIG. 18 represents the EQTAB1 table that would be built by the SCAN1 process for subpanel 12, FIG. 7, and it also shows the NODES1 and NODEGD tables built by the CONCOMP1 routine based upon these EQTAB entries. Similarly, FIGS. 19 and 20 represent the EQTAB1, NODES1 and NODEGD1 tables for SUBPANELS 21 and 22, respectively. The operations that are performed in order to produce these tables are not described in detail since they are essentially the same as operations already described above.

As the CONCOMP1 operation for each subpanel is completed, the operation next proceeds to the RIPPLE1 routine, step 93, FIG. 6, described below.

RIPPLE1 FIGS. 21–23

Figure 21B:
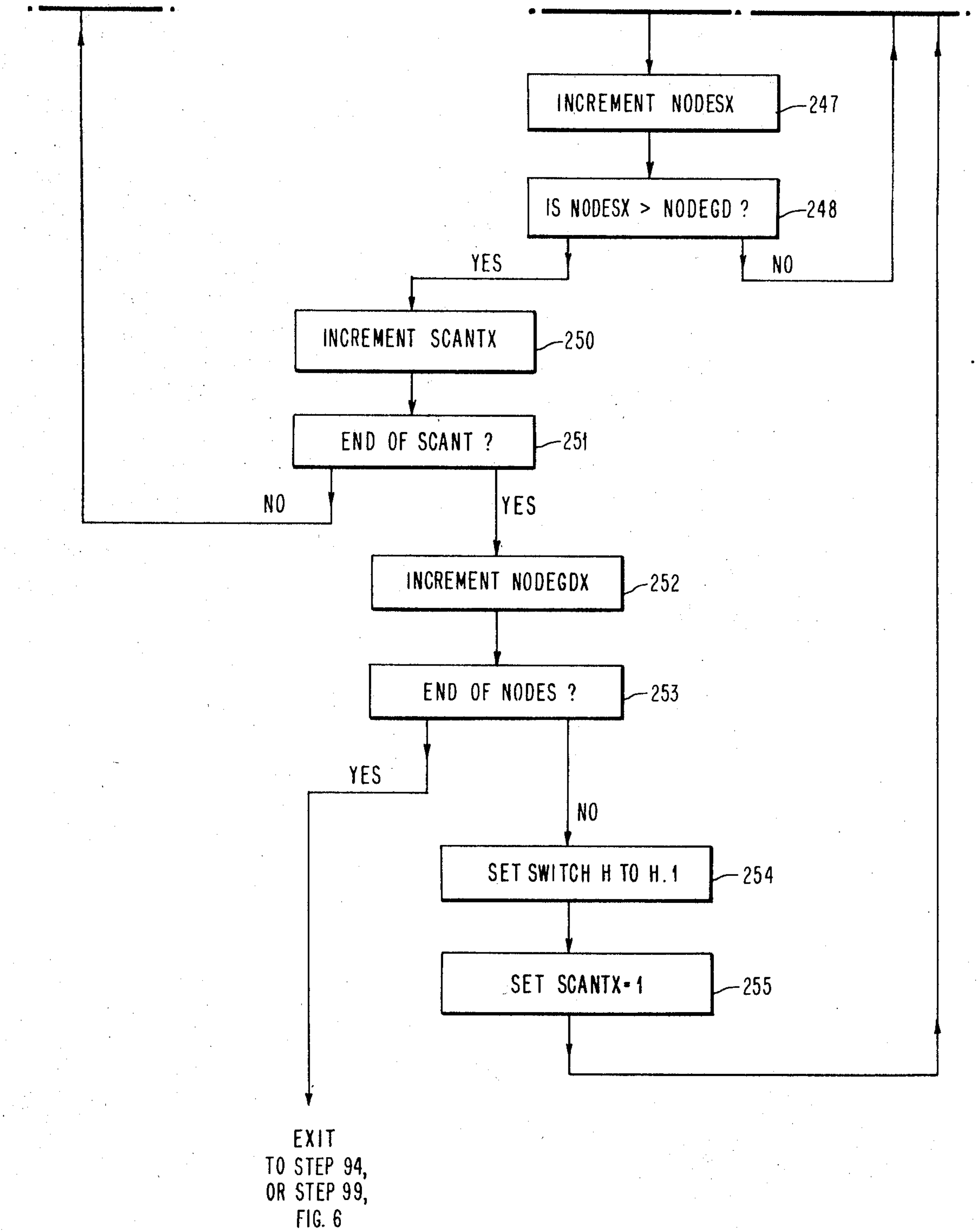

The RIPPLE1 and RIPPLE2 routines at steps 93 and 98, respectively, FIG. 6, are essentially the same procedure, using the common RIPPLE flow chart shown in FIGS. 21A and 21B. In each case, a NODES table and a NODEGD table supply the information needed for effecting a conversion of the equivalent nodes or zone labels in the corresponding scan table SCANT to a common label for the area which contains the connected zones. This is advantageous in that it enables the entire set of coordinate points or bit positions within that area to be addressed by a single label or calling symbol.

The RIPPLE routine shown in FIGS. 21A and 21B now will be described with particular reference to the scan table for SUBPANEL 11, FIG. 8, and the NODES1 and NODEGD1 tables for this same subpanel, FIG. 12. Since it is being performed at a first or subpanel level, this will be a RIPPLE1 routine. The first step in this routine is to initialize the address pointers NODEGDX (FIG. 12) and SCANTX (FIG. 8) to their "1" settings and set a switch H, FIG. 21A, to its H.1 state, as indicated at step 240, FIG. 21A.

There now follows a sequence of steps 241–244 for finding the first node (FNODE) in the current series of connected nodes. At step 241 the NODEGDX setting is decremented by 1. In the present instance, this means that NODEGDX, FIG. 12, now has a current value of 0. At step 242, FIG. 21A, NODESX is set equal to the current NODEGD entry value (0) plus 1. Thus, in the present instance, the current value of NODESX is now 1 (FIG. 12). At step 243, the value of NODEGDX is incremented in order to restore it to the same value (1) which it had before being decremented at step 241.

The operation now advances through switch H and its output branch H.1 to step 244, where the value of the variable FNODE is set equal to the current NODES entry value. Referring to FIG. 12, NODESX currently is set at 1, and the current NODES entry is "2", this being the first node in the connected series of nodes 2, 1. Hence, FNODE now assumes the value 2, which is to become the common area label for this connected component of the pattern. At step 245, switch H is reset to H.0 and the operation then proceeds to step 246, where an inquiry is made as to whether the current LABEL 1 value in SCANT (FIG. 8) equals the current NODES value (2). At present, SCANTX=1 and LABEL1=1. Hence, the test step 246 has a "no" output.

At step 247, NODESX is incremented by 1, going from 1 to 2. At step 248, a test is made to determine whether NODESX has gone beyond the current NODEGD entry value (2), which marks the end of the current connected-nodes set. If it has not, then the operation returns to switch H, which currently is in its H.0 state. This advances the operation to step 246, where the LABEL1 value (1) for the current SCANTX setting (1) is compared with the current NODES entry value (now 1). Since the values of LABEL1 and NODES now agree, the operation branches to step 249, where the LABEL1 value (1) for the current SCANTX setting (1), FIG. 8, is now changed to the current FNODE value (2). Thus, as may be seen by a comparison of FIG. 8 and FIG. 22, LABEL1 changes from "1" to "2" at the scan table address where SCANTX=1.

If there had been additional nodes in the current series of connected nodes, each of these in turn would have been compared with the current LABEL1 value. This cycle is repeated for as many times as there are connected nodes in the current series, at each setting of SCANTX, regardless of where the match occurs in the series. In the present instance, since it is assumed that there are only two connected nodes in the series, the incrementing of NODESX at step 247 now causes it to exceed the current NODEGD value (2). This results in a "YES" output at step 248, and the operation branches to step 250, FIG. 21B, where SCANTX is incremented to the next position (2) in SCANT, FIG. 8.

At step 251, a test is made to determine whether the end of the scan table has been reached. (i.e., does SCANTX now exceed the maximum value which it is supposed to have in this particular scan table?) If not, the operation now returns to step 241, FIG. 21A. From here on, much of the operation described above is repeated. Steps 241 and 242 are executed to return the NODESX setting back to the first node of the current series of connected nodes. Since the value of FNODE already has been established for this series, steps 244 and 245 are bypassed. Steps 264–249 are performed as many times as necessary in order to compare each node in the current series with the current LABEL1 value and effect a conversion of LABEL1 to the FNODE value wherever LABEL1 differs from FNODE but matches one of the other nodes in the same series.

Eventually all of the nodes in the current series will have been compared with each of the LABEL1 values in the various SCANT entries, and appropriate conversions of LABEL1 values to the common FNODE value will have been made wherever applicable. When this process reaches the end of the scan table, the test at step 251 will yield a "yes" output, and it is time now to start processing the next series of connected nodes if any. Accordingly, at step 252, the NODEGDX address pointer is incremented by 1. A test then is made at step 253 to determine whether the final or only set of connected nodes already has been processed, that is to say, whether NODEGDX now exceeds the maximum value which it can have for this particular table of nodes. In the present case (FIG. 12) this is true, and the system now exits from the RIPPLE routine.

If one or more additional sets of connected nodes remain to be processed, the operation branches from step 253 to step 254, FIG. 21B, where switch H (FIG. 21A) is set to H.1. At step 255, the value of SCANTX is reset to 1, and the operation then returns to switch H and thence through its H.1 branch to step 244. It may be recalled that as the processing of the immediately preceding run of connected nodes neared its end, NODESX was incremented at step 247 to a value which exceeded the then current NODEGD value by 1. Hence, NODESX now is already at the "first node" position in the next series of connected nodes, so that the current NODES entry may be taken as the new FNODE value. Accordingly, at step 244, FNODE is set equal to the current NODES entry, and the processing of the new set of connected nodes may begin.

Figure 23:
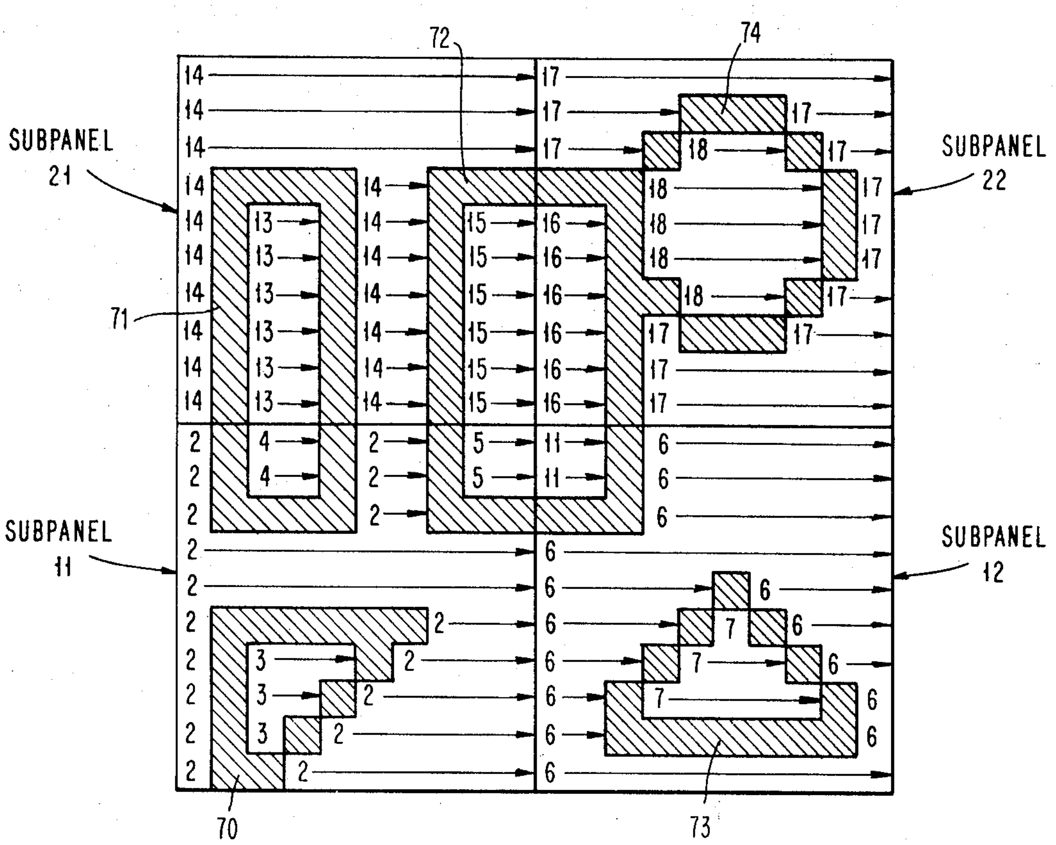
FIG. 23 is a view similar to FIG. 7 but showing the zone number conversions which have been effected by the RIPPLE1 routine.

As the result of "rippling through" the scan table for SUBPANEL 11 and converting equivalent zone labels to a common label, the LABEL1 entries for this scan table now appear as shown in FIG. 22. The "1" value formerly assigned to certain LABEL1 entries in this table (FIG. 8) has been replaced by the equivalent "2" values as shown in FIG. 22. The effect of the first-level zone number conversions performed by RIPPLE1 upon subpanel 11 and the other subpanels is depicted in FIG. 23. Within each subpanel, only one zone number now is assigned to each region or portion of a region therein, as compared with a plurality of such designations in the situation depicted by FIG. 7.

There still remains the task of matching equivalent zone designations among the various subpanels, so that universal area labels may be applied to the various connected regions whose boundaries extend across the subpanel borders. This function is performed by the SCAN2A and SCAN2B routines (higher-level scanning or "seam stitching" operations), the CONCOMP2 routine and the RIPPLE2 routine, respectively represented as steps 95–98 of the general flow chart, FIG. 6. These procedures now will be described.

SCAN2A FIGS. 24–26

It is assumed that the sequence of steps numbered 90–94, FIG. 6, has been performed as many times as required to complete the first-level processing operations upon the subpanels, and the system now is ready to perform the higher level processing operations, commencing with the SCAN2A routine at step 95.

Figures 25, 26:
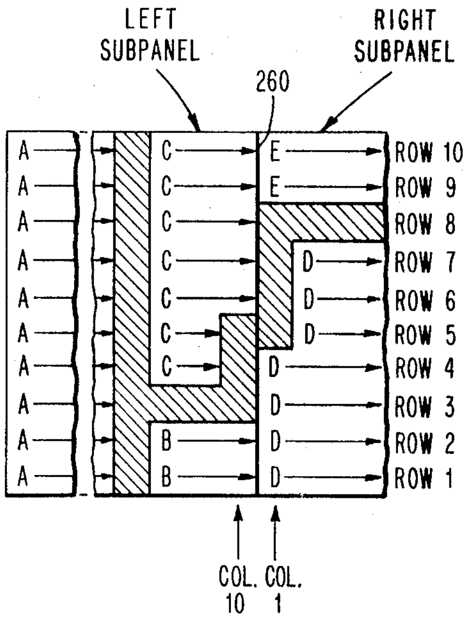
FIGS. 25 and 26 are diagrams which illustrate, with reference to an alternative example, how the SCAN2A routine matches corresponding zone designations along a vertical border between subpanels in order to build up a second level equivalence table, EQTAB2. (The term "vertical" herein means a direction at right angles to the direction of the rows.)

To explain the SCAN2A (or vertical seam stitching) procedure, a relatively simple example depicted in FIG. 25 is chosen. The "left subpanel" and "right subpanel" fragmentarily shown in this figure represent any pair of adjoining subpanels having a vertical border 260 across which zone equivalencies are to be established. To avoid confusion with the example shown in FIG. 23, alphabetic zone labels are applied to the regions shown in the example of FIG. 25.

Figure 24A:
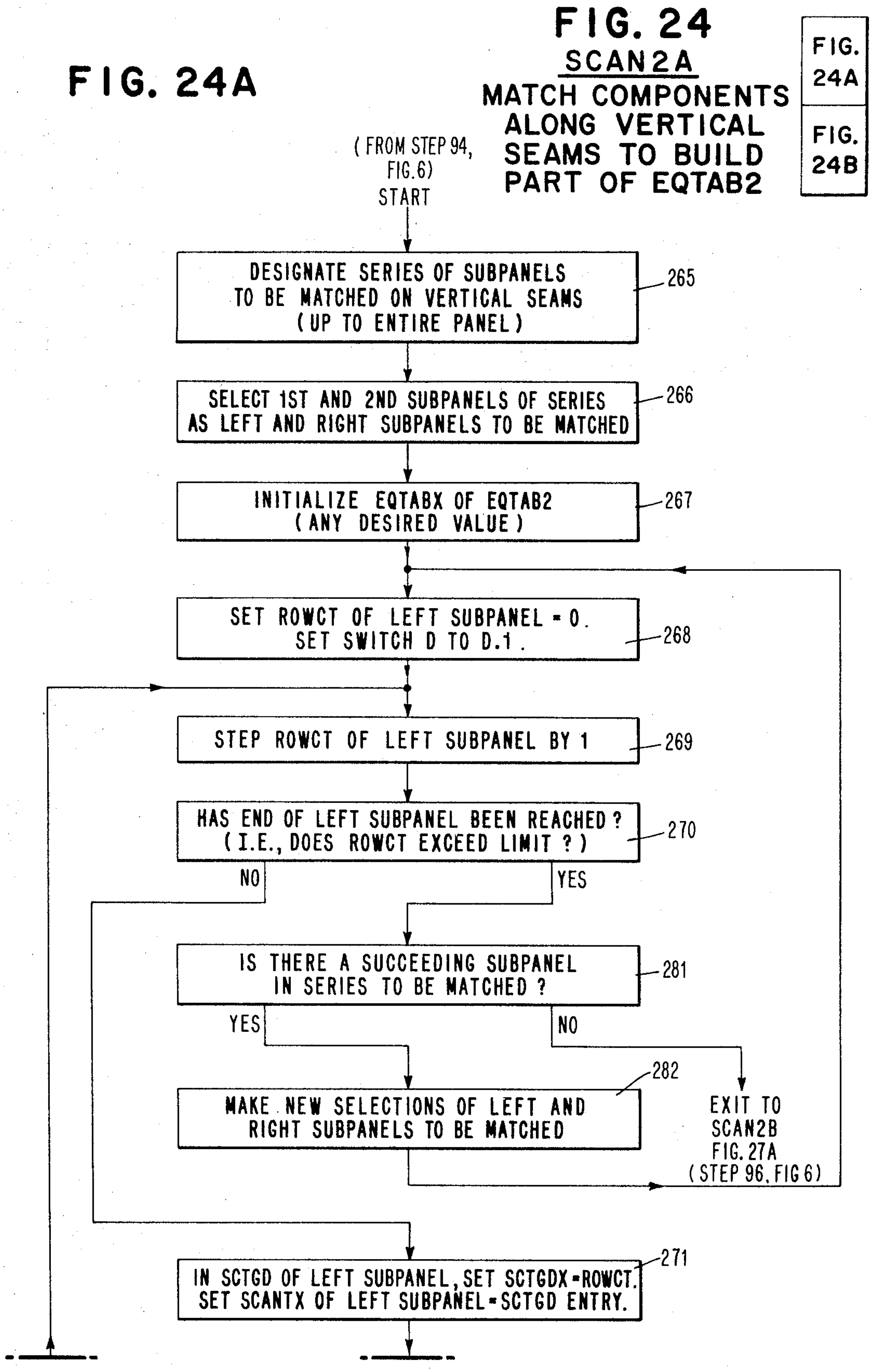
FIGS. 24A and 24B, when assembled as indicated by FIG. 24, constitute a flow chart of the SCAN2A routine to which reference is made in FIG. 6.

As a first step 265 in the SCAN2A procedure, FIG. 24A, the operator designates a series of subpanels to be matched, the first two members of this series being the "left subpanel" and "right subpanel" to be matched during the first run of this operation. A procedure could be set up for automatically making this selection, of course, but there may be instances when it desired to match only certain ones of the subpanels, and the procedure should be flexible enough for this contingency. At step 266, the first pair of panels is designated as the left and right subpanels, respectively, and in subsequent runs succeeding pairs of subpanels will be chosen. Some of the subpanels may serve both as left and right subpanels in different runs.

A portion of a second-level equivalence table, EQTAB2, will be built up by the SCAN2A routine (for example, entries 1–4 of EQTAB2, FIG. 29), the remainder of EQTAB2 being built up by the succeeding SCAN2B routine, described hereinafter. FIG. 26 shows the portion of EQTAB2 which will be constructed when the SCAN2A routine is applied to the example shown in FIG. 25. Referring again to FIG. 24A, the address pointer EQTABX of EQTAB2 is initialized to any desired value at step 267. The starting address is left optional because in some instances (for example, where a part of the panel is being rescanned because of some modification of the original pattern) one may wish to continue building upon the old EQTAB2 table rather than build a whole new equivalence table.

The left subpanel is arbitrarily treated herein as the reference subpanel with which the adjoining right subpanel is to be matched. The ROWCT register of the left subpanel is initialized to 0, and a switch D (FIG. 24B) is set to D.1, at step 268, FIG. 24A. Then, at step 269, ROWCT is incremented by 1. At step 270, a test is made to determine whether the ROWCT setting has gone past the maximum row number of the subpanel. If not, the operation advances to step 271.

At this point in the operation, it becomes necessary to retrieve the label of the last or rightmost zone in the current row of the left subpanel, this being the zone adjacent to the border 260 between the two subpanels. In the case of ROW 1, FIG. 25, for example, this zone label would be "B". Steps 271 and 272, FIGS. 24A and 24B, perform this retrieval function. At step 271, reference is made to the entry in the left subpanel scan table guide (SCTGD) where SCTGDX equals the current ROWCT value ("1" in the present case). The SCTGD entry at this address denotes the address in the left subpanel scan table (SCANT) at which the label for the final or rightmost zone in the current row of that subpanel may be found. The address pointer SCANTX of the left subpanel SCANT is set equal to this SCTGD value, and at step 272, FIG. 243, the LABEL1 value at this SCANT address is read, this being the zone label that was sought. At step 273, this zone label is tested to see whether it is a boundary symbol (FFFF). Assuming it is not, the operation progresses to step 274.

At this point, it is necessary to retrieve the label of the first or leftmost zone in the corresponding row of the right subpanel. This is accomplished in steps 274 and 275. At step 274, the address pointer SCTGDX of the right subpanel SCTGD is set to a value 1 less than the current SCTGDX value of the left subpanel SCTGD. With this setting, the value of the current right subpanel SCTGD entry is the address in the right subpanel SCANT of the zone immediately preceding the one which is now being sought. To retrieve the zone that is being sought, the right subpanel SCANTX value is set equal to 1 more than the current SCTGD entry, as indicated at step 274. The current SCANT entry now corresponds to the zone that is being sought, namely, the zone in the right subpanel which adjoins the border 260 (FIG. 25) directly opposite the zone adjoining this border which has just been identified in the left subpanel. In the case of ROW 1, for example, zone D in the right subpanel would be the counterpart of zone B in the left subpanel. At step 275, the LABEL1 value is read from the current SCANT entry in the right subpanel SCANT, and at step 276, this label is tested to see whether it is a boundary symbol. If it is not, the operation advances to switch D, FIG. 24B.

The purpose of switch D is to prevent (insofar as practicable) the duplication of entries into the second-level equivalence table EQTAB2, FIG. 26. Initially, switch D is set to D.1 (step 268, FIG. 24A). If the two row zones on either side of the border 260 are space zones (as they would be in the case of ROW 1, FIG. 25), then the operation will proceed form step 276, FIG. 24B, through switch D to step 277, where the two zone labels that were retrieved in steps 272 and 275, respectively, are entered into the current address of EQTAB2 as the left and right EQTAB entries (FIG. 26). Thus, labels B and D now become the left and right entries in EQTAB2 at the current address therein. In FIG. 26, it is assumed that this current address is 1. However, as mentioned hereinabove in connection with step 276, FIG. 24A, EQTABX may be initially set to some starting value other than 1 if desired.

Step 278, which is performed next, resets switch D to D.0 in order to prevent unnecessary duplications of the entry just made into EQTAB2. This will be explained presently. At step 279, the address pointer EQTABX, FIG. 26, is advanced one entry, and the operation then returns to step 269, FIG. 24A, where ROWCT is incremented to the next row number.

Figure 24B:
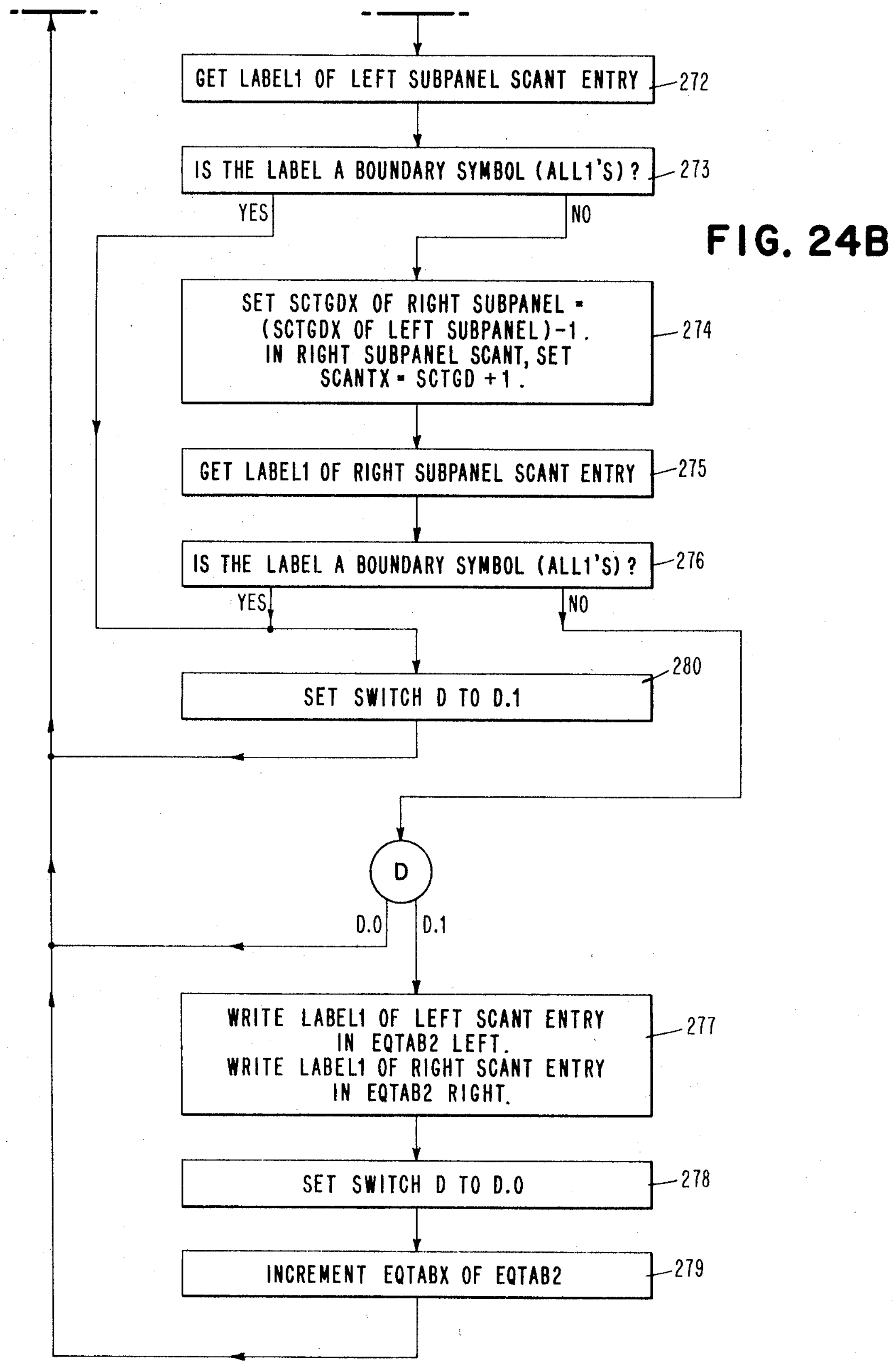

Steps 269–276 are repeated for row 2, FIG. 25. The zone labels B and D again have been retrieved. However, a duplicate entry of B and D into EQTAB2 is prevented by virtue of the fact that switch D, FIG. 24B, is now in its D.0 state, causing the operation to return at this time to step 269. Steps 269–273 now are performed for row 3. At step 273, it is ascertained that the left zone label is a boundary symbol. There is no need to make an entry into the equivalence table if either (or both) of the zone labels retrieved at steps 272 and 275 is a boundary symbol. In either case, the operation is bypassed to step 280, where switch D is set to D.1, and the operation then returns to step 269. This type of action will occur as long as either of the two row zones adjoining the border is a boundary zone. In the case of the pattern shown in FIG. 25, this bypassing operation will occur for each of ROWS 3 to 8, inclusive.

At ROW 9, two nonboundary zone labels C and E are retrieved. Switch D now is in its D.1 state. At step 277, the labels C and E are entered into the current address of EQTAB2 as left and right EQTAB entries. Switch D is reset to D.0 at step 278, thereby preventing an identical entry from being made into EQTAB2 when ROW 10 is processed.

When the end of the subpanel is reached (step 270), an inquiry is made at step 281 to ascertain whether any additional subpanel is left in the series to be matched along vertical borders. If there is, a new selection of left and right subpanels is made at step 282, and the operation then returns to step 268. Otherwise, the operation exits from the SCAN2A routine and proceeds to the SCAN2B routine for matching zones along horizontal seams or borders. It should be noted that the initiation of SCAN2B awaits the completion of SCAN2A for all subpanels.

SCAN2B FIGS. 27 & 28

Figures 27, 27A:
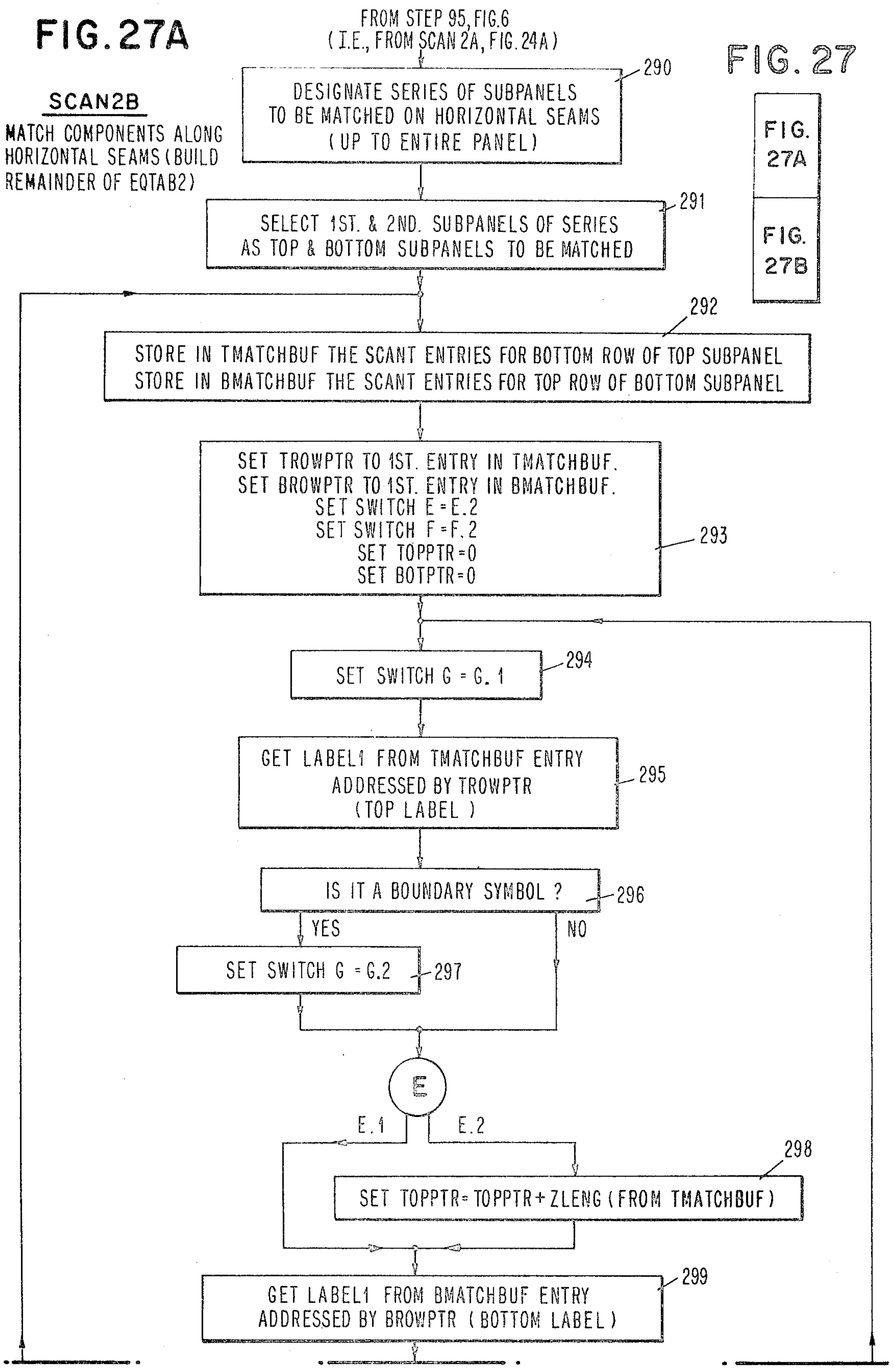
FIGS. 27A and 27B, when assembled in the manner indicated by FIG. 27, constitute a flow chart of the SCAN2B routine to which reference is made in FIG. 6.
Figure 27B:
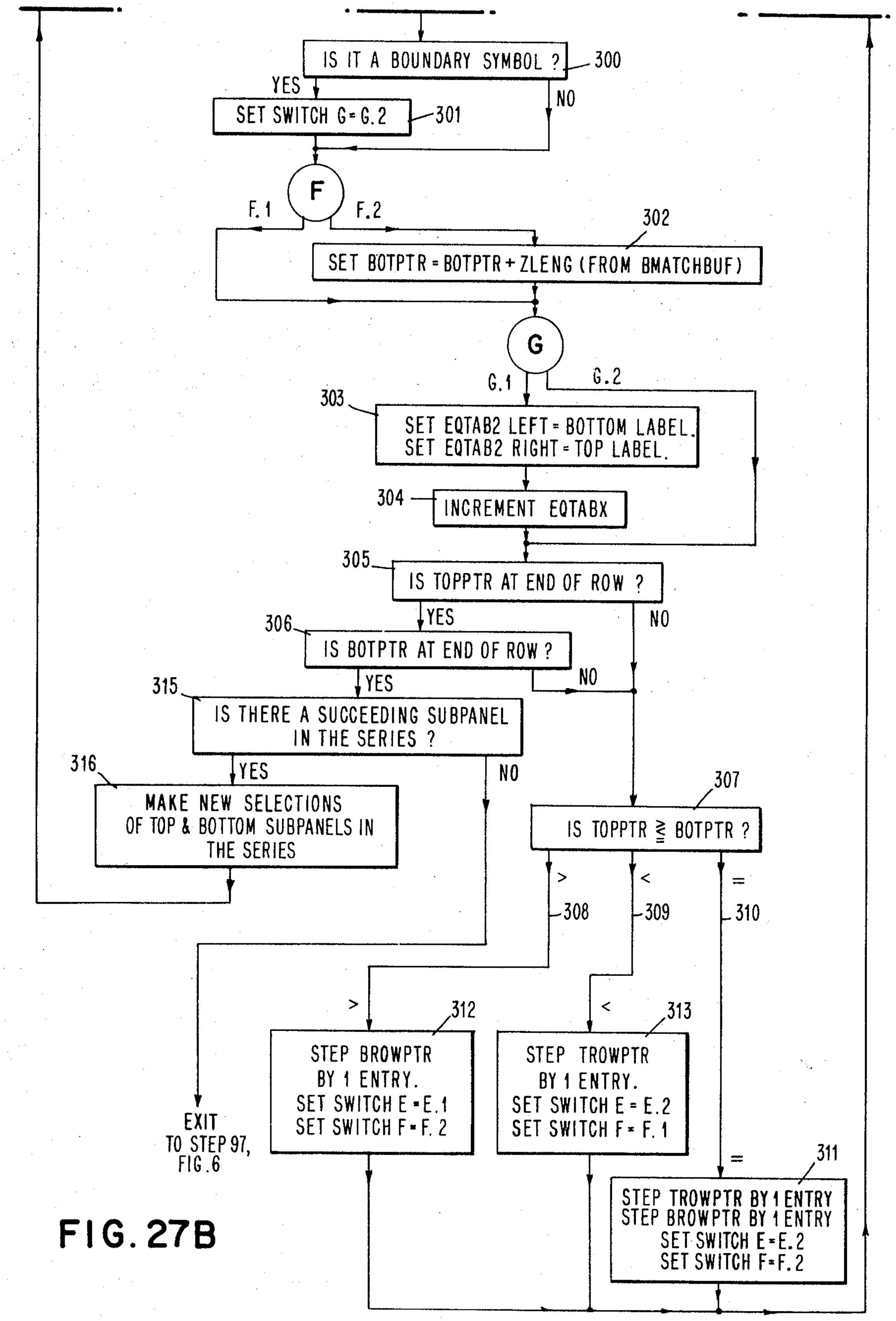

The SCAN2B or horizontal seam-stitching routine, FIGS. 27A and 27B, completes the building up of the second-level equivalence table EQTAB2. When SCAN2A was terminated, the EQTABX address pointer for EQTAB2 (FIG. 26, for example) was advanced to the next entry location in EQTAB2, which now becomes the initial EQTABX setting for the SCAN2B routine. Thus, the SCAN2B routine merely completes whatever EQTAB2 table was started by the SCAN2A routine. FIG. 29 shows EQTAB2 as it would appear after the completion of the SCAN2A and SCAN2B operations upon the example shown in FIG. 23.

The principle of the SCAN2B process is illustrated in FIG. 28, which shows an alternative example using alphabetic characters rather than numbers to designate the various zones. In this instance, it is assumed that a pair of subpanels sharing a horizontal border line 285 has been chosen for zone-matching purposes. Only the bottom row of the top subpanel and the top row of the bottom subpanel are represented in FIG. 28.

The selection of subpanel pairs for matching may be performed manually or automatically. In FIG. 27A, the flow chart steps 290 and 291 merely specify that a series of subpanels is selected according to the sequence in which the subpanel pairs are to be matched. If the entire panel is to be operated upon, the selection could be performed automatically. However, if only selected subpanels are to be matched during this operation, then the operator would make the desired selection. For instance, if a part of the pattern is to be modified after having been processed, one would want to operate upon only those subpanels adjoining the affected borders. This will be explained more fully hereinafter.

The SCAN2B process utilizes a pair of buffers respectively designated TMATCHBUF and BMATCHBUF for storing the scan table entries that pertain respectively to the bottom row of the top subpanel and the top row of the bottom subpanel. This can be seen more clearly with reference to FIG. 28, which represents the TMATCHBUF and BMATCHBUF scan table entries for the example shown in this figure. Each entry comprises a zone length ZLENG and zone label LABEL1. The storing of the respective SCANT entries in the two buffers is represented at stage 292, FIG. 27A.

Associated with the match buffers are address pointers respectively designated TROWPTR and BROWPTR, schematically represented in FIG. 28. At step 293, FIG. 27A, TROWPTR and BROWPTR are set to the first entries in their respective buffers TMATCHBUF and BMATCHBUF. Also, at step 293, switches E (FIG. 27A) and F (FIG. 27B) are set to their E.2 and F.2 states respectively.

Two index values respectively designated TOPPTR and BOTPTR are respectively associated with the top subpanel row and the bottom subpanel row as indicated in FIG. 28. Although FIG. 28 represents TOPPTR and BOTPTR as though they were address pointers which can be advanced from column to column, they actually can be mere cumulative quantities which are compared with each other at certain points in the sequence of operation. Initially, TOPPTR and BOTPTR are set to 0 as indicated at step 293, FIG. 27A.

The operation now advances to step 294, where a switch G (FIG. 27B) is set to its G.1 state. Then, at step 295, the first zone label (J) in the top subpanel row is fetched from the TMATCHBUF entry addressed by TROWPTR, this being known as the "top label." At step 296, the system inquires whether this zone label is a boundary symbol. If it is, the switch G is now set to its G.2 state at step 297 and the operation advances to switch E. If the top label is not a boundary symbol, the operation goes from step 296 to switch E. In either event, the operation then proceeds through branch E.2 to step 298.

At step 298, the TOPPTR value is increased by an amount equal to ZLENG in the currently addressed TMATCHBUF entry. In other words, the length of the current top zone (J) is now added to TOPPTR, thereby figuratively moving this pointer to the final column position in that zone.

At step 299, the zone label (G) in the currently addressed BMATCHBUF entry, herein referred to as the "bottom label," is fetched. At step 300, the system inquires whether this bottom label is a boundary signal. If it is, the operation proceeds through step 301 (where switch G is set to G.2) and thence to switch F. If the bottom label is not a boundary signal, the operation advances from step 300 to switch F. In either event, the operation proceeds through branch F.2 to step 302. (It should be noted here that the switch paths E.2 and F.2 of FIGS. 27A and 27B, always are selected during the first pass through the SCAN2B sequence of operations. In subsequent passes, this will not necessarily be true.)

At step 302, the value of BOTPTR is increased by an amount equal to ZLENG in the currently addressed BMATCHBUF entry. This has the effect of figuratively advancing BOTPTR to the final column position in the current bottom zone. The operation then advances to switch G. If neither of the currently addressed zones in the top and bottom subpanel rows is a boundary zone, switch G is in its G.1 state at this time, signifying that an entry is to be made into the equivalence table EQTAB2 for equating the two zone labels. This function is performed at step 303, where the left and right EQTAB entries in the currently addressed location in EQTAB2 (address "*a*", FIG. 28) are set respectively equal to the bottom label and the top label. Thus, in the example shown in FIG. 28, G would become the left EQTAB entry and J the right EQTAB entry in EQTAB2. When this is accomplished, the setting of EQTABX is incremented at step 304.

At step 305, the system inquires whether the TOPPTR is at the end of row, i.e., whether its value equals N, the number of column positions in that row. If the answer is "YES," the operation then advances to step 306 where a similar inquiry is made with respect to the BOTPTR value. If either TOPPTR or BOTPTR has not yet reached the end of the row, the operation then proceeds to step 307 where a comparison is made between the respective values of TOPPTR and BOTPTR. Depending upon whether TOPPTR is greater than, less than or equal to BOTPTR, the operation may proceed through branch 308, 309 or 310, respectively. If TOPPTR and BOTPTR are equal, as would be true in the case of zones J and G, FIG. 28 for example, the operation now advances to step 311, FIG. 27B where the following actions occur: The buffer pointers TROWPTR and BROWPTR are each advanced one entry in their respective match buffers, FIG. 28. Switches E and F are set to their E.2 and F.2 states, respectively. The operation then returns to step 294, FIG. 27A.

If the value of TOPPTR should exceed the value of BOTPTR, the operation proceeds along branch 308, FIG. 27B, to step 312, where the following actions occur: The address pointer BROWPTR for the bottom match buffer (B-MATCHBUF) is advanced one entry. The position of TROWPTR, however, remains unchanged. Switch E is set to its E.1 state, and switch F is set to its F.2 state. The operation then returns to step 294, FIG. 27A.

If the value of TOPPTR is less than that of BOTPTR, the operation proceeds through branch 309 to step 313 where the following actions occur. TROWPTR is advanced one entry, FIG. 28, while BROWPTR is unchanged. Switch E is set to its E.2 state and switch F to its F.1 state. The operation then returns to step 294.

When switch E, FIG. 27A, is in its E.1 state, which occurs only when the value of TOPPTR exceeds that of BOTPTR (step 312, FIG. 27B), step 298 is bypassed during the next sequence of operations 294–307, causing the value of TOPPTR to remain unchanged. Similarly, if switch F is in its F.1 state, which occurs only when the value of TOPPTR is found to be less than that of BOTPTR (step 313, FIG. 27B), step 302 is bypassed during the next sequence of operations 294–307, so that the value of BOTPTR remains unchanged during this sequence.

Switch G1 assumes its G.2 state if either the top label or bottom label (or both) is found to be a boundary symbol. Under these circumstances, the steps 303 and 304 are bypassed so that no entry is made into EQTAB2 during that particular sequence. Boundary zone labels are not entered into equivalence tables because a boundary is equivalent only to another boundary, and no distinction is made between boundary labels.

Eventually, both the TOPPTR and BOTPTR values will equal the row length (steps 305 and 306). At step 315, the system inquires whether there is a succeeding subpanel in the series to be processed. If there is, new selections of top and bottom subpanels are made at step 316. The operation then returns to step 292, FIG. 27A, for processing the new pair of subpanels. If no further subpanels remain to be processed, the operation exits from the SCAN2B routine and advances to the CONCOMP2 routine, step 97, FIG. 6.

The result of applying SCAN2B to the example shown in FIG. 28 is the portion of EQTAB2 shown in this same figure. The application of SCAN2B to the example shown in FIG. 23 gives the portion of EQTAB2 comprising entries 5–10, FIG. 29.

CONCOMP2 FIGS. 11A, 11B & 29

It was explained hereinabove that the flow chart in FIGS. 11A and 11B is equally applicable to the CONCOMP1 and CONCOMP2 routines (steps 92 and 97, FIG. 6). The various operations involved in CONCOMP1 having been described in detail above, a detailed description of CONCOMP2 therefore will not be presented herein. Briefly, CONCOMP2 utilizes the EQTAB2 table built by the SCAN2A and SCAN2B routines to develop the second-level NODES2 and NODEGD2 tables, which define the respective sets of connected nodes in the panel as a whole.

For example, assuming that the first-level operations in steps 90 through 94, FIG. 6, have produced the first-level zone label distribution shown in FIG. 23, then the effect of the SCAN2A and SCAN2B operations (steps 95 and 96, FIG. 6) is to build the second-level equivalence table, EQTAB2, shown in FIG. 29. From these EQTAB2 entries, the CONCOMP2 routine (step 97, FIG. 6) will build the second-level NODES2 and NODEGD2 tables shown in FIG. 29 for the panel as a whole.

As indicated by the entries in NODEGD2, the entries in NODES2 are divided into three sets of connected nodes, the first set comprising the first six entries (1–6), that is, the nodes or zones labeled 2, 14 and 17. It will be noted that some of these are duplicate entries. Thus, label 14 is duplicated in two NODES entries of this table, as is also label 17. Such duplication is inconsequential, however. To eliminate it, one would have to add more steps to the CONCOMP routine without gaining any material advantage in so doing. Hence, any duplications of NODES entries may readily be tolerated in the present scheme.

From FIG. 23, it appears that the first set of connected nodes 2, 6, 14 and 17 relates to the background region of the entire panel. The second set of connected nodes (entries 7–10 in NODES2, FIG. 29) comprises nodes 5, 11, 15 and 16, which relate to the region enclosed by the boundary 72, FIG. 23. The third set of connected nodes (entries 12 and 13 in NODES2, FIG. 29) consists of nodes 4 and 13, which relate to the region enclosed by boundary 71.

Upon completion of the NODES2 and NODEGD2 tables, the operation progresses to the RIPPLE2 routine (step 98, FIG. 6), which converts all equivalent zone or area labels as listed in these tables to universal area labels for the entire panel.

RIPPLE2 FIGS. 21A, 21B & 30

As explained hereinabove, the RIPPLE routine shown in the flow chart of FIGS. 21A and 21B is equally applicable to the first-level RIPPLE1 operation (step 93, FIG. 6) or the second-level RIPPLE2 operation (step 98, FIG. 6). Since RIPPEL1 already has been described in detail above, a detailed description of RIPPLE2 will not be presented herein.

Figure 30:
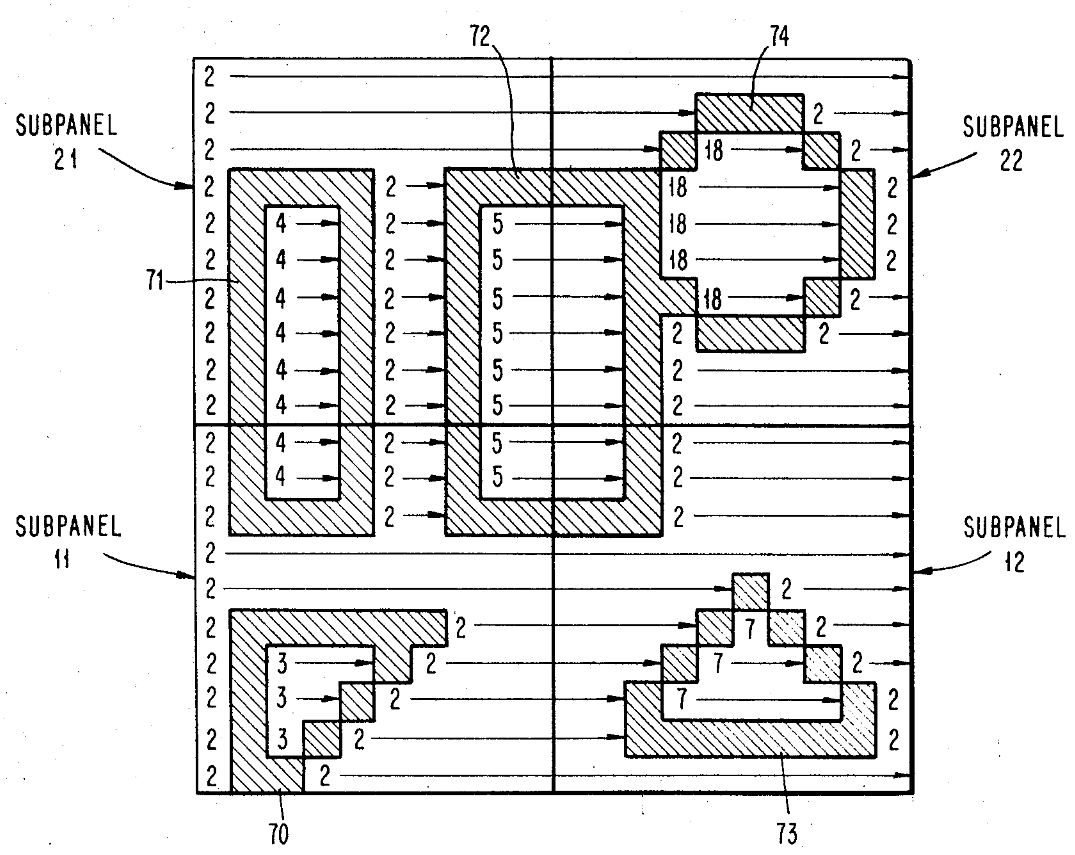
FIG. 30 is a diagram representing the pattern of FIG. 23 after the second-level RIPPLE2 operation has been performed thereon.

Assuming that RIPPLE1 produced the zone label distribution shown in FIG. 23, the RIPPLE2 routine now converts all equivalent zone labels in the various subpanels to universal area labels, as shown in FIG. 30, using the information stored in the NODES2 and NODEGD2 tables, FIG. 29. The first label or node in each set of connected nodes becomes the universal label for that area. Thus, referring to FIG. 30, each zone in the area enclosed by boundary 72 is identified by label 5. Each zone in the area enclosed by boundary 71 is identified by label 4. Each zone in the background area as a whole is identified by label 2.

The effect of RIPPLE2 is to convert all equivalent zone labels into a universal label for that particular set of connected nodes in each of the subpanel scan tables. Such a process will make no change in the scan table for SUBPANEL 11, FIG. 22, in which the conversion made by the RIPPLE1 process already has reduced the equivalent zone labels to their "first node" values. In the scan tables of other subpanels, however, appropriate zone label conversions will take place to reflect the conditions depicted by FIG. 30.

At this point, the universal area labels actually are manifested only in the scan tables for the various subpanels. Eventually, it is desired that these labels be visually associated with their respective subpanels as the same are displayed by the graphic display unit 54, FIG. 1. This is the function of the "LABEL AREAS" routine, step 100, FIG. 6. Before the operation proceeds to this stage (or at any other convenient time), a determination is made whether it will be necessary to rescan any part of the pattern. For the present, it will be assumed that such rescanning is not necessary. Subsequently herein (in connection with FIGS. 34–41) attention will be given to a case in which a portion of the original pattern is altered, thereby requiring that the modified subpanels be reprocessed.

LABEL AREAS FIGS. 31 & 32

After the subpanel scan tables have been revised by the RIPPLE2 process as described above, they contain the necessary information for enabling the system to perform any operation in which the bit positions contained in a region are addressed by one label or calling symbol, regardless of how many subpanels the region extends into. One such operation is LABEL AREAS, which involves the visual labeling of the pattern regions as the subpanels are displayed. In the case of the region enclosed by the boundary line 62 in FIG. 3, for example, there are four parts of this region lying respectively in the SUBPANELS 11, 12, 21 and 22. Assuming that only one subpanel may be displayed at a time, it is desired that any portion of the region bounded by line 62, when displayed on the screen 59, FIG. 1, shall be identified by the label "5," this being the universal area label that was assigned by RIPPLE2 to all zones of this region.

FIG. 32 is a composite representation of all four subpanel displays, as though they were being projected upon a single viewing screen, in order to show how the various areas identified by common labels relate to one another. As each subpanel is displayed, the symbols corresponding to its area labels are displayed also, these symbols being taken from the set of numbers 2, 3, 4, 5, 7 and 18 in the present example. Patterns having different configurations would in all probability involve different sets of numbers. It is apparent, that other desired symbols could be substituted for such numbers by devising a suitable routine for this purpose.

Figure 31:
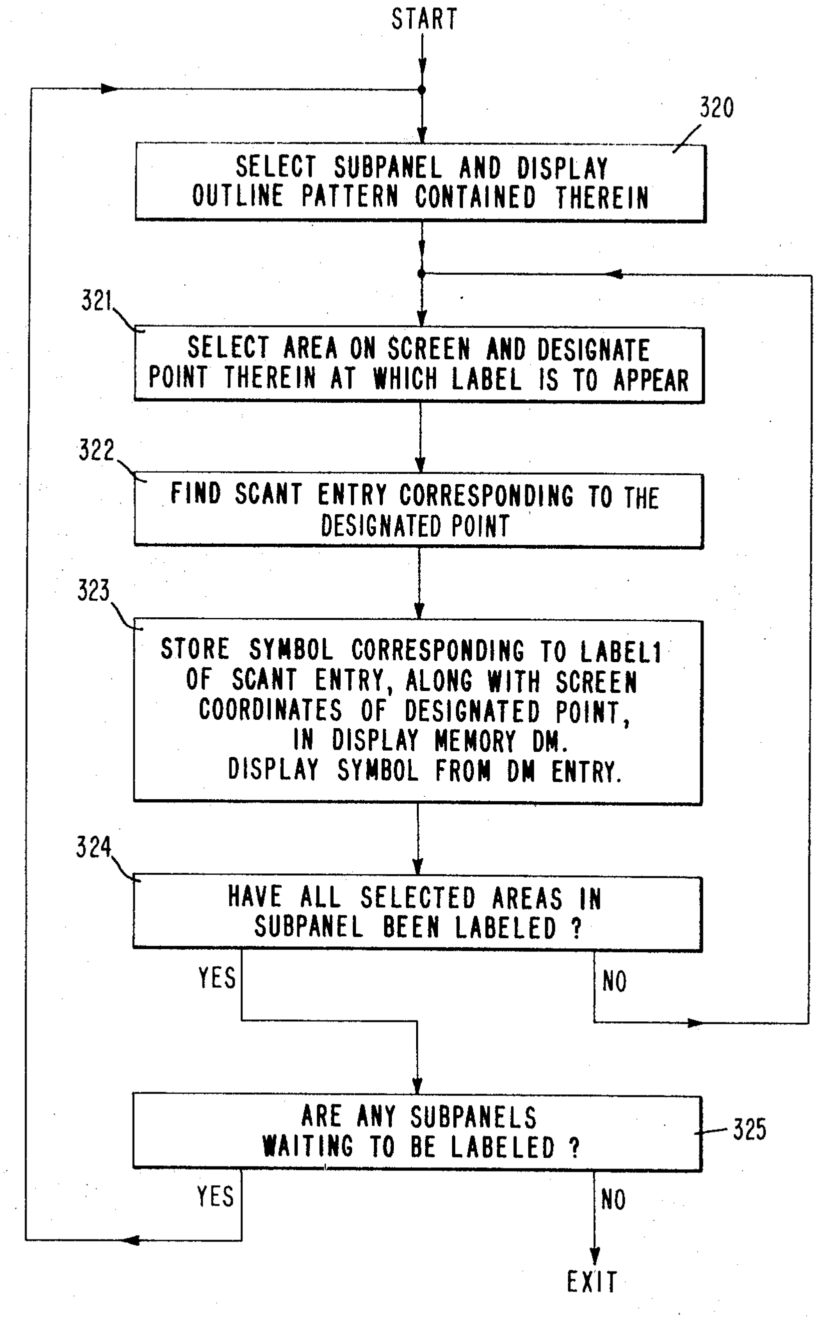
FIG. 31 is a flow chart of a subroutine for applying labels to the respective areas or regions of the pattern.

A procedure whereby the various area symbols and their screen grid coordinates are stored in the display memory DM, FIG. 1, is illustrated in the flow chart, FIG. 31. At step 320, in accordance with well known techniques, the operator (or some programmed routine) selects the subpanel to be displayed and causes the portion of the outline pattern contained within it to be displayed on screen 59, FIG. 1. At step 321, an area of the displayed pattern which is to be labeled is selected. This could be an automatic selection, but more likely it would be effected manually, by means of the light pen LP, FIG. 1. A point on the screen where the label is to be displayed within this selected area is also selected, by touching the light pen LP to it, for instance.

One of the functions of the light pen is to cause the screen grid coordinates of the selected point to be generated. These screen coordinates are readily convertible into the row and column coordinates of the subpanel outline memory OM. The designated point on the screen will correspond to a point in this subpanel storage matrix. The row segment containing that point will have a corresponding scan table entry, and this entry contains a label that applies to all zones of the region within which the designated display point is located.

At step 322, the function of finding the scan table entry which corresponds to the designated point is performed. This will be somewhat similar to the "GET LABEL2" subroutine shown in FIG. 10, and it is not shown in detail herein. Briefly, the SCTGDX is set to a value 1 less than the number of the row in which the point is located (this row number being derived from the screen "Y" coordinate), and SCANTX is set to a value 1 more than the SCTGD entry in order to find the SCANT entry at the beginning of the row containing the aforesaid point. The ZLENG values of the current row entries then are successively accumulated until their total equals or exceeds the column number of the designated point (as derived from the screen "X" coordinate). The current SCANT entry at the instant when this occurs is the entry containing the label which is to be displayed.

At step 323, FIG. 31, the retrieved zone label is stored in the display memory DM as a symbol to be displayed, along with the screen coordinates of the designated display point. From this stored data, the symbol identifying the selected area is generated for display on the screen at the designated point thereon.

At step 324, the system inquires whether all of the areas selected for labeling in the current subpanel have in fact been labeled; i.e., have the labels and their coordinates been stored in DM? If not, the operation returns to step 320.

When all of the selected areas in the subpanel have in fact been labeled, the operation advances to step 325, where the system inquires whether there are any more subpanels to be labeled. If there are, the operation returns to step 320; otherwise it exits from the routine.

AREA CALCULATION FIG. 33

Figure 33:
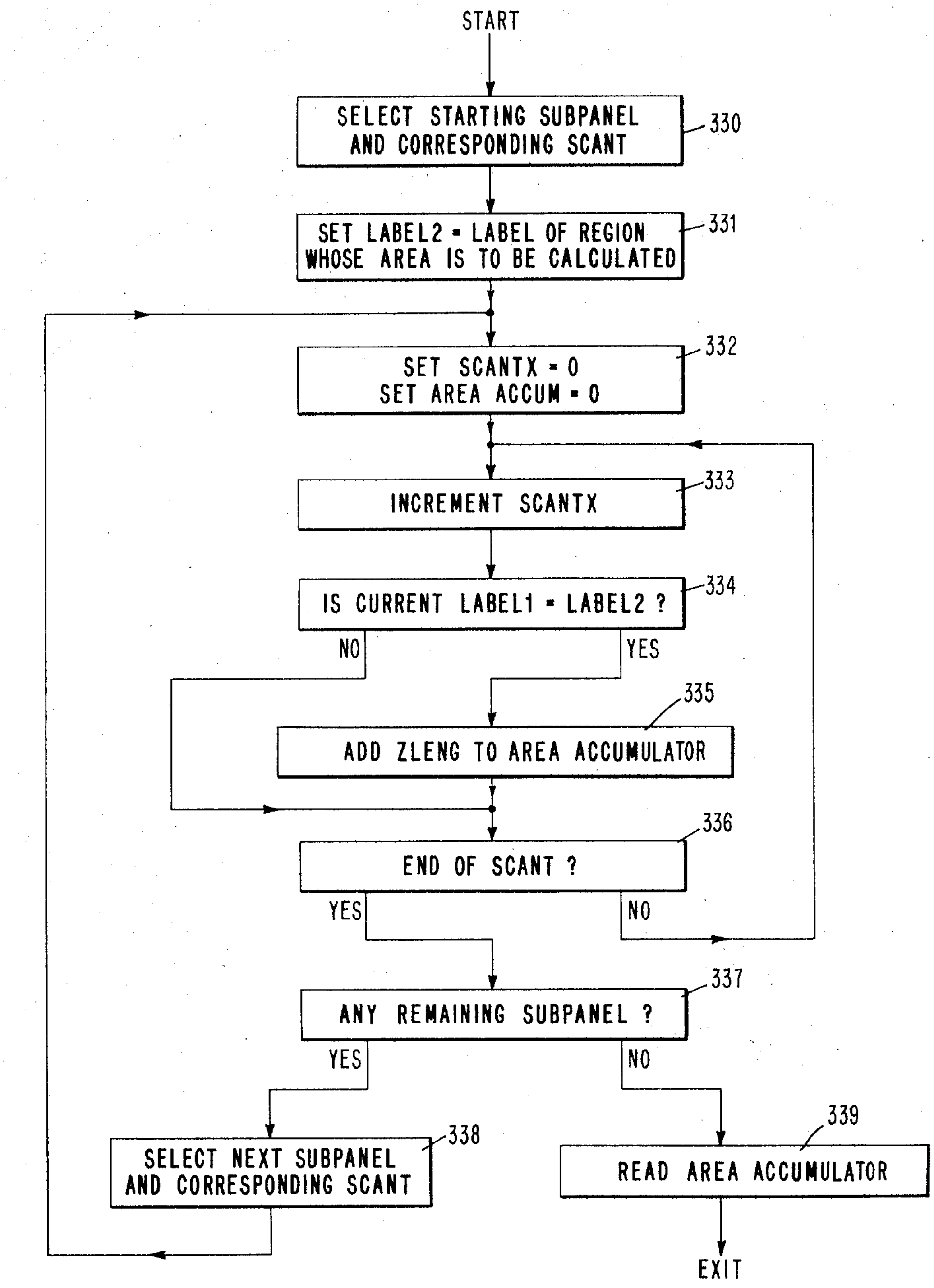
FIG. 33 is a flow chart of a subroutine for calculating the area for any given region bearing a designated label.

Since a connected region or component of a pattern may be defined as the space enclosed by its boundary, the number of "space bits" contained within all zones of that region will give a proportional measure of its area. Once the universal area labels have been assigned to all row zones in the various subpanels, it is then possible to utilize the subpanel scan tables for calculating the regional areas in terms of bit positions. FIG. 33 shows a flow chart for accomplishing this function.

It is assumed that a particular region has been selected for the area calculation (e.g., the region labeled "5" in FIG. 32). The subpanels are analyzed in sequence, such sequence being either manually or automatically selected. At step 330, FIG. 33, the starting subpanel and its associated scan table are selected. At step 331, the label of the region whose area is to be calculated is entered into the LABEL2 register (FIG. 1). At step 332, the SCANTX address pointer is reset to 0, and an area accumulator (not shown) is initialized to 0. At step 333, SCANTX is incremented by 1 for designating the current SCANT entry which is to be read. At step 334, the LABEL1 value in this SCANT entry is compared with the stored LABEL2 value. If the two values are equal, the ZLENG value (number of bit positions in the currently designated row zone) is entered into the area accumulator, and the operation then proceeds to step 336. If LABEL1 ≠ LABEL2, then the operation proceeds directly from step 334 to 336, with no entry being made into the area accumulator.

At step 336, inquiry is made to determine whether all of the SCANT entries have been checked. If not, the operation returns to step 333, where SCANTX is incremented to access the next SCANT entry. Each "matching" SCANT entry causes the area accumulator setting to be increased by the ZLENG value therein. Nonmatching SCANT entries do not affect the accumulated area value. Eventually the end of the current subpanel scan table is reached, and the operation then advances from step 336 to step 337, where it is ascertained whether there are any more subpanels to be analyzed. If there is another subpanel or subpanels to be checked, the next subpanel and its scan table are chosen at step 338, and the operation returns to steps 332–337.

When the last remaining subpanel has been processed, the operation advances to step 339, where the accumulated area value is read. This will give the area of the selected region, expressed as the number of space bit positions or blank grid squares lying within the regional boundary.

PATTERN MODIFICATION FIGS. 34–41

There may be occasions when the designer wishes to change a portion of the pattern. For instance, assume that the outline pattern shown in FIG. 3 is to be changed to the outline pattern shown in FIG. 34, wherein the individual regional boundaries 60, 61 and 62, FIG. 3, now have been combined into a single regional boundary 350 enclosing a region whose area includes the areas formerly enclosed by boundaries 60, 61, and 62 plus some portion of the background region. This is not meant to imply, of course, that the pattern may be modified only in this fashion. Any arbitrary modification of the pattern is permitted. Within the outline memory OM, this change in boundary configuration is reflected by rearranging the stored boundary bits and space bits to correspond with the grid panel representation of the modified pattern shown in FIG. 35, where the outline 360 formed by stored boundary bits corresponds to the boundary 350 in FIG. 34. Other reference characters shown in FIGS. 34 and 35 have the same significance that they do in FIGS. 3 and 4.

Figure 34:
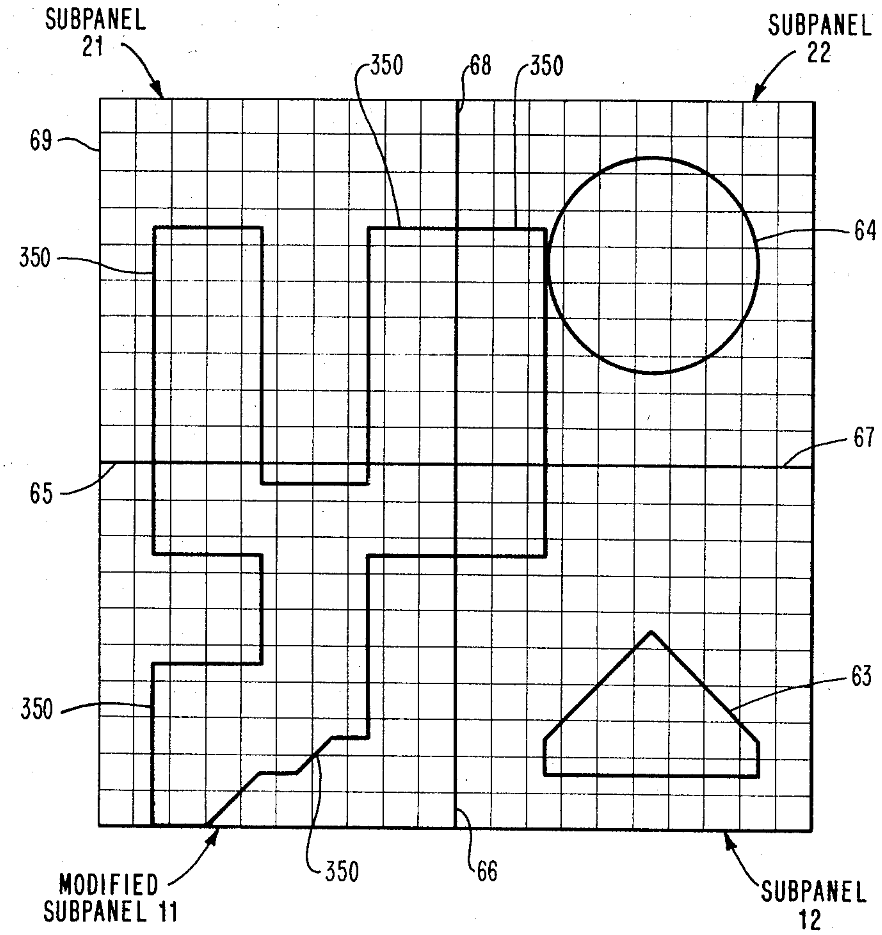
Figure 35:
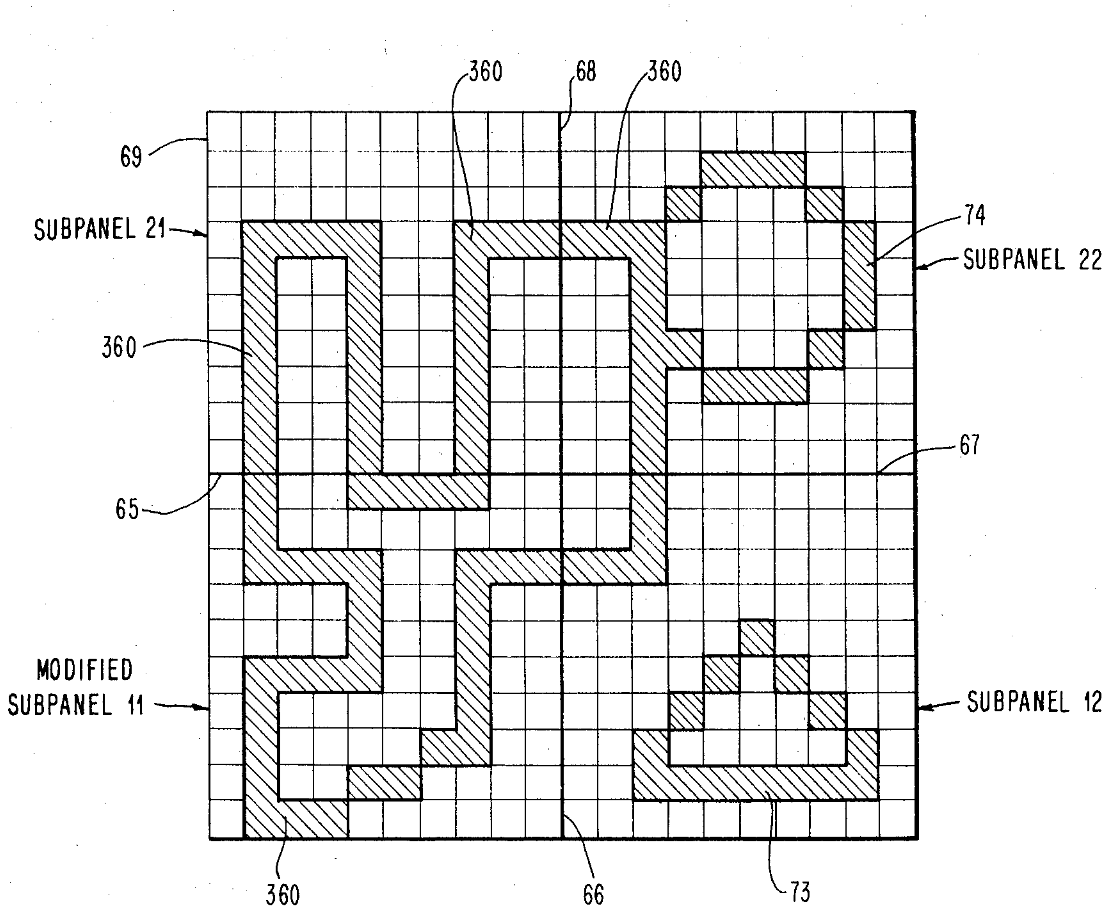

If the pattern modification is made prior to the processing of the pattern through the various steps indicated in FIG. 6, the pattern shown in FIG. 34 would be treated as an original pattern. For present purposes, however, it will be assumed that the procedure shown in FIG. 6 has been completed for the pattern represented in FIG. 3, and that the designer now wishes to modify the pattern as indicated in FIG. 34. Such modification may be effected by means of the light pen LP, FIG. 1, or by the combined actions of the pens LP and 56, in well-known fashion. It may be noted that in this particular pattern modification, only the portion of the pattern lying within the subpanel 11 has been changed. It is assumed that the data stored in the corresponding outline memory OM has been changed to correspond with these visual changes. Since only the subpanel 11 is affected, only the scan table for subpanel 11 need be rebuilt. Under these conditions, the SCAN1 routine, FIGS. 9A–9C, corresponding to step 91, FIG. 6) is performed with respect to SUBPANEL 11 only.

Figure 36:
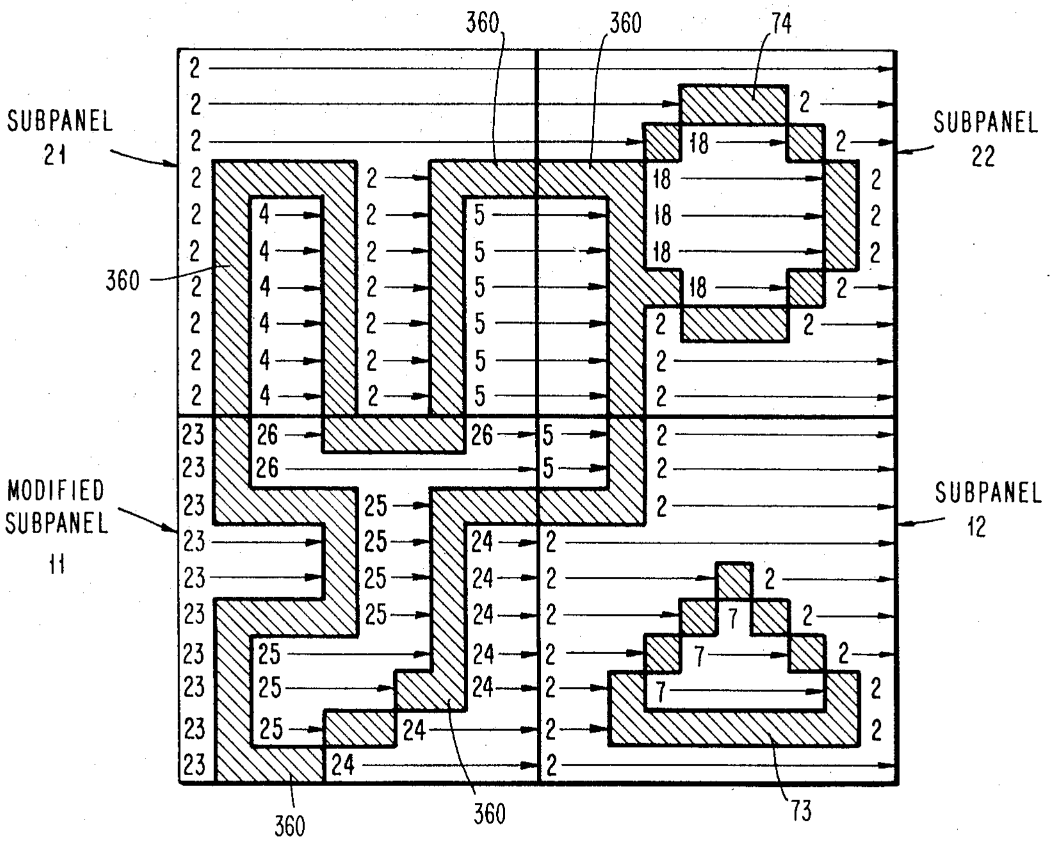
Figure 37:
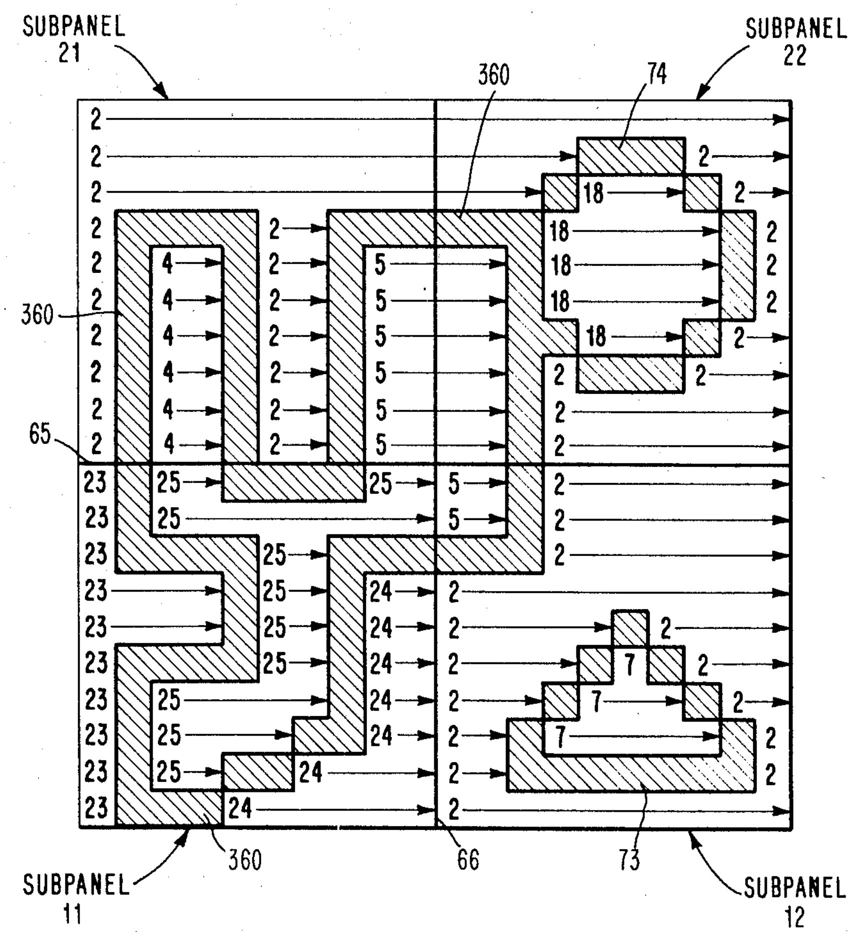

Prior to the execution of the SCAN1 routine upon subpanel 11, the scan tables for the various subpanels depict the state of affairs shown in FIG. 30. In reaching this stage of the operation during the original processing of the pattern, zone numbers running as high as 22 were utilized (see FIG. 7). Hence, the next available zone label is number 23. Therefore, when the SCAN1 routine is performed upon the modified SUBPANEL 11, zone labels commencing with number 23 will be assigned to the portions of the various regions disposed within SUBPANEL 11, as indicated in FIG. 36. When the RIPPLE1 routine is performed on the modified SUBPANEL 11, a slight change in zone numbering occurs, with zone number 26 being converted to zone number 25, as shown in FIG. 37.

The "seam stitching" operations, SCAN2A and SCAN2B (steps 95 and 96, FIG. 6) do not have to be performed for all subpanel borders within the modified pattern, but only with respect to those borders adjoining an altered subpanel or subpanels. Thus, in the case of the modified pattern shown in FIGS. 34–37, the vertical seam-stitching operation, SCAN2A, is performed only with respect to the border 66, FIG. 37, between SUBPANELS 11 and 12. The horizontal seam-stitching operation SCAN2B is performed only with respect to the horizontal border 65 between the subpanels 11 and 21, FIG. 37. When these supplementary SCAN2A and SCAN2B routines are performed, they cause the existing contents of the second-level equivalence table, EQTAB2, to be modified by the addition of entries 11–15, thereto, FIG. 38. The entries 11–15 establish certain additional zone equivalencies which relate the zone numbers 23, 24, and 25 to bordering zones 2, 4, and 5, FIGS. 37 and 38. The EQTAB2 entries 1–10 remain the same as they were (FIG. 29) before the supplementary SCAN2A and SCAN2B operation were performed.

Having revised the EQTAB2 table in accordance with the pattern modifications, the system now proceeds to the CONCOMP2 operation (step 97, FIG. 6). In this instance, the CONCOMP2 operation is performed for the entire panel, that is to say, with respect to the entire contents of EQTAB2, FIG. 38. As a result of this operation, the NODES2 and NODEGD2 tables are significantly changed, as can be seen by comparing FIG. 39 with FIG. 29.

Figure 40:
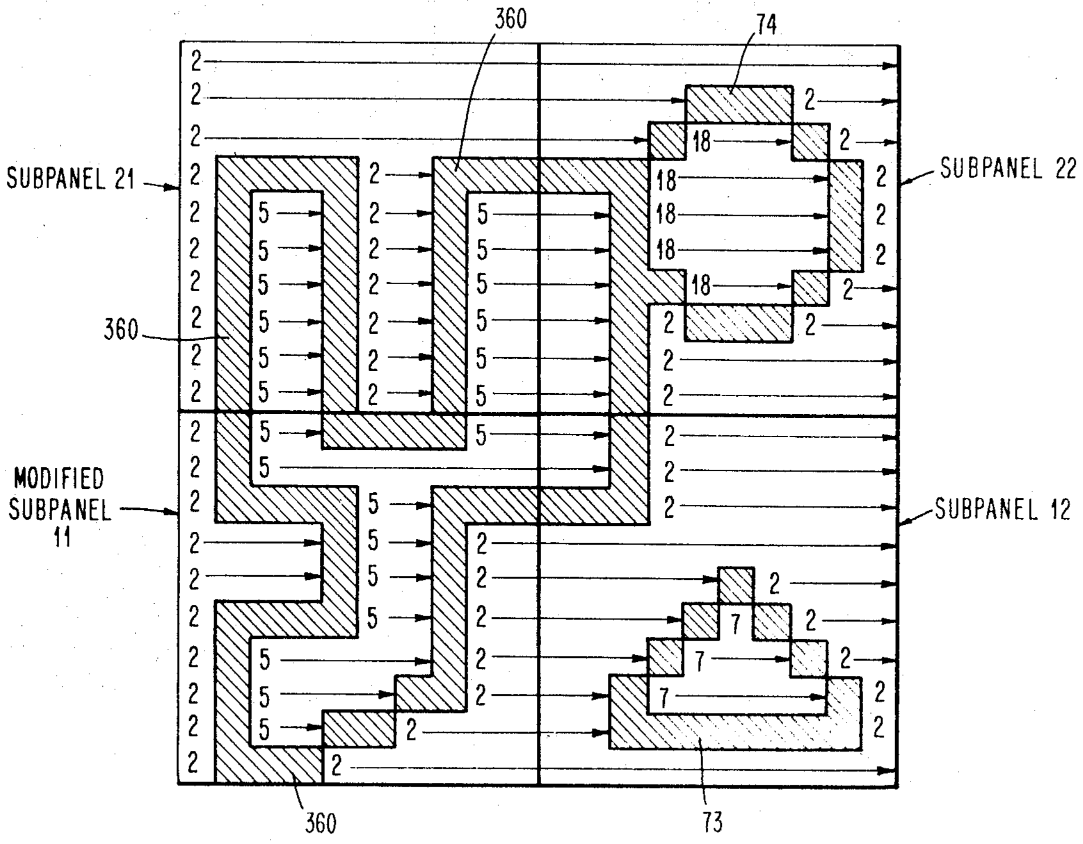

When the RIPPLE2 operation is performed upon the modified panel (step 98, FIG. 6), due to changes in the arrangement of connected nodes within the NODES2 table, some of the zone labels formerly employed (FIG. 30) now are eliminated, as indicated in FIG. 40. Thus, the label 5 now replaces the former labels 3 and 4 (FIG. 30). More accurately stated, the label 5 replaces the labels 25 and 4, FIG. 37. Label 25 previously had replaced label 3 and had partially replaced label 4 within the SUBPANEL 11. Also, the zone labels 23 and 24, FIG. 37, now have been changed back to the original zone label 2 (FIG. 30) as shown in FIG. 40.

Figure 41:
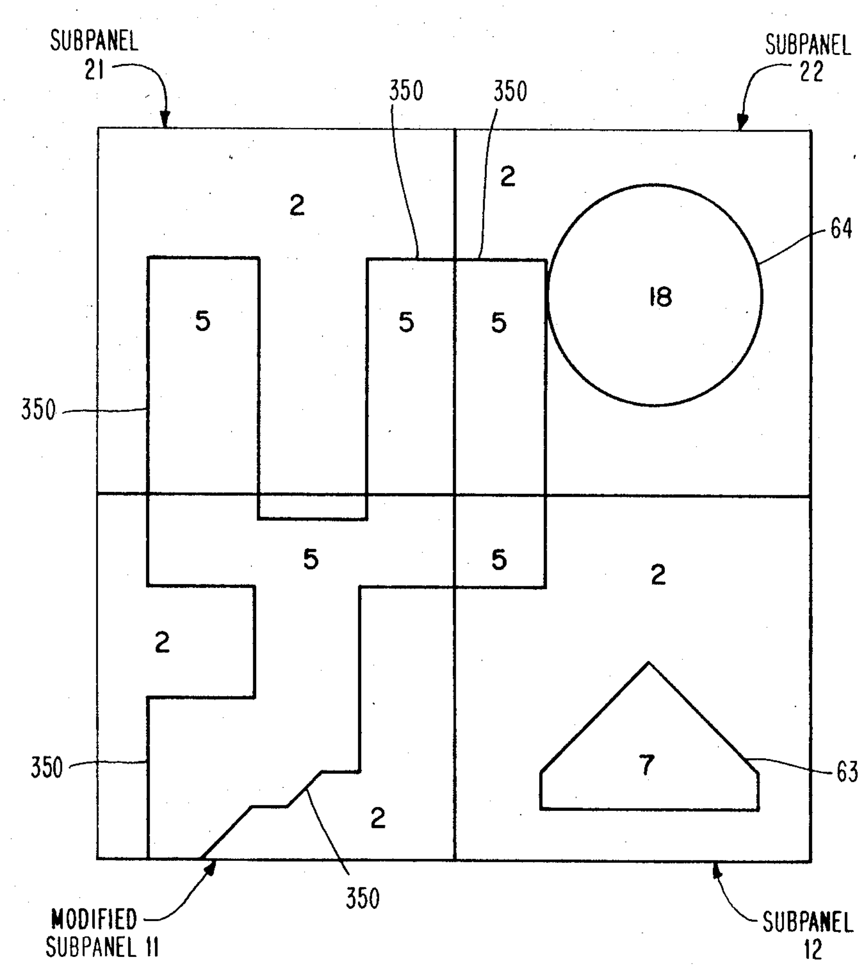

The scan tables of the various subpanels now have been revised to reflect the updated zone identifications shown in FIG. 40. Using this scan table information, the system now proceeds to apply new area labels where necessary, as shown in FIG. 41. The change in labeling can be seen by comparing FIG. 41 with FIG. 32. The labels 3 and 4 have disappeared inasmuch as the regions that formerly identified them have been merged with the region identified by zone label 5. A former part of the background region 2 in SUBPANEL 11 is now included within the region labeled 5.

OTHER USES OF AREA LABELS

It has been explained hereinabove that the universal area labels which are stored in the various subpanel scan tables as a result of the RIPPLE2 operation thereon can be utilized for causing appropriate symbols to be displayed in the various regions of the outline pattern on the viewing screen of the display unit, and furthermore, that these regional labels can be utilized for calculating the areas of the respective regions. It is possible also to find other convenient uses for these labels. For example, as disclosed in the aforesaid copending application of J. R. Lourie, the area labels can be used as calling symbols for simultaneously addressing all of the bit spaces within an area when one wishes to insert a desired bit pattern into that area. Thus, if one wishes to place a particular bit pattern representing a twill weave in region number 5, FIG. 41, for example, the system is instructed to place such a bit pattern in all zones that are identified with the label 5 in each of the subpanels.

SUMMARY OF ADVANTAGES

There has been described herein a novel interactive process for enabling an outline pattern of arbitrary configuration to be designed and graphically analyzed into its components while the designer is "on-line" with a computer. The analytical method is particularly useful where the pattern is of such size that, due to the physical limitations of the conversational display equipment or for any other reason, the pattern must be processed in segments or subpanels each containing only a part of the whole pattern. The pattern is analyzed as being made up of bounded regions, any of which may be enclosed by a boundary line that extends across one or more of the subpanel borders. For each of the pattern regions or components that extends across a subpanel border or borders, the disclosed process determines the "connectedness" of the several zones or subregions thereof lying within different subpanels, so that a common identifying label may be applied to all such parts of the region. This label then serves as a universal address symbol by which access may be had to the entire set of stored bits defining the region in any and all of the subpanels.

The analytical procedure involves the use of "SCAN," "CONCOMP" and "RIPPLE" routines, first on a subpanel level, and then on a higher or panel level. Obviously it may be extended to still higher levels if a hierarchy of panels is being utilized. The first-level SCAN1 routine builds the basic scan tables and equivalence tables for the respective subpanels, making the initial assignment of zone labels and determinations of zone equivalences from which all subsequent area labeling information is derived. The second-level SCAN2A and SCAN2B routines determine zone equivalences for the whole panel. The CONCOMP and RIPPLE routines, on both levels, enable zone number conversions to be deferred until convenient times in the operation when they can be most efficiently performed.

The use of FLIP and/or FLOP bits in conjunction with the current and lower bits to determine zone labeling during the SCAN1 process affords a powerful analytic tool which dispenses with the need to compare zone numbers in this phase of the operation and minimizes the number of times that a previous zone number must be looked up. It also lends itself readily to any arbitrary mode of scanning, not merely the horizontal raster scan disclosed herein. The SCAN2 routines (A&B) make unique use of scan table information to facilitate the matching of zones across subpanel borders. The versatility of the system is especially apparent in the highly flexible procedure for handling pattern modifications, wherein only the affected subpanels and their borders need be rescanned to update the area labels. The area calculation capability of the system can find use in a number of situations apparent to those skilled in the art.

While the invention has been particularly shown and described with reference to a preferred embodiment thereof, it will be understood by those skilled in the art that various changes in form and details may be made therein without departing from the spirit and scope of the invention.

What is claimed is:

1. A method of utilizing a data processing system having data storage means and graphic data output and/or input means for analyzing a pattern containing the outlines of arbitrarily bounded regions and for applying to each such region an identifying designation, the original of said pattern being positioned upon a panel which is divided into mutually bordering subpanels for enabling segments of said pattern respectively contained within said subpanels to be processed a subpanel at a time by said system, at least some of the regional boundaries being permitted to cross one or more of the subpanel borders, said method comprising the steps of:

a. operating certain portions of said storage means as subpanel outline memories under control of said graphic data input means to store representations of geometric reference points that are located within the respective subpanels, some of the stored point representations relating to reference points located on the boundaries of said regions, and others of said stored point representations relating to reference points located in the spaces respectively enclosed by said regional boundaries;

b. operating said system to assign a unique first-level regional designation to each set of stored point representations collectively representing a region or portion of a region in each of said subpanel outline memories;

c. operating portions of said storage means as first-level reference tables for storing entries representing the first-level regional designations defined by step *b* in such a manner that each regional designation uniquely addresses the set of reference points pertaining to its respective region or portion of a region within the respective subpanel; and d. operating said system in response to the information stored in said first-level reference tables for assigning a unique second-level regional designation to each set of first-level regional designations that pertains to an identical region located in a plurality of subpanels.

2. A method as set forth in claim 1 including the following additional step:

e. revising the entries in said first-level reference tables wherever necessary to render all first-level regional designations within each of the sets defined by step *d* identical with the second-level regional designation assigned to that set, whereby each such second-level designation uniquely addresses all reference points pertaining to its respective region within any of the subpanels.

3. A method as set forth in claim 2 including the following additional step:

f. operating said graphic data output means under control of information stored in said reference tables to manifest a showing of the pattern segment in any selected subpanel, with each region or portion of a region located therein being identified by a displayed symbol corresponding to the related second-level regional designation.

4. A method as set forth in claim 2 including the following additional step:

g. measuring the area occupied by any designated region by counting the number of reference points addressed by its respective regional designation.

5. A method of utilizing a data processing system having data storage means and graphic data output and/or input means for analyzing a pattern containing the outlines of arbitrarily bounded regions and for applying to each such region an identifying designation, the original of said pattern being positioned upon a panel which is divided into mutually bordering subpanels for enabling segments of said pattern respectively contained within said subpanels to be processed a subpanel at a time by said system, at least some of the regional boundaries being permitted to cross one or more of the subpanel borders, said method comprising the steps of:

a. operating certain portions of said storage means as subpanel outline memories under control of said graphic data input means to store arrays of bits respectively positioned to represent geometric reference points within said subpanels, said arrays being so constituted that bits of one type stored therein represent points on the boundaries of said regions, and bits of another type stored therein represent points in the spaces respectively enclosed by said regional boundaries;

b. determining which set of the bits stored in each subpanel outline memory is positioned to represent each region or portion of a region located within the respective subpanel, the respective regional sets of bits being exclusive of each other;

c. assigning to each of the regional sets of bits located within each subpanel outline memory a distinctive first-level area designation which addresses all of the bit positions occupied by that set and thereby identifies the corresponding set of reference points in the related subpanel defining the region or portion of a region to which said set of bits pertains;

d. operating portions of said storage means as first-level reference tables for storing entries which associate each first-level area designation collectively with the set of reference points in the respective subpanel that correspond to the bit positions addressed by such designation;

e. operating said system to determine from the entries stored in said first-level reference tables, in each instance, the common identity of any set of dissimilar first-level area designations that have been applied to an identical one of said regions;

f. operating portions of said storage means as second-level reference tables for storing entries representing, in each instance, the common identity among each related set of first-level area designations as determined by step *e*; and g. assigning to each set of first-level area designations having such common identity, as defined in said second-level reference table entries, a second-level area designation that collectively represents all of the reference points respectively represented by the constituent first-level area designations of that set throughout said panel.

6. A method as set forth in claim 5 including the following additional step:

h. revising the entries in at least some of said first-level reference tables wherever necessary to substitute the related second-level area designation for any first-level area designation that pertains to but is not identical with such second-level area designation, whereby each such second-level area designation concurrently addresses all of the bit positions collectively addressed by its constituent set of first-level area designations.

7. A method as set forth in claim 6 including the following additional step:

i. operating said graphic data output means to manifest a showing of any selected one of said pattern segments, with each region or portion of a region therein being identified by the second-level area designation applied thereto in accordance with step *h*.

8. A method as set forth in claim 6 including the following additional step:

j. measuring the area occupied by the region which is identified by any selected one of said second-level area designations in any selected one of said subpanels by making a numerical count of the bit positions addressed by said selected second-level area designation in said subpanel.

9. A method of analyzing into its components an outline pattern composed of arbitrarily bounded regions positioned upon a panel which effectively is divided into mutually bordering subpanels, at least some of the regional boundaries being permitted to cross borders between subpanels, said method involving the use of a data processing system having information storage means and graphic data output and/or input means and comprising the steps of:

a. operating certain portions of said storage means as subpanel outline memories under control of said graphic data input means to store arrays of bits respectively positioned to represent geometric reference points within said subpanels, said arrays being so constituted that bits of one type stored therein represent points on the boundaries of said regions, and bits of another type stored therein represent points in the spaces enclosed by said boundaries;

b. determining for each region or portion of a region lying within each subpanel which set of the space bits stored in the corresponding subpanel outline memory is positioned to represent that region or portion of a region;

c. operating portions of said storage means as scan table memories in response to step *b* for storing scan tables, one for each of said subpanels, each of said scan tables associating a distinctive zone designation with each set of space bits representing a particular region or portion of a region within the corresponding subpanel;

d. operating a portion of said storage means as an equivalence table memory in response to information stored in said scan tables for storing a table of equivalent zone designations, each entry in said equivalence table memory associating the zone designation in a portion of a region located within one subpanel with the zone designation for another portion of the same region located within a bordering subpanel;

e. determining from the entries in said equivalence table which ones of the zone designations stored therein pertain to each of the regions in said pattern whose boundaries cross subpanel borders; and f. assigning a common regional designation to each set of zone designations that has been determined by step *e* as belonging to the same region.

10. A method as set forth in claim 9 including the following additional step:

g. measuring the area of any selected region by operating said system to ascertain the number of space bits which are collectively identified by the respective regional designation.

11. A method of analyzing into its components an outline pattern composed of arbitrarily bounded regions positioned upon a panel containing a matrix of coordinate grid points for identifying each of said regions with a unique designation symbolizing the particular set of coordinate grid points enclosed by its respective regional boundary, said panel being effectively divided into mutually bordering subpanels each defined by a unique submatrix of said grid points, at least some of the regional boundaries being permitted to cross borders between subpanels, said method involving the use of a data processing system having information storage means and graphic data output and/or input means and comprising the steps of:

a. operating certain portions of said storage means as subpanel memories under control of said graphic data input means to store arrays of bits respectively representing said submatrices of coordinate grid points, said arrays being so constituted that bits of one binary value stored therein represent grid points on the boundaries of said regions, and bits of another binary value stored therein represent grid points in the spaces between said boundaries;

b. scanning the bits stored in each of said subpanel memories to determine which of the space bits therein represent the grid points of each region or portion of a region located within the respective subpanel;

c. operating certain portions of said storage means as scan table memories in response to said scanning step *b* for storing scan tables, one for each of said subpanels, each of said scan tables having one or more entries therein for associating the space bits representing each region or portion of a region in its respective subpanel with a distinctive zone designation;

d. scanning those ones of the stored bits within each submatrix that define the border area of the respective subpanel to determine which of these border bits are space bits and to ascertain from the respective scan table the zone designation or designations associated with the respective border space bits;

e. operating a portion of said storage means as an equivalence table memory in response to said border scanning step *d* for storing an equivalence table containing paired zone designations, each entry in said equivalence table associating a zone designation in one subpanel with a zone designation in a bordering subpanel such that at least one border space bit in one zone of a designated pair is adjacent to a border space bit in the other zone of that pair;

f. operating portions of said storage means as node table memories under control of the information stored in said equivalence table to form tables of nodes each made up of the zone designations contained within a unique set of one or more paired zone designations in said equivalence table, each such set which contains more than one pair of zone designations being characterized by the fact that each of said pairs therein has a zone designation in common with at least one other pair in that same set, each table of nodes therefore corresponding to a respective one of the regions in said pattern whose boundary crosses a subpanel border and including all of the zone designations that have been applied during step *c* to any portions of that region in any of the scan tables; and g. assigning to the scan table entries which are identified by the zone designations of each respective node table a regional designation representing all of the zone designations that have been applied to the corresponding region during step *c*.

12. A method as set forth in claim 11 including the following additional step:

h. measuring the area occupied by any selected pattern region within any selected subpanel by operating said system to ascertain the total number of space bits collectively identified by the respective regional designation within that subpanel, as denoted by its corresponding scan table entries.

13. A method of analyzing into its components an outline pattern composed of arbitrarily bounded regions positioned upon an assumed matrix of coordinate grid positions for identifying each of said regions with a unique regional designation which addresses the entire set of coordinate grid positions enclosed by its respective regional boundary, said method involving the use of a data processing system having data storage means and graphic output and/or input means and comprising the steps of:

a. operating a portion of said storage means as an outline memory under control of said graphic data input means to store an array of bits representing said matrix of grid positions, said array being so constituted that bits having one binary value therein represent positions on the boundaries of said regions, while bits having the other binary value represent positions in the spaces enclosed by said regional boundaries;

b. scanning said array of bits to make tentative assignments of zone designations to areas of said pattern which are defined by said space-representing and boundary-representing bits, such scanning operation being performed by sensing groups of binary values related to said array, one such group being sensed at a time, each group of values including the binary value of a bit in said array corresponding to a grid position that currently is being considered in said matrix plus at least two additional binary values respectively corresponding to grid positions adjacent to said current grid position in said matrix, and tentatively associating a selected one of several available zone designations with said current grid position in accordance with the particular arrangement of space-representing and boundary-representing binary values within the currently sensed group of values;

c. operating said system to detect each occurrence wherein neighboring grid positions of said matrix which respectively are represented by stored space bits in said outline memory have been respectively associated with different zone designations by step *b*;

d. operating a portion of said storage means as an equivalence table to store entries denoting the equivalence of any dissimilar zone designations that have been applied to adjacent grid positions within the same regional space, as determined by step *c*;

e. operating said system in accordance with the entries stored in said equivalence table to define in each instance the interrelationship among any set of dissimilar zone designations that have been applied to an identical region of said pattern; and f. assigning to each such set of interrelated zone designations thus defined a regional designation which universally addresses the set of grid positions located within the corresponding region of the pattern.

14. A method as set forth in claim 13 including the following additional steps:

g. operating a portion of said storage means as a scan table for storing entries which associate the various zones detected by step *b* with the respective regional designations determined by step *f*; and h. operating said graphic data output means in accordance with the data stored in said scan table to manifest a representation of said outline pattern wherein each region thereof is labeled by its respective regional designation.

15. A method as set forth in claim 13 wherein step *b* involves scanning said array of bits in row-by-row fashion, each of said sensed groups of values including at least the value of the bit corresponding to the currently considered grid position plus the respective values of the bit corresponding to the next previous grid position in that same row and the bit corresponding to the grid position in the next previous row immediately adjoining said current grid position.

16. A method as set forth in claim 15 wherein at least some of said groups of values additionally include, in each such instance, the value of the bit corresponding to the grid position in the next previous row that immediately adjoins said previous grid position in the current row.

17. A method of analyzing into its components an outline pattern composed of arbitrarily bounded regions positioned upon a panel containing an assumed matrix of coordinate grid positions for identifying each of said regions with a unique regional designation which addresses the entire set of coordinate grid positions enclosed by its respective regional boundary, said panel being effectively divided into mutually bordering subpanels each defined by a unique submatrix of said grid positions, at least some of the regional boundaries being permitted to cross borders between subpanels, said method involving the use of a data processing system having data storage means and graphic data output and/or input means and comprising the steps of:

a. operating certain portions of said storage means as subpanel outline memories under control of said graphic data input means to store arrays of bits respectively representing said submatrices of grid positions, said arrays being so constituted that bits having one binary value represent positions on the boundaries of said regions, while bits having the other binary value represent positions in the spaces enclosed by said regional boundaries;

b. scanning the array of bits stored in each of said subpanel outline memories for making tentative assignments of zone designations to areas of said pattern which are defined by the space-representing and boundary-representing bits of that array, said scanning operation being performed by sensing groups of binary values related to the respective array, one such group being sensed at a time, each group of values including the binary value of a bit in the array corresponding to a grid position that currently is being considered in the respective submatrix plus at least two additional binary values respectively corresponding to grid positions adjacent to said current grid position in said submatrix, and tentatively associating a selected one of several available zone designations with said current grid position in accordance with the particular arrangement of space-representing and boundary-representing binary values within the currently sensed group of values;

c. operating said system to detect each occurrence wherein neighboring grid positions of any submatrix which respectively are represented by stored space bits in the corresponding outline memory have been respectively associated with different zone designations by step *b*;

d. operating portions of said storage means as equivalence tables to store entries denoting the equivalence of any dissimilar zone designations that have been applied to adjacent grid positions within the same regional space, as determined by step *c*;

e. operating said system in accordance with the entries stored in said equivalence tables to defined in each instance the interrelationship among any set of dissimilar zone designations that have been applied to an identical region of said pattern; and f. assigning to each such set of interrelated zone designations thus defined a regional designation which universally addresses the set of grid positions located within the corresponding region of the pattern.

18. A method as set forth in claim 17 wherein said step *b* includes the setting up of scan tables, one for each subpanel, and making entries into each of said scan tables to denote the relationship of each zone designation employed in that subpanel to the number of grid positions in its respective zone and also to denote the relative placement of that zone with respect to the other designated zones in the same subpanel.

19. A method as set forth in claim 18 wherein step *c* includes the detection of each occurrence in which such neighboring grid positions are located in the same subpanel and each occurrence in which such neighboring grid positions are located in different subpanels having a common border.

20. A method as set forth in claim 17 wherein the equivalence tables set up by step *d* include first-level equivalence tables, one for each subpanel, to denote any equivalencies of the zone designations applied to zones within that subpanel, and a second-level equivalence table for denoting any equivalencies of zone designations applied to zones within different subpanels.

21. A method as set forth in claim 20 wherein step *e* includes operating certain portions of said storage means as first-level tables of nodes, one for each subpanel to represent as a set of connected nodes therein each set of interrelated zone designations within the same subpanel, and operating another portion of said storage means as a second-level table of nodes for representing as a set of connected nodes therein any set of interrelated zone designations within different subpanels.

22. A method as set forth in claim 21 including the steps of converting to a common zone designation each set of dissimilar zone designations in any subpanel scan table that corresponds to a set of connected nodes in one of said first-level nodes tables, and converting to a universal regional designation each set of dissimilar zone designations in any subpanel scan table that corresponds to a set of connected nodes in said second-level nodes table.

23. A method as set forth in claim 22 including the additional steps of rescanning the array of bits stored in any subpanel outline memory when there has been a change in the portion of the pattern stored therein, setting up a new scan table for that subpanel in accordance with the result of such rescanning, setting up new first-level equivalence and nodes tables for that subpanel and modifying the second-level equivalence and nodes tables in accordance with any new zone equivalencies detected, and again performing the conversion operations specified in claim 22.

* * * * *